US010140909B2

(12) United States Patent
Wang

(10) Patent No.: US 10,140,909 B2
(45) Date of Patent: Nov. 27, 2018

(54) DISPLAY DEVICE

(71) Applicant: Japan Display Inc., Tokyo (JP)

(72) Inventor: Cheng Wang, Tokyo (JP)

( * ) Notice: Subject to any disclaimer, the term of this patent is extended or adjusted under 35 U.S.C. 154(b) by 158 days.

(21) Appl. No.: 15/262,822

(22) Filed: Sep. 12, 2016

(65) Prior Publication Data

US 2017/0076654 A1 Mar. 16, 2017

(30) Foreign Application Priority Data

Sep. 14, 2015 (JP) ................................ 2015-180888
Sep. 7, 2016 (JP) ................................ 2016-175024

(51) Int. Cl.

| | |
|---|---|
| ***G09G 3/30*** | (2006.01) |
| ***G09G 3/36*** | (2006.01) |
| ***G06F 3/038*** | (2013.01) |
| ***G09G 5/00*** | (2006.01) |
| ***G09G 5/10*** | (2006.01) |
| ***G09G 3/20*** | (2006.01) |
| *G09G 3/3266* | (2016.01) |

(52) U.S. Cl.

CPC ......... *G09G 3/2074* (2013.01); *G09G 3/3266* (2013.01); *G09G 3/3607* (2013.01); *G09G 2300/0452* (2013.01); *G09G 2310/0286* (2013.01); *G09G 2320/045* (2013.01); *G09G 2320/0666* (2013.01); *G09G 2340/0407* (2013.01); *G09G 2360/147* (2013.01)

(58) Field of Classification Search

CPC ............ G06F 3/013; G09G 2340/0407; G09G 2354/00

See application file for complete search history.

(56) References Cited

U.S. PATENT DOCUMENTS

| | | | | |
|---|---|---|---|---|
| 2002/0154256 | A1 * | 10/2002 | Gotoh ............... | G02F 1/133615 349/65 |
| 2002/0167460 | A1 | 11/2002 | Baudisch et al. | |
| 2002/0167531 | A1 | 11/2002 | Baudisch | |
| 2004/0227703 | A1 * | 11/2004 | Lamvik ............. | G02B 27/0172 345/76 |
| 2006/0158588 | A1 * | 7/2006 | Uh ........................ | G02F 1/1333 349/114 |
| 2009/0237381 | A1 | 9/2009 | Otani et al. | |
| 2013/0194295 | A1 * | 8/2013 | Chan ................... | G09G 3/3466 345/619 |

FOREIGN PATENT DOCUMENTS

| | | | |
|---|---|---|---|
| JP | 2007-065239 | A | 3/2007 |
| JP | 2009-229511 | A | 10/2009 |
| JP | 2009-094089 | A | 4/2012 |

* cited by examiner

*Primary Examiner* — Nan-Ying Yang
(74) *Attorney, Agent, or Firm* — Michael Best & Friedrich LLP

(57) ABSTRACT

A display device includes a plurality of pixels arranged in a two dimensional matrix, wherein each of the pixels includes a plurality of sub-pixels, each of the sub-pixels includes a self-luminous layer. The display device includes a low-density region including low-density pixels each including a first number of the sub-pixels, a high-density region including high-density pixels each including a second number of the sub-pixels, wherein the second number is greater than the second number, and a lighting drive circuit configured to light up the self-luminous layer.

12 Claims, 28 Drawing Sheets

DISPLAY DEVICE

CROSS-REFERENCE TO RELATED APPLICATIONS

This application claims priority from Japanese Application No. 2015-180888 filed on Sep. 14, 2015, and Japanese Application No. 2016-175024 filed on Sep. 7, 2016, the contents of which are incorporated by reference herein in its entirety.

BACKGROUND

1. Technical Field

The present disclosure relates to a display device.

2. Description of the Related Art

Demand has recently increased for display devices for use in, for example, mobile electronic apparatuses, such as mobile phones and electronic paper. In a display device, each pixel includes a plurality of sub-pixels that output light of colors different from one another, and display of the sub-pixels is switched on and off so that the pixel displays various colors. Techniques (for example, that disclosed in Japanese Patent Application Laid-open Publication No. 2007-94089 (JP-A-2007-94089)) have been developed in which the display device includes white pixels as fourth sub-pixels in addition to the conventional red, green, and blue sub-pixels. Such techniques can improve display quality by adding the white pixels.

For example, JP-A-2007-94089 describes a liquid crystal display device that separately includes a region constituted by red, green, and blue sub-pixels and a region constituted by red, green, blue, and white sub-pixels, and thus, minimizes design cost while improving the display quality.

However, the region constituted by the red, green, blue, and white sub-pixels has more components, such as wiring for driving the sub-pixels, than those in the region constituted by the red, green, and blue sub-pixels. For example, in JP-A-2007-94089, a backlight emits light to display an image. Consequently, the region constituted by the red, green, blue, and white sub-pixels has a smaller aperture ratio than that of the region constituted by the red, green, and blue sub-pixels by a ratio occupied by the wiring. Due to this, in this case, the brightness of image varies region by region, so that the display quality may deteriorate. Moreover, if the deterioration of the display quality tends to progress, the life of the display device may decrease. In addition, in the display device constituted by the four kinds of sub-pixels of red, green, blue, and white, a region with various circuits arranged therein around an image display surface is wider than that of a display device constituted by three kinds of sub-pixels, in some cases.

To solve the problems described above, it is an object of the present invention to provide a display device that reduces the deterioration of display quality, restrains the reduction in the life of the display device, and restrains the widening of the region around the image display surface.

SUMMARY

According to an aspect, a display device includes a plurality of pixels arranged in a two dimensional matrix. Each of the pixels includes a plurality of sub-pixels, and each of the sub-pixels includes a self-luminous layer. The display device includes a low-density region including low-density pixels each including a first number of the sub-pixels, a high-density region including high-density pixels each including a second number of the sub-pixels, wherein the second number is greater than the second number, and a lighting drive circuit configured to light up the self-luminous layer.

DETAILED DESCRIPTION

Figure 1:
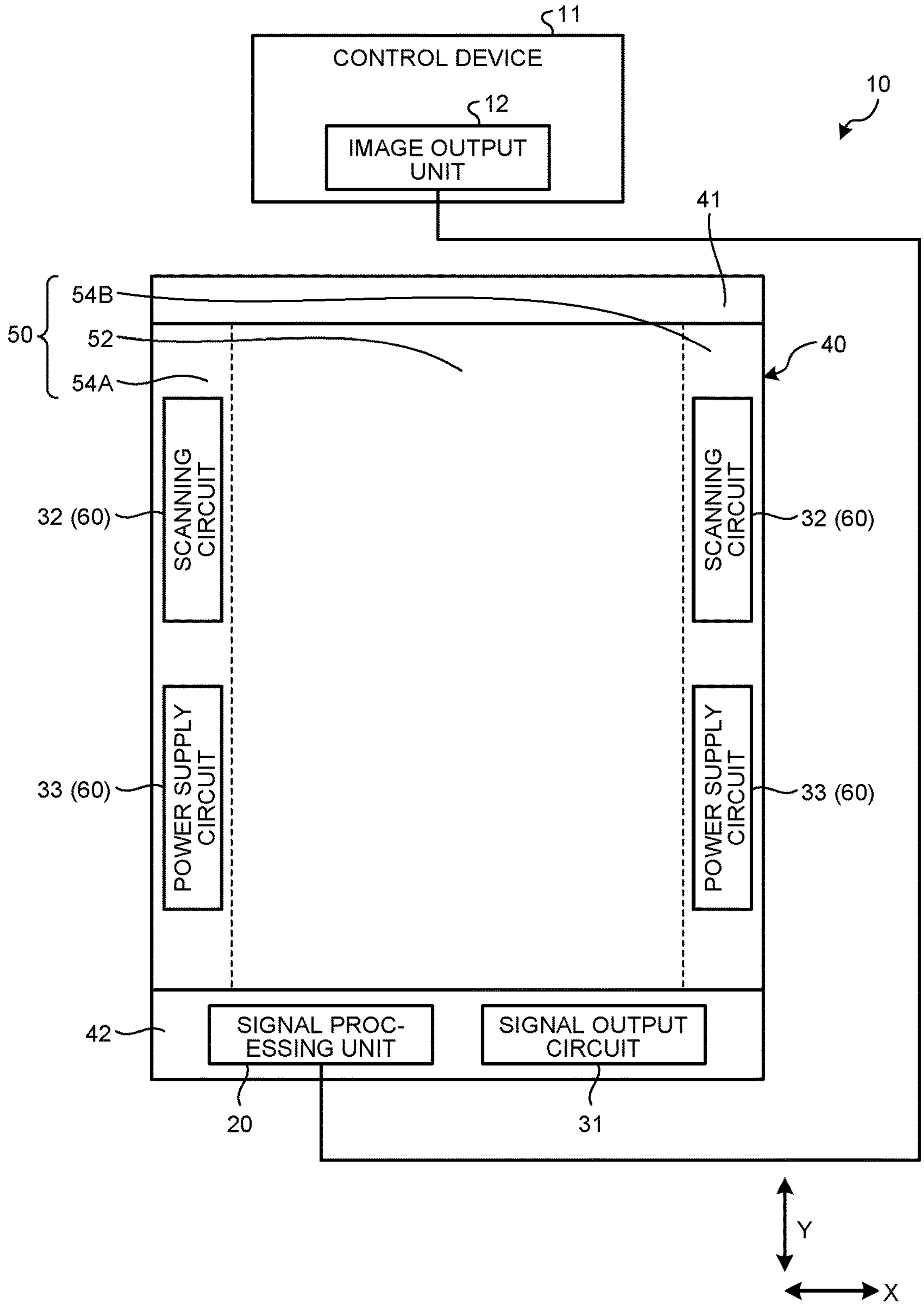
FIG. 1 is a block diagram illustrating an example of a configuration of a display device according to a first embodiment of the present invention.

The following describes embodiments of the present invention with reference to the accompanying drawings. The disclosure is merely an example, and the present invention naturally encompasses appropriate modifications maintaining the gist of the present invention that is easily conceivable by those skilled in the art. To further clarify the description, the width, the thickness, the shape, and the like of each component may be schematically illustrated in the drawings as compared with an actual aspect. However, this is merely an example and interpretation of the present invention is not limited thereto. The same elements as those described in the drawings that have already been discussed are denoted by the same reference numerals through the description and the drawings, and detailed descriptions thereof will not be repeated in some cases.

First Embodiment

FIG. 1 is a block diagram illustrating an example of a configuration of a display device according to a first embodiment of the present invention. As illustrated in FIG. 1, this display device 10 of the first embodiment includes a signal processing unit 20, a signal output circuit 31, a scanning circuit 32, a power supply circuit 33, and an image display panel 40. The signal output circuit 31, the scanning circuit 32, and the power supply circuit 33 constitute an image display panel driving unit 30. The signal processing unit 20 and the image display panel driving unit 30 are embedded in the image display panel 40. The signal processing unit 20 receives input signals from an image output unit 12 of a control device 11. The signal processing unit 20 generates signals by applying predetermined data processing to the input signals, and transmits the generated signals to components of the display device 10. The image display panel driving unit 30 controls driving of the image display panel 40 based on the signals from the signal processing unit 20. The image display panel 40 is a self-luminous image display panel that displays an image by lighting self-luminous bodies in pixels based on the signals from the image display panel driving unit 30.

Configuration of Image Display Panel Driving Unit

The image display panel driving unit 30 is a control device for the image display panel 40, and includes the signal output circuit 31, the scanning circuit 32, and the power supply circuit 33, as described above. The signal output circuit 31 is electrically coupled to each of sub-pixels 49 included in each of pixels 48 in the image display panel 40 through a signal line DTL. The signal output circuit 31 holds received image output signals, and sequentially outputs the image output signals to the sub-pixels 49 of the image display panel 40. The scanning circuit 32 is electrically coupled to each of the sub-pixels 49 of the image display panel 40 through a scanning line SCL. The scanning circuit 32 selects each of the sub-pixels 49 in the image display panel 40, and controls on/off of a switching element (such as a thin-film transistor (TFT)) for controlling an operation (light emission intensity) of the sub-pixel 49. The power supply circuit 33 supplies electric power for causing each of the sub-pixels 49 to emit light to a corresponding lighting drive circuit 45 (to be described later) through a power supply line PCL.

Figure 2:
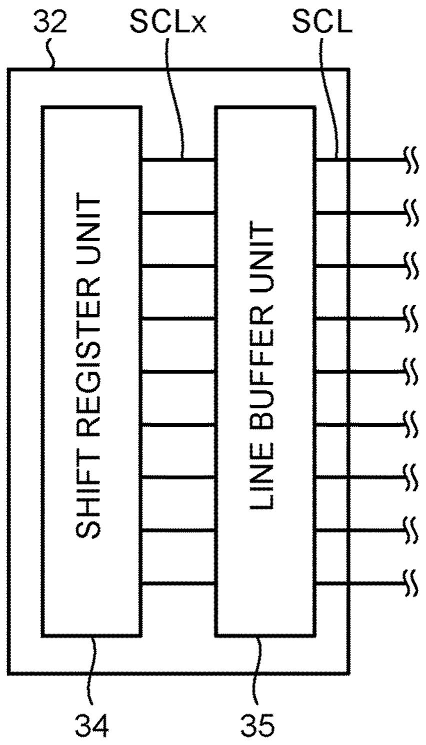
FIG. 2 is a block diagram explaining a configuration of a scanning circuit.

FIG. 2 is a block diagram explaining the configuration of the scanning circuit. More specifically, the scanning circuit 32 includes a shift register unit 34 and a line buffer unit 35, as illustrated in FIG. 2. The shift register unit 34 is a circuit that outputs a scanning signal to scanning output lines $SCL_X$. The shift register unit 34 sequentially transfers the scanning signal that has been output to a predetermined scanning output line $SCL_X$ to a scanning output line $SCL_X$ of the next row. The line buffer unit 35 is coupled to the shift register unit 34 through the scanning output lines $SCL_X$. The line buffer unit 35 is coupled to the sub-pixels 49 of each row through the scanning line SCL. The line buffer unit 35 amplifies the scanning signal output from the shift register unit 34, and outputs the amplified scanning signal to the sub-pixels 49 of each row. The line buffer unit 35 includes, for example, a plurality of transistors, each of which is coupled to the scanning output line $SCL_X$ of the corresponding row. The scanning signal sequentially output from the shift register unit 34 row by row is sequentially amplified by each of the transistors of the line buffer unit 35, and is sequentially output to the sub-pixels 49 of each row. In this manner, the scanning circuit 32 uses the shift register unit 34 and the line buffer unit 35 to select the sub-pixels 49 sequentially along the row direction (Y-direction).

Configuration of Image Display Panel

As illustrated in FIG. 1, the image display panel 40 has a rectangular shape that is shorter in the X-direction (row direction) and longer in the Y-direction (column direction). However, the image display panel 40 is not limited to having this shape, but may have any shape. The image display panel 40 includes frame portions 41 and 42 and an image display surface 50. The frame portions 41 and 42 are places that do not include the pixels 48 and do not display any image. The frame portions 41 and 42 may be covered with, for example, a material different from that of a surface of the image display panel 40, or may have the same material as that of the surface of the image display panel 40 and be light-shielded by a black matrix. The image display surface 50 is a surface that has the pixels 48 arranged thereon and displays an image. The image display surface 50 occupies the entire range along the X-direction of the image display panel 40. The image display surface 50 is adjacent at both ends thereof in the Y-direction to the frame portions 41 and 42.

The signal processing unit 20 and the signal output circuit 31 are embedded in the frame portion 42. However, at least either of the signal processing unit 20 and the signal output circuit 31 may be embedded in the frame portion 41.

The $P_0 \times Q_0$ ($P_0$ in the row direction and $Q_0$ in the column direction) pixels 48 are arranged in a two-dimensional matrix on the image display surface 50. As illustrated in FIG. 1, the image display surface 50 is partitioned into a high-density region 52 and low-density regions 54A and 54B. The high-density region 52 is located at the center in the X-direction of the image display surface 50. The low-density regions 54A and 54B are located on both ends in the X-direction of the high-density region 52, and are adjacent to the high-density region 52. Specifically, the high-density region 52 is rectangular. The low-density region 54A is adjacent to one side in the X-direction of the high-density region 52 so as to extend along the Y-direction from one end to the other end of the side. The low-density region 54B is adjacent to the other side in the X-direction of the high-density region 52 so as to extend along the Y-direction from one end to the other end of the other side. The number of the sub-pixels 49 included in each of the pixels 48 differs between the high-density region 52 and the low-density regions 54A and 54B and details will be described later. Hereinafter, the low-density regions 54A and 54B will be described as a low-density region 54 when not being distinguished from each other.

Figure 3:
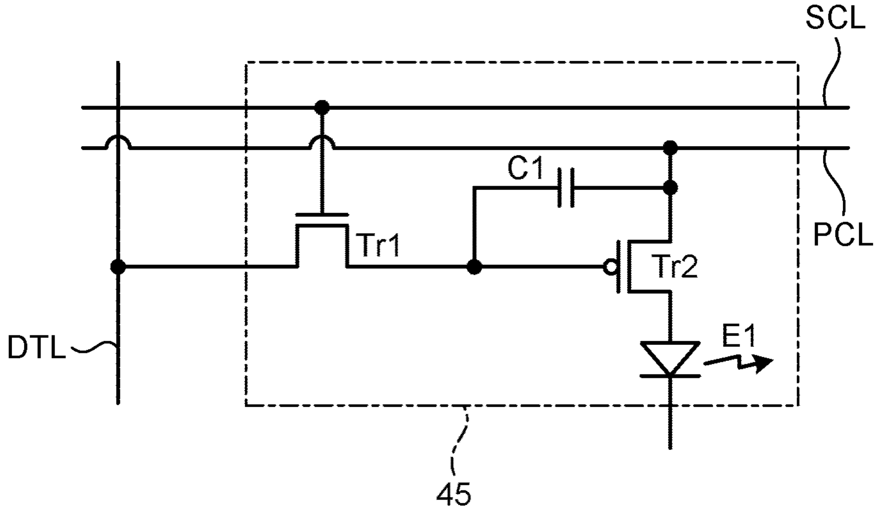
FIG. 3 is a diagram illustrating a lighting drive circuit for sub-pixels included in a pixel of an image display panel according to the first embodiment.

FIG. 3 is a diagram illustrating a lighting drive circuit for the sub-pixels included in the pixel of the image display panel according to the first embodiment. Each of the pixels 48 includes the sub-pixels 49, and the lighting drive circuits 45 for the sub-pixels 49 illustrated in FIG. 3 are arranged in a two-dimensional matrix. As illustrated in FIG. 3, the lighting drive circuit 45 includes a control transistor Tr1, a driving transistor Tr2, and a charge holding capacitor C1. The gate of the control transistor Tr1 is coupled to the scanning line SCL, the source thereof is coupled to the signal line DTL, and the drain thereof is coupled to the gate of the driving transistor Tr2. One end of the charge holding capacitor C1 is coupled to the gate of the driving transistor Tr2, and the other end thereof is coupled to the source of the driving transistor Tr2. The source of the driving transistor Tr2 is coupled to the power supply line PCL, and the drain of the driving transistor Tr2 is coupled to the anode of an organic light emitting diode E1 serving as a self-luminous body. The cathode of the organic light emitting diode E1 is coupled to, for example, a reference potential (such as a ground). FIG. 3 illustrates an example in which the control transistor Tr1 is an n-channel transistor and the driving transistor Tr2 is a p-channel transistor. However, the polarity of each of the transistors is not limited to this example. The polarity of each of the control transistor Tr1 and the driving transistor Tr2 only needs to be determined as needed.

Figure 4A:
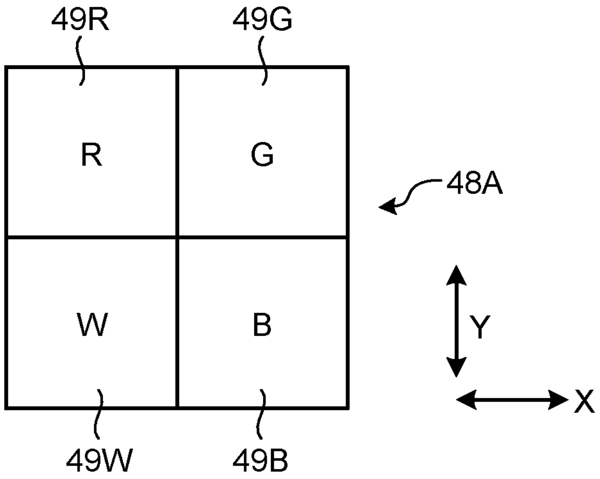
FIG. 4A is a diagram illustrating an arrangement of the sub-pixels of a high-density pixel.
Figure 4B:
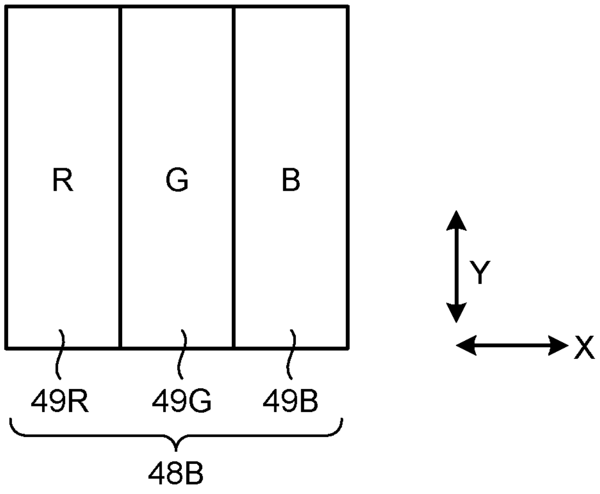
FIG. 4B is a diagram illustrating an arrangement of the sub-pixels of a low-density pixel.

The following describes arrangements of the sub-pixels 49 in each of the pixels 48. FIG. 4A is a diagram illustrating an arrangement of the sub-pixels of a high-density pixel. FIG. 4B is a diagram illustrating an arrangement of the sub-pixels of a low-density pixel. A high-density pixel 48A serving as the pixel 48 in the high-density region 52 has more sub-pixels 49 than those in a low-density pixel 48B serving as the pixel 48 in the low-density region 54. It means that the number (called as a second number) of sub-pixels 49 in the high-density pixel 48A is greater (larger) than the number (called as a first number) of sub-pixels 49 in the low-density pixel 48B. In other words, the number of the sub-pixels 49 in same area is larger in the high-density region 52 than in the low-density region 54. As illustrated in FIG. 4A, the high-density pixel 48A includes a first sub-pixel 49R, a second sub-pixel 49G, a third sub-pixel 49B, and a fourth sub-pixel 49W. The first sub-pixel 49R displays primary red as a first color. The second sub-pixel 49G displays primary green as a second color. The third sub-pixel 49B displays primary blue as a third color. The fourth sub-pixel 49W displays white as a fourth color different from the first, second, and third colors. The first, second, third, and fourth colors are not limited to red, green, blue, and white, respectively, but may be any selected colors, such as complementary colors. The first sub-pixels 49R, the second sub-pixels 49G, the third sub-pixels 49B, and the fourth sub-pixels 49W are called the sub-pixels 49 when need not be distinguished from one another.

As illustrated in FIG. 4A, the first sub-pixels 49R, the second sub-pixels 49G, the third sub-pixels 49B, and the fourth sub-pixels 49W are arranged in two rows and two columns in the high-density pixel 48A. The high-density pixel 48A includes the first sub-pixel 49R in the first column of the first row, the second sub-pixel 49G in the second column of the first row, the fourth sub-pixel 49W in the first column of the second row, and the third sub-pixel 49B in the second column of the second row. In other words, in the high-density pixel 48A, the first sub-pixel 49R is adjacent in the row direction (X-direction) to the second sub-pixel 49G, and adjacent in the column direction (Y-direction) to the fourth sub-pixel 49W. The second sub-pixel 49G is adjacent in the column direction (Y-direction) to the third sub-pixel 49B. The fourth sub-pixel 49W is adjacent in the row direction (X-direction) to the third sub-pixel 49B.

As illustrated in FIG. 4B, the low-density pixel 48B includes the first sub-pixels 49R, the second sub-pixels 49G, and the third sub-pixels 49B. In the low-density pixel 48B, the first sub-pixels 49R, the second sub-pixels 49G, and the third sub-pixels 49B are arranged along the X-direction in a stripe pattern. The low-density pixel 48B is formed to have substantially the same area as the area of the high-density pixel 48A. Consequently, the area of each of the sub-pixels 49 included in the low-density pixel 48B is larger than the area of each of the sub-pixels 49 included in the high-density pixel 48A. The expression "substantially the same" refers to a scope of sameness allowing a deviation within a general tolerance.

The sub-pixel arrangements of the high-density pixel 48A and the low-density pixel 48B have the configurations described above. However, the sub-pixel arrangements of the high-density pixel 48A and the low-density pixel 48B are not limited to having the configurations described above, provided that the number of the sub-pixels 49 included in the high-density pixel 48A is larger than the number of the sub-pixels 49 included in the low-density pixel 48B.

The high-density region 52 can have any amount of area and any shape, as long as including the high-density pixel 48A and not including the low-density pixel 48B. The low-density region 54 can have any amount of area and any shape, as long as including the low-density pixel 48B and not including the high-density pixel 48B. The high-density region 52 preferably includes a plurality of such high-density pixels 48A, and the low-density region 54 preferably includes a plurality of such low-density pixels 48B. However, the numbers of the high-density pixels 48A and the low-density pixels 48B are optional. The area of the high-density region 52 is preferably larger than the area of the low-density region 54. In other words, the number of the high-density pixels 48A included in the image display panel 40 is preferably larger than the number of the low-density pixels 48B included therein.

The low-density region 54 further includes a drive control circuit 60 for controlling driving of the image display panel 40. The drive control circuit 60 in the present embodiment is constituted by the scanning circuit 32 and the power supply circuit 33. However, the drive control circuit 60 only needs to be a circuit for controlling operations of the lighting drive circuits 45, and may include, for example, only the scanning circuit 32. For example, the drive control circuit 60 selects which of the lighting drive circuits 45 is to be operated, and controls the amount of power applied to the sub-pixel 49 by the lighting drive circuit 45. The following describes an arrangement of the drive control circuit 60 in the low-density region 54.

Figure 5:
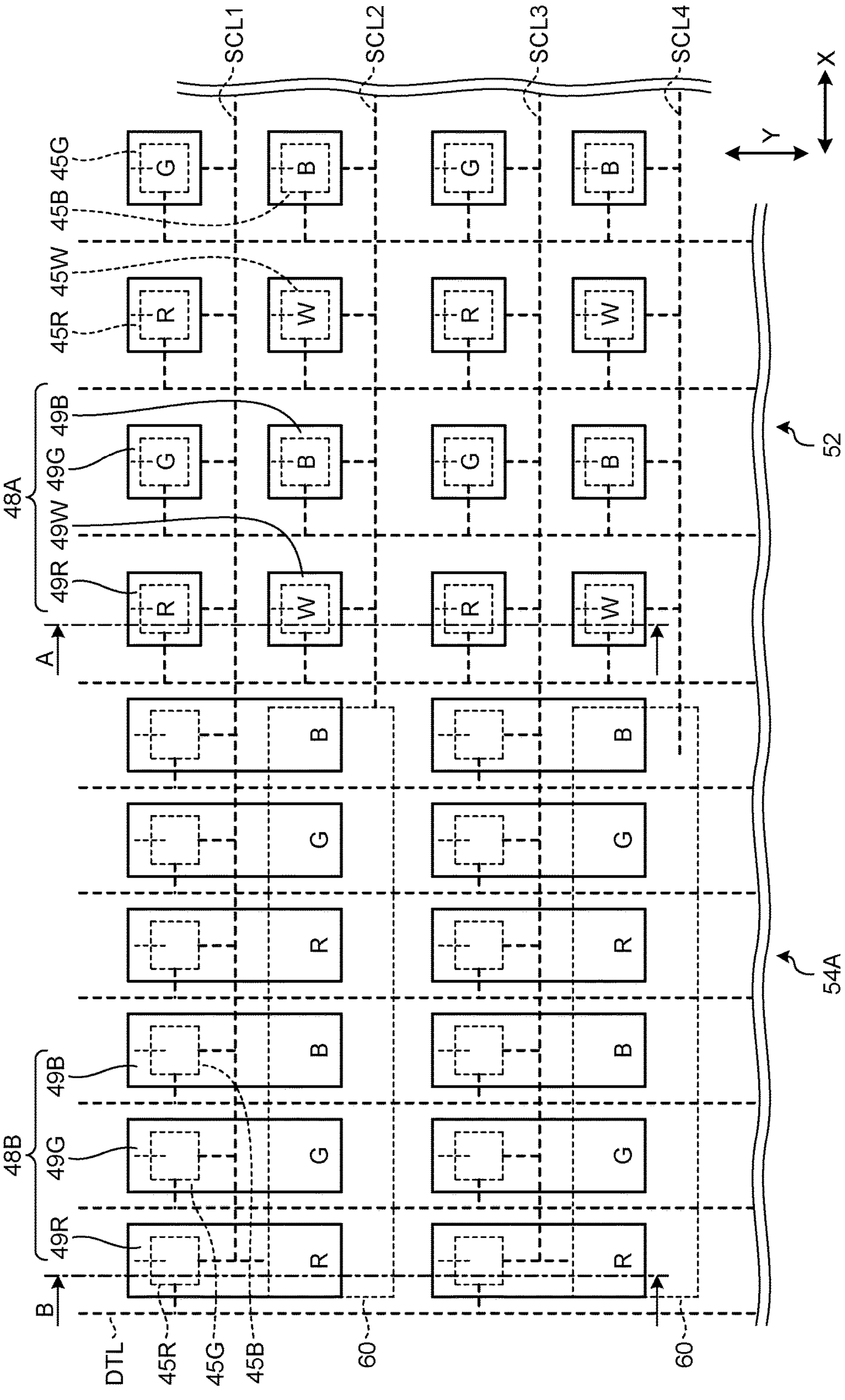
FIG. 5 is an explanatory diagram schematically explaining wiring of a circuit over a low-density region and a high-density region.

FIG. 5 is an explanatory diagram schematically explaining wiring of a circuit over the low-density region and the high-density region. As illustrated in FIG. 5, a plurality of signal lines DTL are arranged so as to extend along the Y-direction in the image display panel 40. The signal lines DTL are coupled to the signal output circuit 31. The signal lines DTL receive the image output signals for causing the sub-pixels 49 to display the predetermined colors from the signal output circuit 31. The signal lines DTL are also coupled to the sub-pixels 49 arranged in the same columns.

A plurality of scanning lines SCL (SCL1, SCL2, SCL3, SCL4, . . . ) are arranged so as to extend along the X-direction in the image display panel 40. The scanning lines SCL extend along the X-direction from the drive control circuit 60 (scanning circuit 32). The drive control circuit 60 outputs the scanning signal to each of the scanning lines SCL sequentially along the Y-direction. FIG. 5 omits to illustrate the power supply line PCL.

The scanning lines SCL are coupled to the sub-pixels 49 through the lighting drive circuits 45. Specifically, a scanning line SCL1 is coupled to the first sub-pixels 49R, the second sub-pixels 49G and the third sub-pixels 49B of the low-density pixels 48B arranged in the same row. The scanning line SCL1 is also coupled to the first sub-pixels 49R and the second sub-pixels 49G of the high-density pixels 48A arranged in the same row. A scanning line SCL2 is coupled to the fourth sub-pixels 49W and the third sub-pixels 49B of the high-density pixels 48A arranged in the same row. A scanning line SCL3 is coupled to the first sub-pixels 49R, the second sub-pixels 49G and the third sub-pixels 49B of the low-density pixels 48B arranged in the same row. The scanning line SCL3 is coupled to the first sub-pixels 49R and the second sub-pixels 49G of the high-density pixels 48A arranged in the same row. A scanning line SCL4 is coupled to the fourth sub-pixels 49W and the third sub-pixels 49B of the high-density pixels 48A arranged in the same row. The drive control circuit 60 outputs the scanning signal to the sub-pixels 49 in each row sequentially selected along the Y-direction, through the lighting drive circuits 45 corresponding to the respective sub-pixels 49. That is, the drive control circuit 60 selects the sub-pixels 49 in each row sequentially along the Y-direction.

The lighting drive circuits 45 are provided one by one for the sub-pixels 49. Hereinafter, the lighting drive circuit 45 for the first sub-pixel 49R will be referred to as a lighting drive circuit 45R, the lighting drive circuit 45 for the second sub-pixel 49G as a lighting drive circuit 45G, the lighting drive circuit 45 for the third sub-pixel 49B as a lighting drive circuit 45B, and the lighting drive circuit 45 for the fourth sub-pixel 49W as a lighting drive circuit 45W.

The sub-pixels 49 are provided above the pieces of wiring (the scanning lines SCL and the signal lines DTL) through which signal for driving the sub-pixels 49 flows, the lighting drive circuits 45, and the drive control circuit 60, with respect to the image display surface 50. In other words, the pieces of wiring (the scanning lines SCL and the signal lines DTL) and the lighting drive circuits 45 are provided below the sub-pixels 49 with respect to the image display surface 50. In the low-density region 54, the drive control circuit 60 is provided below the sub-pixels 49 of the low-density pixels 48B with respect to the image display surface 50. The following gives a specific description using FIGS. 6A and 6B.

Figure 6A:
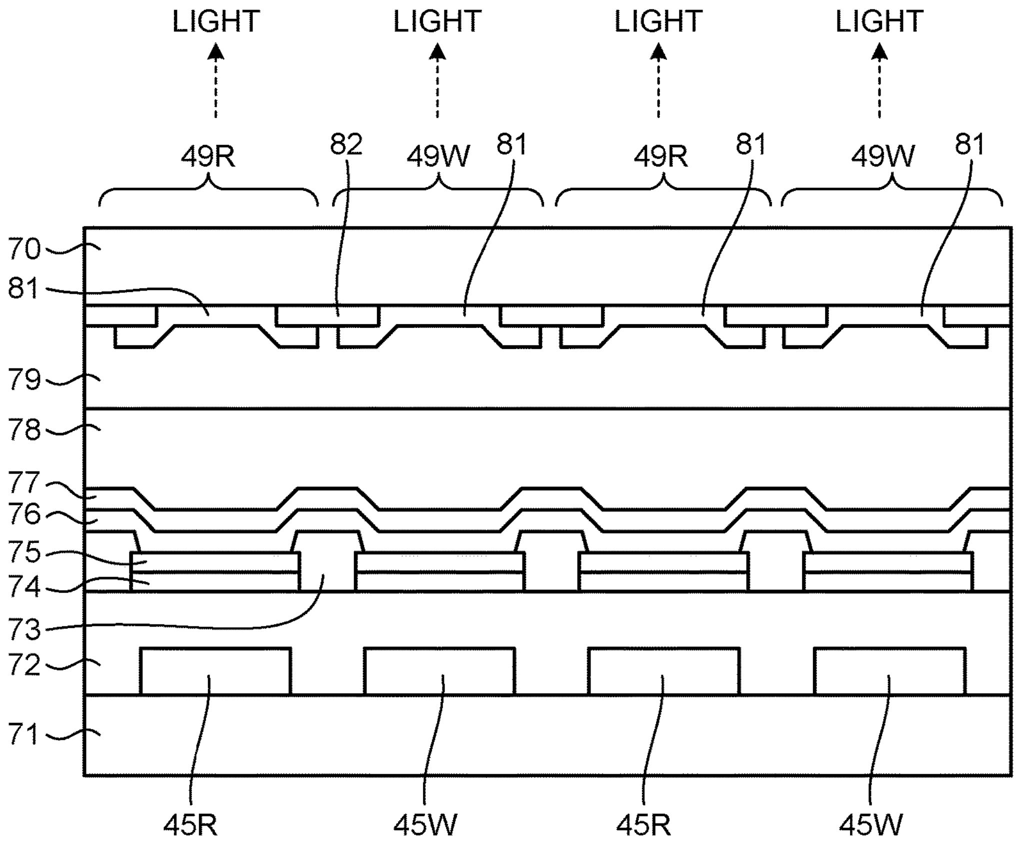
FIG. 6A is a diagram schematically illustrating a cross-sectional structure of the image display panel in the high-density region.
Figure 6B:
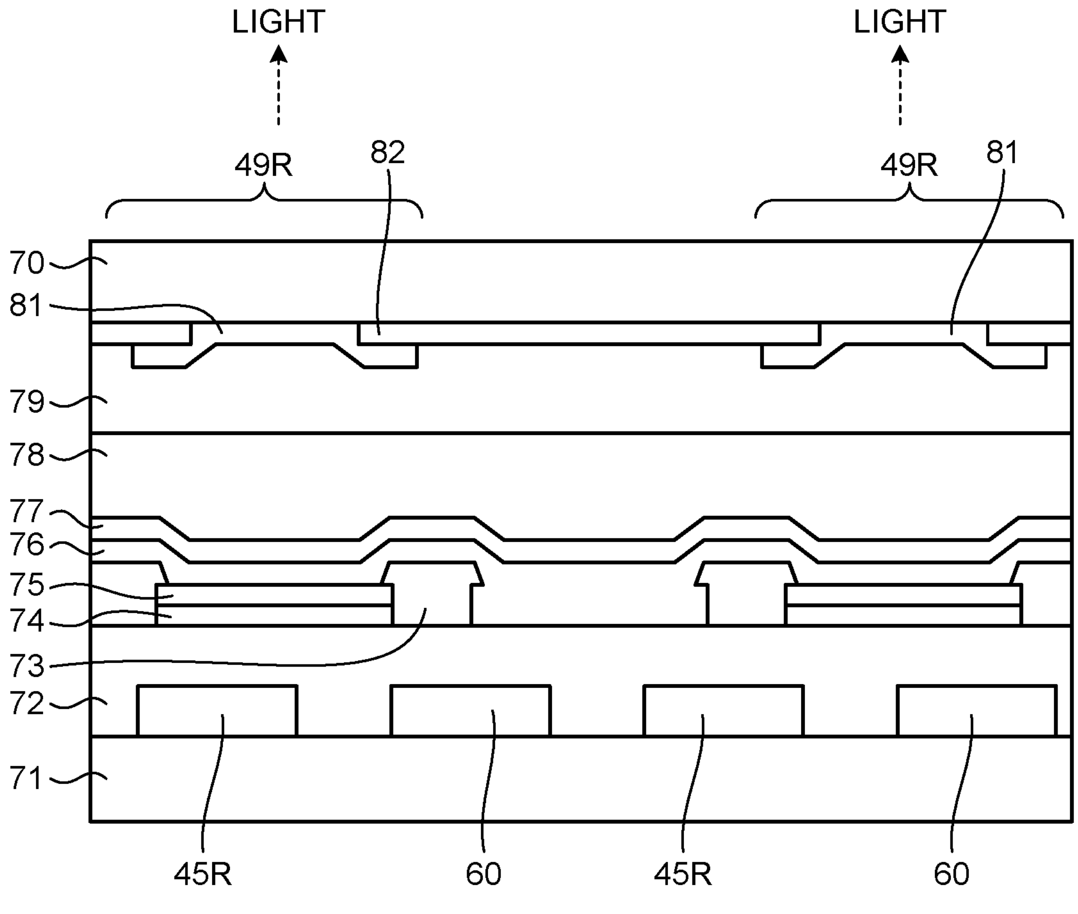
FIG. 6B is a diagram schematically illustrating a cross-sectional structure of the image display panel in the low-density region.

FIG. 6A is a diagram schematically illustrating a cross-sectional structure of the image display panel in the high-density region. FIG. 6B is a diagram schematically illustrating a cross-sectional structure of the image display panel in the low-density region. FIG. 6A is a cross-sectional view at cross-section A indicated in FIG. 5. FIG. 6B is a cross-sectional view at cross-section B indicated in FIG. 5. As illustrated in FIGS. 6A and 6B, the image display panel 40 includes a substrate 71, insulating layers 72 and 73, a reflective layer 74, a lower electrode 75, a self-luminous layer 76 serving as a self-luminous body, an upper electrode 77, an insulating layer 78, an insulating layer 79, a color filter 81 serving as a color conversion layer, a black matrix 82 serving as a light-shielding layer, and a substrate 70. The substrate 71 is, for example, a semiconductor substrate made of silicon, a glass substrate, a resin substrate, or the like. The substrate 71 forms or holds, for example, the lighting drive circuits 45 described above. The insulating layer 72 is a protective film for protecting, for example, the lighting drive circuits 45 described above. The insulating layer 72 can be made of a silicon oxide, a silicon nitride, or the like. The lower electrode 75 is provided to each of the first sub-pixels 49R, the second sub-pixels 49G, the third sub-pixels 49B, and the fourth sub-pixels 49W. The lower electrode 75 is an electric conductor serving as the anode (positive pole) of the organic light emitting diode E1 described above. The lower electrode 75 is a translucent electrode made of a translucent conductive material (translucent conductive oxide) such as indium tin oxide (ITO). The insulating layer 73 is an insulating layer that is called a bank, and partitions the first sub-pixels 49R, the second sub-pixels 49G, the third sub-pixels 49B, and the fourth sub-pixels 49W from one another. The reflective layer 74 is made of a material having metallic luster, such as silver, aluminum, or gold, that reflects light from the self-luminous layer 76.

The upper electrode 77 is a translucent electrode made of a translucent conductive material (translucent conductive oxide) such as indium tin oxide (ITO). In the present embodiment, ITO is exemplified as the translucent conductive material. However, the translucent conductive material is not limited to ITO. A conductive material having another composition such as indium zinc oxide (IZO) may be used as the translucent conductive material. The upper electrode 77 serves as the cathode (negative pole) of the organic light emitting diode E1. The insulating layer 78 is a sealing layer that seals the upper electrode 77 described above, and can be made of a silicon oxide, a silicon nitride, or the like. The insulating layer 79 is a planarization layer for reducing a level difference generated due to the bank, and can be made of a silicon oxide, a silicon nitride, or the like. The substrate 70 is a translucent substrate that protects the entire image display panel 40, and can be a glass substrate, for example. FIG. 5 illustrates an example in which the lower electrode 75 is the anode (positive pole) and the upper electrode 77 is the cathode (negative pole). However, the embodiments are not limited to this example. The lower electrode 75 may be the cathode and the upper electrode 77 may be the anode. In that case, the polarity of the driving transistor Tr2 electrically coupled to the lower electrode 75 can be appropriately changed, and the stacking order of a carrier injection layer (a hole injection layer and an electron injection layer), a carrier transport layer (a hole transport layer and an electron transport layer), and a light-emitting layer can be appropriately changed.

The image display panel 40 is a color display panel, in which the color filter 81 is disposed between the sub-pixel 49 and an image observer, and transmits light having a color corresponding to the color of the sub-pixel 49 among colors from light-emitting components of the self-luminous layer 76. The image display panel 40 can emit light having colors corresponding to red, green, blue, and white. The color filter 81 need not be necessarily disposed between the fourth sub-pixel 49W corresponding to white and the image observer. In the image display panel 40, each of the light-emitting components of the self-luminous layer 76 can emit light of corresponding one of the colors of the first, second, third, and fourth sub-pixels 49R, 49G, 49B, and 49W without using the color conversion layer such as the color filter 81. For example, in the image display panel 40, a transparent resin layer may be provided to the fourth sub-pixel 49W in place of the color filter 81 for color adjustment. Providing the transparent resin layer in the image display panel 40 in this manner can restrain a large level difference from being generated in the fourth sub-pixel 49W.

In the present embodiment, each of the sub-pixels 49 includes the lower electrode 75, the self-luminous layer 76, the upper electrode 77, and the color filter 81. The lighting drive circuit 45 is a circuit for lighting the self-luminous layer 76 of the sub-pixel 49, and is not included in the sub-pixel 49. The area of the sub-pixel 49 refers to a region of the color filter 81 inside the black matrix 82. However, if the sub-pixel 49 does not include the color filter 81, the area of the sub-pixel 49 can refer to the area of the lower electrode 75.

The first sub-pixels 49R, the second sub-pixels 49G, the third sub-pixels 49B, and the fourth sub-pixels 49W are arranged in the high-density region 52. The insulating layer 72 in the high-density region 52 is provided with the lighting drive circuits 45R, 45G, 45B, and 45W. The insulating layer 72 is also provided with the pieces of wiring (the scanning lines SCL, the signal lines DTL, and the power supply lines PCL), which are not illustrated, through which signals for driving the sub-pixels 49 flow. The high-density region 52 is not provided with the drive control circuit 60. The lighting drive circuit 45 is electrically coupled to the lower electrode 75 of corresponding one of the sub-pixels 49. The lighting drive circuits 45R, 45G, 45B, and 45W and the pieces of wiring are provided below the respective sub-pixels 49 of the high-density pixel 48A (more specifically, below the self-luminous layer 76). The lighting drive circuits 45R, 45G, 45B, and 45W and the pieces of wiring are not limited to being provided at the insulating layer 72, as long as being provided below the respective sub-pixels 49 of the high-density pixel 48A (more specifically, below the self-luminous layer 76). Although FIG. 6A illustrates only the first and fourth sub-pixels 49R and 49W, the cross-sections of the other sub-pixels 49 have also the same shape.

In the low-density region 54, the first sub-pixels 49R, the second sub-pixels 49G and the third sub-pixels 49B are arranged, but the fourth sub-pixel 49W is not arranged. In the low-density region 54, the insulating layer 72 is provided with the lighting drive circuits 45R, 45G, and 45B, the drive control circuit 60, and the pieces of wiring (the scanning lines SCL, the signal lines DTL, and the power supply lines PCL), which are not illustrated, through which the signals for driving the sub-pixels 49 flow. The lighting drive circuit 45 is electrically coupled to the lower electrode 75 of corresponding one of the sub-pixels 49. In the present embodiment, the drive control circuit 60 is electrically coupled to the lighting drive circuits 45 through the wiring.

The lighting drive circuits 45R, 45G, and 45B, the pieces of wiring, and the drive control circuit 60 are provided below the respective sub-pixels 49 of the low-density pixel 48B (more specifically, below the self-luminous layer 76). More specifically, the drive control circuit 60 is provided at the same layer as that of the lighting drive circuits 45R, 45G, and 45B and the pieces of wiring. However, the drive control circuit 60 may be provided at a layer different from that of the lighting drive circuits 45R, 45G, and 45B and the pieces of wiring. The lighting drive circuits 45R, 45G, and 45B, the drive control circuit 60, and the pieces of wiring are not limited to being provided at the insulating layer 72, as long as being provided below the respective sub-pixels 49 of the low-density pixel 48B (more specifically, below the self-luminous layer 76). Although FIG. 6B illustrates only the first sub-pixels 49R, the cross-sections of the other sub-pixels 49 have also the same shape.

As described above, although the low-density pixel 48B has the same area as the area of the high-density pixel 48A, the low-density region 54 is not provided with the lighting drive circuits 45W. Consequently, the low-density region 54 has more available space than the high-density region 52 by an amount of space free from the lighting drive circuits 45W. The drive control circuit 60 is provided at places in the low-density region 54 where the lighting drive circuits 45W are not arranged so that more space is available.

The arrangement of the drive control circuit 60 has been described above. The self-luminous layer 76 described above includes an organic material, and includes the hole injection layer, the hole transport layer, the light-emitting layer, the electron transport layer, and the electron injection layer, which are not illustrated.

Hole Transport Layer

As a layer that generates positive holes, for example, it is preferable to use a layer including an aromatic amine compound and a substance exhibiting an electron accepting property to the compound. The aromatic amine compound is a substance having an arylamine skeleton. Among aromatic amine compounds, especially preferred is an aromatic amine compound including triphenylamine in the skeleton thereof and having a molecular weight of 400 or more. Among aromatic amine compounds including triphenylamine in the skeleton thereof, especially preferred is an aromatic amine compound including a condensed aromatic ring such as a naphthyl group in the skeleton thereof. When the aromatic amine compound including triphenylamine and a condensed aromatic ring in the skeleton thereof is used, heat resistance of a light emitting element is improved. Specific examples of the aromatic amine compound include, but are not limited to, 4,4'-bis [N-(1-naphthyl)-N-phenylamino] biphenyl (abbreviated as α-NPD), 4,4'-bis [N-(3-methylphenyl)-N-phenylamino] biphenyl (abbreviated as TPD), 4,4',4"-tris (N,N-diphenylamino) triphenylamine (abbreviated as TDATA), 4,4',4"-tris [N-(3-methylphenyl)-N-phenylamino] triphenylamine (abbreviated as MTDATA), 4,4'-bis [N-{4-(N,N-di-m-tolylamino) phenyl}-N-phenylamino] biphenyl (abbreviated as DNTPD), 1,3,5-tris [N,N-di(m-tolyl) amino] benzene (abbreviated as m-MTDAB), 4,4',4"-tris (N-carbazolyl) triphenylamine (abbreviated as TCTA), 2,3-bis (4-diphenylaminophenyl) quinoxaline (abbreviated as TPAQn), 2,2',3,3'-tetrakis (4-diphenylaminophenyl)-6,6'-bisquinoxaline (abbreviated as D-TriPhAQn), 2,3-bis {4-[N-(1-naphthyl)-N-phenylamino] phenyl}-dibenzo [f,h] quinoxaline (abbreviated as NPADiBzQn), etc. The substance exhibiting the electron accepting property to the aromatic amine compound is not specifically limited. For example, molybdenum oxide, vanadium oxide, 7,7,8,8-tetracyanoquinodimethane (abbreviated as TCNQ), and 2,3,5,6-tetrafluoro-7,7,8,8-tetracyanoquinodimethane (abbreviated as F4-TCNQ) can be used as the substance.

Electron Injection Layer and Electron Transport Layer

An electron transport substance is not specifically limited. For example, as the electron transport substance, metal complex such as tris (8-quinolinolato) aluminum (abbreviated as Alq3), tris (4-methyl-8-quinolinolato) aluminum (abbreviated as Almq3), bis (10-hydroxybenzo [h]-quinolinato) beryllium (abbreviated as BeBq2), bis (2-methyl-8-quinolinolato)-4-phenylphenolate-aluminum (abbreviated as BAlq), bis [2-(2-hydroxyphenyl) benzoxazolato] zinc (abbreviated as Zn(BOX)2), and bis [2-(2-hydroxyphenyl) benzothiazolato] zinc (abbreviated as Zn(BTZ)2) can be used, and 2-(4-biphenylyl)-5-(4-tert-butylphenyl)-1,3,4-oxadiazole (abbreviated as PBD), 1,3-bis [5-(p-tert-butylphenyl)-1,3,4-oxadiazole-2-yl] benzene (abbreviated as OXD-7), 3-(4-tert-butylphenyl)-4-phenyl-5-(4-biphenylyl)-1,2,4-triazole (abbreviated as TAZ), 3-(4-tert-butylphenyl)-4-(4-ethylphenyl)-5-(4-biphenylyl)-1,2,4-triazole (abbreviated as p-EtTAZ), bathophenanthroline (abbreviated as BPhen), bathocuproin (abbreviated as BCP), and the like can also be used. A substance exhibiting an electron donating property to the electron transport substance is not specifically limited. For example, an alkali metal such as lithium and cesium, an alkaline-earth metal such as magnesium and calcium, and a rare earth metal such as erbium and ytterbium can be used as the substance. A substance selected from among alkali metal oxides and alkaline-earth metal oxides such as lithium oxide (Li2O), calcium oxide (CaO), sodium oxide (Na2O), potassium oxide (K2O), and magnesium oxide (MgO) may be used as the substance exhibiting the electron donating property to the electron transport substance.

Light-Emitting Layer

For example, to obtain red-based light emission, a substance exhibiting light emission having a peak of emission spectrum in a range from 600 nm to 680 nm can be used, such as 4-dicyanomethylene-2-isopropyl-6-[2-(1,1,7,7-tetramethyljulolidine-9-yl) ethenyl]-4H-pyrane (abbreviated as DCJTI), 4-dicyanomethylene-2-methyl-6-[2-(1,1,7,7-tetramethyljulolidine-9-yl) ethenyl]-4H-pyrane (abbreviated as DCJT), 4-dicyanomethylene-2-tert-butyl-6-[2-(1,1,7,7-tetramethyljulolidine-9-yl) ethenyl]-4H-pyrane (abbreviated as DCJTB), periflanthene, and 2,5-dicyano-1,4-bis [2-(10-methoxy-1,1,7,7-tetramethyljulolidine-9-yl) ethenyl] benzene. To obtain green-based light emission, a substance exhibiting light emission having a peak of emission spectrum in a range from 500 nm to 550 nm can be used, such as N,N'-dimethylquinacridone (abbreviated as DMQd), coumarin 6, coumarin 545T, and tris (8-quinolinolato) aluminum (abbreviated as Alq3). To obtain blue-based light emission, a substance exhibiting light emission having a peak of emission spectrum in a range from 420 nm to 500 nm can be used, such as 9,10-bis (2-naphthyl)-tert-butylanthracene (abbreviated as t-BuDNA), 9,9'-bianthryl, 9,10-diphenylanthracene (abbreviated as DPA), 9,10-bis (2-naphthyl) anthracene (abbreviated as DNA), bis (2-methyl-8-quinolinolato)-4-phenylphenolate-gallium (abbreviated as BGaq), and bis (2-methyl-8-quinolinolato)-4-phenylphenolate-aluminum (abbreviated as BAlq). In addition to the substances that emit fluorescence as described above, substances that emit phosphorescence can also be used as light-emitting substances, such as bis [2-(3,5-bis (trifluoromethyl) phenyl) pyridinato-N,C2'] iridium (III) picolinate (abbreviated as Ir(CF3ppy)2(pic)), bis [2-(4,6-difluorophenyl) pyridinato-N,C2'] iridium (III) acetylacetonate (abbreviated as FIr(acac)), bis [2-(4,6-difluorophenyl) pyridinato-N,C2'] iridium (III) picolinate (FIr(pic)), and tris (2-phenylpyridinato-N,C2') iridium (abbreviated as Ir(ppy) 3).

Configuration of Signal Processing Unit

The following describes the configuration of the signal processing unit 20. The signal processing unit 20 processes the input signals received from the control device 11 to generate output signals. The signal processing unit 20 converts input values of the input signals for displaying a combination of red (first color), green (second color), and blue (third color) to generate reproduction values (output signals) in an expanded color space (HSV color space in the first embodiment) to be reproduced in red (first color), green (second color), blue (third color), and white (fourth color). The signal processing unit 20 outputs the generated output signals to the image display panel driving unit 30. The expanded color space will be described later. In the first embodiment, the expanded color space is the HSV color space, but is not limited thereto, and may be an XYZ color space, a YUV space, or any other coordinate system.

Figure 7:
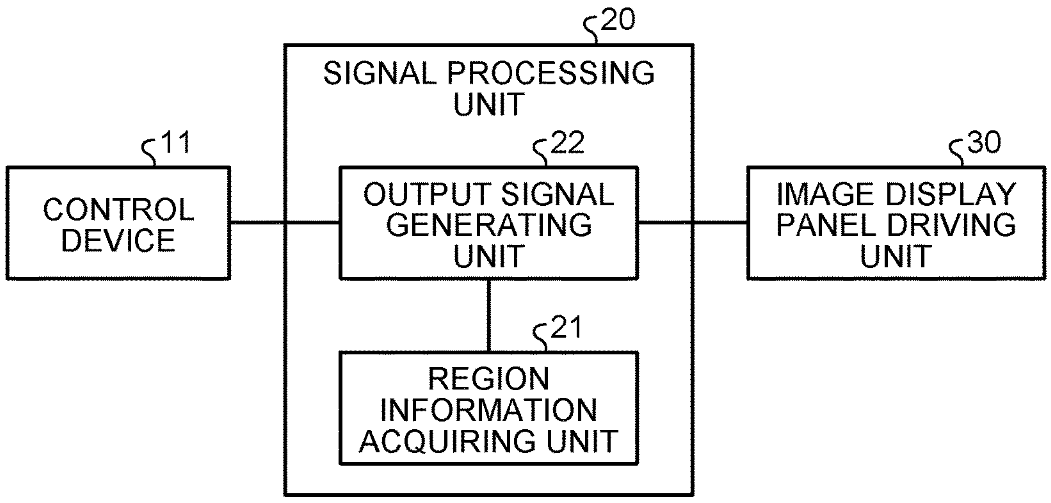
FIG. 7 is a block diagram illustrating a configuration of a signal processing unit according to the first embodiment.

FIG. 7 is a block diagram illustrating the configuration of the signal processing unit according to the first embodiment. As illustrated in FIG. 7, the signal processing unit 20 includes a region information acquiring unit 21 and an output signal generating unit 22. The region information acquiring unit 21 stores information indicating which of all the pixels 48 in the image display panel 40 are the high-density pixels 48A. The output signal generating unit 22 acquires the input signals from the control device 11, and acquires the information indicating which pixels 48 are the high-density pixels 48A from the region information acquiring unit 21. The output signal generating unit 22 applies expansion processing to input signals corresponding to the sub-pixels 49 of the high-density pixels 48A to generate output signals. The output signal generating unit 22 applies ordinary processing (without applying the expansion processing) to input signals corresponding to the sub-pixels 49 of the low-density pixels 48B to generate output signals. The generation processing of the output signals will be described later. The region information acquiring unit 21 may store information indicating which pixels 48 are the low-density pixels 48B.

Processing Operation by Display Device

The following describes a processing operation by the signal processing unit 20. The signal processing unit 20 receives, from the control device 11, the input signals serving as information on an image to be displayed. The input signals include, as an input signal, information for each pixel to display the image (color) in the position of the pixel. Specifically, with respect to a (p,q)-th pixel (where $1 \le p \le I$ and $1 \le q \le Q_0$), the signal processing unit 20 receives signals including an input signal of the first sub-pixel having a signal value of $x_{1-(p,q)}$, an input signal of the second sub-pixel having a signal value of $x_{2-(p,q)}$, and an input signal of the third sub-pixel having a signal value of $x_{3-(p,q)}$. First, based on the information stored in the region information acquiring unit 21, the signal processing unit 20 determines to apply the expansion processing to the high-density pixels 48A, and to apply the ordinary processing to the low-density pixels 48B.

The signal processing unit 20 processes the input signals to generate an output signal (signal value $X_{1-(p,q)}$) of the first sub-pixel for determining the display gradation of the first sub-pixel 49R, an output signal (signal value $X_{2-(p,q)}$) of the second sub-pixel for determining the display gradation of the second sub-pixel 49G, and an output signal (signal value $X_{3-(p,q)}$) of the third sub-pixel for determining the display gradation of the third sub-pixel 49B, and outputs the generated output signals to the image display panel driving unit 30. The signal processing unit 20 processes the input signals to generate an output signal (signal value $X_{4-(p,q)}$) of the fourth sub-pixel for determining the display gradation of the fourth sub-pixel 49W, and outputs the generated output signal to the image display panel driving unit 30. The following specifically describes the generation processing (expansion processing) of the output signals to the high-density pixels 48A.

Figure 8A:
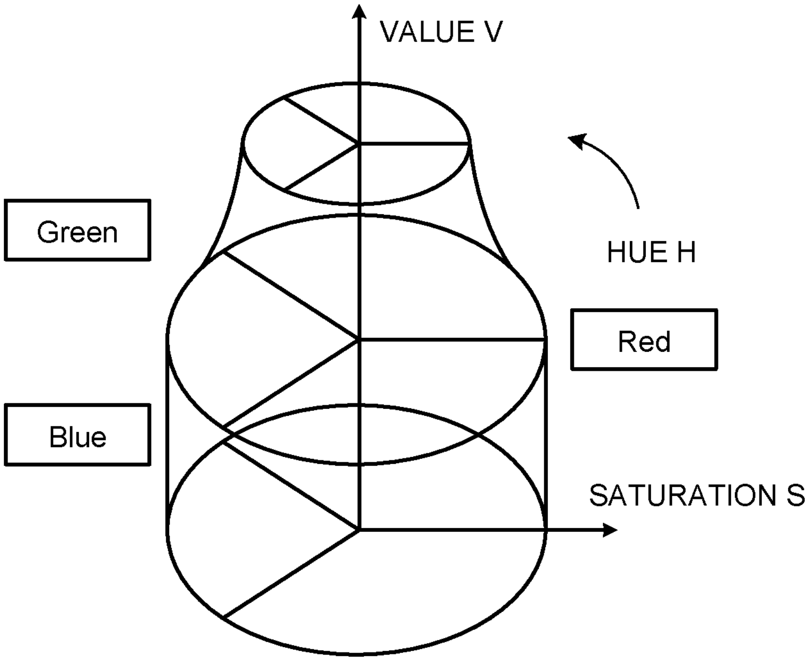
FIG. 8A is a conceptual diagram of an extended HSV color space reproducible by the display device of the first embodiment.
Figure 8B:
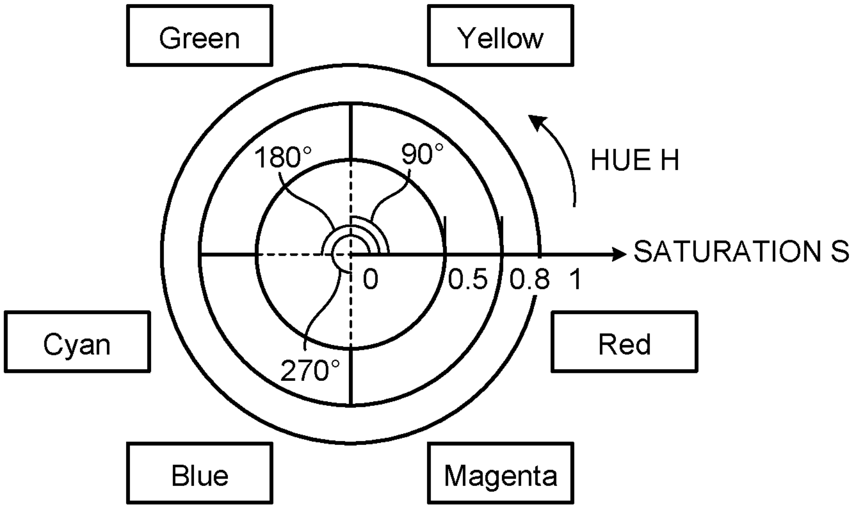
FIG. 8B is a conceptual diagram illustrating a relation between hue and saturation in the extended HSV color space.

FIG. 8A is a conceptual diagram of the extended HSV color space reproducible by the display device of the present embodiment. FIG. 8B is a conceptual diagram illustrating a relation between hue and saturation in the extended HSV color space. In the display device 10, the high-density pixel 48A includes the fourth sub-pixel 49W for outputting the fourth color (white) so as to widen the dynamic range of value (also called brightness) in the reproduced color space (HSV color space in the first embodiment), as illustrated in FIG. 8A. That is, as illustrated in FIG. 8A, the expanded color space reproduced by the display device 10 has a shape obtained by placing a three-dimensional shape on top of a cylindrical color space that can be displayed by the first, second, and third sub-pixels 49R, 49G, and 49B, the three-dimensional shape having a substantially trapezoidal cross-sectional shape that includes the saturation axis and the value axis and has a curved oblique side, and in which the maximum value of the value decreases as the saturation increases. The signal processing unit 20 stores a maximum value Vmax(S) of the value using saturation S as a variable in the expanded color space (HSV color space in the present embodiment) that is expanded by adding the fourth color (white). That is, the signal processing unit 20 stores the maximum value Vmax(S) of the value for each pair of coordinates (coordinate values) of the saturation and the hue regarding the three-dimensional shape of the expanded color space illustrated in FIG. 8A. The input signals are constituted by the input signals of the first, second, and third sub-pixels 49R, 49G, and 49B, so that the color space of the input signals has a cylindrical shape, that is, the same shape as the cylindrical part of the expanded color space.

First, the output signal generating unit 22 of the signal processing unit 20 obtains the saturation S and a value V(S) in the high-density pixel 48A based on the input signal values of the sub-pixels 49 in the high-density pixel 48A, and calculates an expansion coefficient α. The expansion coefficient α is set for each of the high-density pixels 48A.

The saturation S and the value V(S) are represented as S=(Max−Min)/Max and V(S)=Max. The saturation S can take values from 0 to 1, and the value V(S) can take values from 0 to $(2^n-1)$, where n represents the number of bits of the display gradation. Max represents the maximum value among the input signal value of the first sub-pixel 49R, the input signal value of the second sub-pixel 49G, and the input signal value of the third sub-pixel 49B, the input signal values being supplied to the pixel. Min represents the minimum value among the input signal value of the first sub-pixel 49R, the input signal value of the second sub-pixel 49G, and the input signal value of the third sub-pixel 49B, the input signal values being supplied to the pixel.

In general, in the (p,q)-th pixel, the saturation $S_{(p,q)}$ and the value $V(S)_{(p,q)}$ of an input color in the cylindrical HSV color space can be obtained from Expressions (1) and (2) given below based on the input signal (signal value $x_{1-(p,q)}$) of the first sub-pixel, the input signal (signal value $x_{2-(p,q)}$) of the second sub-pixel, and the input signal (signal value $x_{3-(p,q)}$) of the third sub-pixel.

$$S_{(p,q)}=(\mathrm{Max}_{(p,q)}-\mathrm{Min}_{(p,q)})/\mathrm{Max}_{(p,q)} \quad (1)$$

$$V(S)_{(p,q)}=\mathrm{Max}_{(p,q)} \quad (2)$$

In the above expressions, $\mathrm{Max}_{(p,q)}$ represents the maximum value among the input signal values ($x_{1-(p,q)}$, $x_{2-(p,q)}$, and $x_{3-(p,q)}$) of the three sub-pixels 49, and $\mathrm{Min}_{(p,q)}$ represents the minimum value of the input signal values ($x_{1-(p,q)}$, $x_{2-(p,q)}$, and $x_{3-(p,q)}$) of the three sub-pixels 49.

Figure 8C:
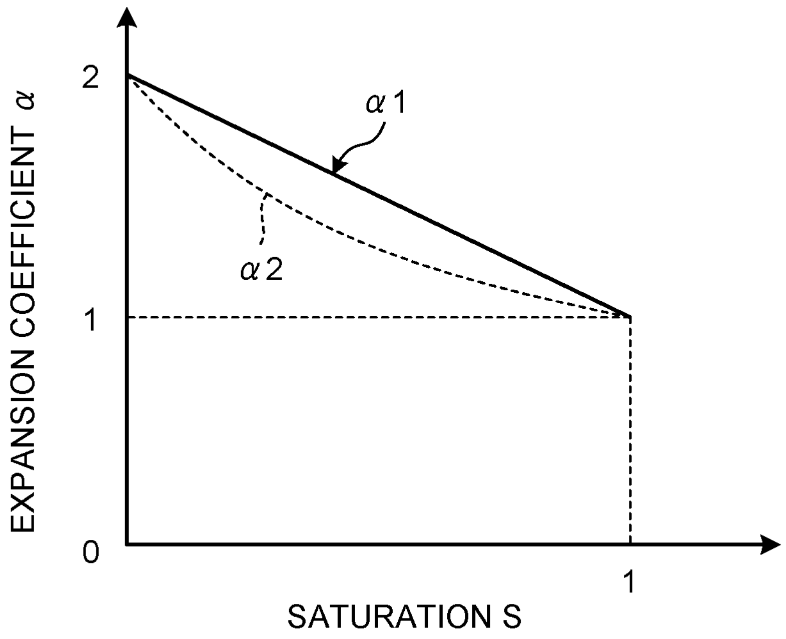
FIG. 8C is a graph illustrating a relation between the saturation and an expansion coefficient.

The output signal generating unit 22 calculates the expansion coefficient α for each of the high-density pixels 48A. The expansion coefficient α is set for each of the high-density pixels 48A. The output signal generating unit 22 calculates the expansion coefficient α so as to change in value corresponding to the saturation S of the input color. More in detail, the output signal generating unit 22 calculates the expansion coefficient α so as to decrease as the saturation S of the input color increases. FIG. 8C is a graph illustrating a relation between the saturation and the expansion coefficient. The horizontal axis of FIG. 8C represents the saturation S of the input color, and the vertical axis thereof represents the expansion coefficient α. As indicated by a line segment α1, the output signal generating unit 22 sets the expansion coefficient α to 2 when the saturation S is 0, reduces the expansion coefficient α as the saturation S increases, and sets the expansion coefficient α to 1 when the saturation S is 1. As indicated by the line segment α1, the expansion coefficient α linearly decreases as the saturation S increases. However, the output signal generating unit 22 is not limited to calculating the expansion coefficient α according to the line segment α1, but only needs to calculate the expansion coefficient α so as to decrease as the saturation S of the input color increases. For example, the output signal generating unit 22 may calculate the expansion coefficient α so as to decrease in a quadratic curve-like manner as the saturation increases, as indicated by a line segment α2 in FIG. 8C. When the saturation S is 0, the expansion coefficient α is not limited to being set to 2, but can be set to any value, for example, through setting based on the luminance of the fourth sub-pixel 49W. Moreover, the output signal generating unit 22 may set the expansion coefficient α to be constant regardless of the saturation of the input color.

After calculating the expansion coefficient α, the output signal generating unit 22 calculates a fourth sub-pixel minimum value W. In the present embodiment, the output signal generating unit 22 calculates the fourth sub-pixel minimum value W based on the input signal (signal value $x_{1-(p,q)}$) of the first sub-pixel, the input signal (signal value $x_{2-(p,q)}$) of the second sub-pixel, and the input signal (signal value $x_{3-(p,q)}$) of the third sub-pixel, and also on the expansion coefficient α and correction values $W_R$, $W_G$, and $W_B$. The correction values $W_R$, $W_G$, and $W_B$ are correction values for displaying a white point (white color) serving as a target. The white point serving as the target is set in advance based on a color temperature of, for example, D65 or D93. Also, the correction values $W_R$, $W_G$, and $W_B$ are values set in advance. More specifically, the output signal generating unit 22 calculates the fourth sub-pixel minimum value W based on Expression (3) below.

$$W=\mathrm{Min}(W_R \cdot x_{1-(p,q)}, W_G x_{2-(p,q)}, W_B x_{3-(p,q)})\cdot\alpha \tag{3}$$

That is, the output signal generating unit 22 calculates the minimum value among the product of the input signal value $x_{1-(p,q)}$ of the first sub-pixel and the correction value $W_R$, the product of the input signal value $x_{2-(p,q)}$ of the second sub-pixel and the correction value $W_G$, and the product of the input signal value $x_{3-(p,q)}$ of the third sub-pixel and the correction value $W_B$. The output signal generating unit 22 then calculates the product of the minimum value and the expansion coefficient α as the fourth sub-pixel minimum value W.

The output signal generating unit 22 then calculates the output signal value $x_{4-(p,q)}$ of the fourth sub-pixel based on the value of the fourth sub-pixel minimum value W. Specifically, letting a predetermined value β be a value represented by Expression (4) below, if the fourth sub-pixel minimum value W is a value equal to or greater than the predetermined value β, the output signal generating unit 22 calculates the output signal value $x_{4-(p,q)}$ of the fourth sub-pixel based on Expression (5A).

$$\beta=\mathrm{Min}(W_R, W_G, W_B)\cdot\chi \tag{4}$$

$$X_{4-(p,q)}=2^n-1 \tag{5A}$$

In the above expressions, χ represents a constant dependent on the display device 10. No color filter is provided to the fourth sub-pixel 49W that displays white. The fourth sub-pixel 49W that displays the fourth color is brighter than the first sub-pixel 49R for displaying the first color, the second sub-pixel 49G for displaying the second color, and the third sub-pixel 49B for displaying the third color, when lit up at the same light source light quantity. $BN_{1-3}$ denotes the luminance of a set of the first, second, and third sub-pixels 49R, 49G, and 49B included in the pixel 48 or a group of pixels 48 when a signal having a value corresponding to the maximum signal value of the output signal of the first sub-pixel 49R is supplied to the first sub-pixel 49R, a signal having a value corresponding to the maximum signal value of the output signal of the second sub-pixel 49G is supplied to the second sub-pixel 49G, and a signal having a value corresponding to the maximum signal value of the output signal of the third sub-pixel 49B is supplied to the third sub-pixel 49B. Suppose that $BN_4$ denotes the luminance of the fourth sub-pixel 49W when a signal having a value corresponding to the maximum signal value of the output signal of the fourth sub-pixel 49W is supplied to the fourth sub-pixel 49W included in the pixel 48 or a group of pixels 48. That is, the set of the first, second, and third sub-pixels 49R, 49G, and 49B display white at the maximum luminance, and $BN_{1-3}$ denotes the luminance of the white. Thus, assuming that χ is a constant dependent on the display device 10, the constant χ is represented as $\chi=BN_4/BN_{1-3}$.

Specifically, the luminance $BN_4$ when the input signal having a value of display gradation of 255 is assumed to be supplied to the fourth sub-pixel 49W is, for example, 1.5 times the luminance $BN_{1-3}$ of white when the input signals having the following values of display gradation are supplied to the set of the first, second, and third sub-pixels 49R, 49G, and 49B: the signal value $x_{1-(p,q)}$ of 255, the signal value $x_{2-(p,q)}$ of 255, and the signal value $x_{3-(p,q)}$ of 255. That is, χ=1.5 in the first embodiment.

In the first embodiment, n=8. That is, the number of bits of the display gradation is 8 (the value of the display gradation is from 0 to 255, giving a total of 256 gradations).

As represented by Expression (4) above, the predetermined value β is the product of the minimum value of the correction values $W_R$, $W_G$, and $W_B$ and χ. As represented by Expression (5A) above, if the fourth sub-pixel minimum value W is a value equal to or greater than the predetermined value β, the output signal generating unit 22 sets the output signal value $x_{4-(p,q)}$ of the fourth sub-pixel to the maximum gradation value (255 in the present embodiment).

If the fourth sub-pixel minimum value W is a value smaller than the predetermined value β, the output signal generating unit 22 calculates the output signal value $x_{4-(p,q)}$ of the fourth sub-pixel based on Expression (5B) below.

$$X_{4-(p,q)}=W/\chi \tag{5B}$$

The output signal generating unit 22 calculates the output signal value $x_{4-(p,q)}$ of the fourth sub-pixel, as described above. After calculating the output signal value $x_{4-(p,q)}$ of the fourth sub-pixel, the output signal generating unit 22 calculates the output signal (signal value $X_{1-(p,q)}$ of the first sub-pixel based on at least the input signal (signal value $x_{1-(p,q)}$) of the first sub-pixel and the expansion coefficient α for the high-density pixel 48A including the first sub-pixel. The output signal generating unit 22 also calculates the output signal (signal value $X_{2-(p,q)}$) of the second sub-pixel based on at least the input signal (signal value $x_{2-(p,q)}$) of the second sub-pixel and the expansion coefficient α for the high-density pixel 48A including the second sub-pixel. The output signal generating unit 22 further calculates the output signal (signal value $X_{3-(p,q)}$) of the third sub-pixel based on at least the input signal (signal value $x_{3-(p,q)}$ ) of the third sub-pixel and the expansion coefficient α for the high-density pixel 48A including the third sub-pixel.

Specifically, if the fourth sub-pixel minimum value W is a value equal to or greater than the predetermined value β, the output signal generating unit 22 calculates the output signal value $X_{1-(p,q)}$ of the first sub-pixel, the output signal value $X_{2-(p,q)}$ of the second sub-pixel, and the output signal value $X_{3-(p,q)}$ of the third sub-pixel based on Expressions (6A), (7A), and (8A) given below.

$$X_{1-(p,q)}=(\alpha\cdot x_{1-(p,q)}\cdot W_R-\beta)/W_R \tag{6A}$$

$$X_{2-(p,q)}=(\alpha\cdot x_{2-(p,q)}\cdot W_G-\beta)/W_G \tag{7A}$$

$$X_{3-(p,q)}=(\alpha\cdot x_{3-(p,q)}\cdot W_B-\beta)/W_B \tag{8A}$$

If the fourth sub-pixel minimum value W is a value smaller than the predetermined value β, the output signal generating unit 22 calculates the output signal value $X_{1-(p,q)}$ of the first sub-pixel, the output signal value $X_{2-(p,q)}$ of the second sub-pixel, and the output signal value $X_{3-(p,q)}$ of the third sub-pixel based on Expressions (6B), (7B), and (8B) given below.

$$X_{1-(p,q)}=(\alpha\cdot x_{1-(p,q)}\cdot W_R-W)/W_R \tag{6B}$$

$$X_{2-(p,q)}=(\alpha\cdot x_{2-(p,q)}\cdot W_G-W)/W_G \tag{7B}$$

$$X_{3-(p,q)}=(\alpha\cdot x_{3-(p,q)}\cdot W_B-W)/W_B \tag{8B}$$

In this manner, the signal processing unit 20 performs the expansion processing described above to generate the output signals of the sub-pixels 49 in the high-density pixel 48A. The following describes a summary of a method for obtaining the signal values $X_{1-(p,q)}$, $X_{2-(p,q)}$, $X_{3-(p,q)}$, and $X_{4-(p,q)}$ serving as the output signals of the (p,q)-th high-density pixel 48A (expansion processing). The following processing is performed so as to maintain a ratio among the luminance of the first primary color displayed by (the first sub-pixel 49R+the fourth sub-pixel 49W), the luminance of the second primary color displayed by (the second sub-pixel 49G+the fourth sub-pixel 49W), and the luminance of the third primary color displayed by (the third sub-pixel 49B+the fourth sub-pixel 49W). The processing is performed so as to also keep (maintain) color tone. The processing is performed so as to keep (maintain), in addition, a gradation-luminance characteristic (gamma characteristic, or $\gamma$ characteristic). If all the input signal values are 0 or small in any pixel 48 or any group of pixels 48, the expansion coefficient $\alpha$ only needs to be obtained without including such a pixel 48 or such a group of pixels 48.

First Step

First, the signal processing unit 20 obtains the saturation S and the value V of each of the high-density pixels 48A based on the input signal values of the sub-pixels 49 in the high-density pixel 48A, and calculates the expansion coefficient $\alpha$ for each of the high-density pixels 48A.

Second Step

Then, the signal processing unit 20 calculates the fourth sub-pixel minimum value W based on Expression (3) given above.

Third Step

The signal processing unit 20 calculates the output signal value $X_{4-(p,q)}$ of the fourth sub-pixel based on the value of the fourth sub-pixel minimum value W. Specifically, if the fourth sub-pixel minimum value W is a value equal to or greater than the predetermined value $\beta$, the signal processing unit 20 sets the output signal value $X_{4-(p,q)}$ to the maximum gradation value (255, here), as represented by Expression (4A). If the fourth sub-pixel minimum value W is a value smaller than the predetermined value $\beta$, the signal processing unit 20 sets the output signal value $X_{4-(p,q)}$ to $W/\chi$, as represented by Expression (4B).

Fourth Step

Then, if the fourth sub-pixel minimum value W is a value equal to or greater than the predetermined value $\beta$, the signal processing unit 20 calculates the output signal value $X_{1-(p,q)}$ of the first sub-pixel, the output signal value $X_{2-(p,q)}$ of the second sub-pixel, and the output signal value $X_{3-(p,q)}$ of the third sub-pixel based on Expressions (6A), (7A), and (8A). If the fourth sub-pixel minimum value W is a value smaller than the predetermined value $\beta$, the signal processing unit 20 calculates the output signal value $X_{1-(p,q)}$ of the first sub-pixel, the output signal value $X_{2-(p,q)}$ of the second sub-pixel, and the output signal value $X_{3-(p,q)}$ of the third sub-pixel based on Expressions (6B), (7B), and (8B).

The signal processing unit 20 performs the expansion processing through the steps described above to generate the output signals of the sub-pixels 49 in the high-density pixel 48A.

The following describes generation of output signals of the low-density pixel 48B by the ordinary processing. The ordinary processing is processing to provide the input signal values of the first sub-pixels 49R, the second sub-pixels 49G and the third sub-pixels 49B in the low-density pixel 48B as the output signal values of the first sub-pixels 49R, the second sub-pixels 49G and the third sub-pixels 49B in the low-density pixel 48B without modification. That is, in the ordinary processing, the output signal value $X_{1-(p,q)}$ of the first sub-pixel 49R is unchanged from the input signal value $x_{1-(p,q)}$ of the first sub-pixel 49R, the output signal value $X_{2-(p,q)}$ of the second sub-pixel 49G is unchanged from the input signal value $x_{2-(p,q)}$ of the second sub-pixel 49G, and the output signal value $X_{3-(p,q)}$ of the third sub-pixel 49B is unchanged from the input signal value $x_{3-(p,q)}$ of the third sub-pixel 49B.

As described above, in the display device 10 according to the first embodiment, the pixels 48 including the sub-pixels 49 having the self-luminous layer 76 are arranged in a two-dimensional matrix. That is, the display device 10 is a self-luminous display device. The display device 10 includes the low-density region 54 including the low-density pixels 48B, the high-density region 52 including the high-density pixels 48A, and the lighting drive circuits 45 for lighting the self-luminous layer 76. The high-density pixel 48A is larger in the number of the sub-pixels 49 than the low-density pixel 48B.

The high-density pixel 48A is larger in the number of the sub-pixels 49 than the low-density pixel 48B. Consequently, the high-density region 52 is larger in the number of pieces of wiring than the low-density region 54. However, being a self-luminous display device, the display device 10 displays an image by causing the sub-pixels to emit light without emitting light from the backside. This configuration prevents light from being shielded by the wiring, so that the display device 10 can restrain reduction in the aperture ratio of the high-density region 52, and can reduce the difference in the aperture ratio between the high-density region 52 and the low-density region 54. In more detail, the aperture ratio mentioned herein can be referred to as an opening area for one sub-pixel 49. Accordingly, for example, in the case of a backlight liquid crystal display device, a larger area of the sub-pixels 49 is shielded by the wiring in the high-density pixel 48A having a larger number of pieces of wiring than the sub-pixels 49 in the low-density pixel 48B. So the opening area is smaller for the sub-pixels 49 in the high-density pixel 48A that for the sub-pixels 49 in the low-density pixel 48B in the case of the backlight liquid crystal display device. In addition as described above, the area of the sub-pixels 49 in the high-density pixel 48A is smaller than the area of the sub-pixels 49 in the low-density pixel 48B. Consequently, the difference in opening area between the sub-pixels 49 in the high-density pixel 48A and those in the low-density pixel 48B further increases, in some cases. In the display device 10, however, light is not shielded by the wiring, so that the difference in opening area (aperture ratio) between the sub-pixels 49 in the high-density pixel 48A having a larger number of pieces of wiring and those in the low-density pixel 48B can be restrained from being large. As a result, the display device 10 reduces the difference in brightness of the image between the regions, and restrains the display quality from deteriorating. In addition, being a self-luminous display device, the display device 10 can restrain the reduction in the life thereof along with the reduction in the deterioration of the display quality. Furthermore, since including the low-density pixels 48B, the display device 10 can have a smaller number of pieces of wiring than in the case in which all the pixels 48 of the display device 10 serve as the high-density pixels 48A, so that the region around the image display surface can be restrained from widening.

The sub-pixels 49 receive the signals for driving the sub-pixels 49 through the wiring (the scanning lines SCL, the signal lines DTL, and the power supply lines PCL). The wiring is provided below the self-luminous layer 76 with respect to the image display surface 50. Consequently, in the display device 10, light traveling outward from the self-luminous layer 76 does not travel toward the wiring. Due to this, the display device 10 more desirably restrains the light from being shielded by the wiring, and thus, more desirably reduces the deterioration of the display quality.

The low-density region 54 is provided with the drive control circuit 60 for controlling driving of the lighting drive circuits 45. The high-density region 52 is not provided with the drive control circuit 60. The number of the sub-pixels 49 is smaller in the low-density pixel 48B than in the high-density pixel 48A. Consequently, the numbers of the pierces of wiring and the lighting drive circuits for driving the sub-pixels 49 are smaller in the low-density region 54 than in the high-density region 52. In other words, the low-density region 54 has more available space than the high-density region 52. In the display device 10 according to the present embodiment, the drive control circuit 60 that is conventionally not allowed to be disposed in the area of the image display surface 50 is disposed in the low-density regions 54 that can display images. Consequently, the display device 10 according to the present embodiment can increase the ratio occupied by the image display surface 50 in the image display panel 40, and thus can relatively enlarge the image display surface 50.

The drive control circuit 60 is provided below the self-luminous layer 76 with respect to the image display surface 50. Consequently, the display device 10 can relatively enlarge the image display surface 50 while restraining the light from being shielded by the drive control circuit 60, and thus reducing the deterioration of the display quality. In the present embodiment, the drive control circuit 60 includes the scanning circuit 32 that sequentially selects the sub-pixels 49 to light the self-luminous layer 76. This display device allows the scanning circuit 32 to be disposed in the low-density region 54, and thereby can relatively enlarge the image display surface 50. The drive control circuit 60 in the present embodiment is constituted by the scanning circuit 32 and the power supply circuit 33. However, any circuits can be selected as the drive control circuit 60, as long as being a different circuit from the lighting drive circuit 45, and controlling the driving of the image display panel 40.

The high-density region 52 is provided at the center of the image display surface 50, and the low-density region 54 is provided at both ends of the high-density region 52 in the area of the image display surface 50. Since the low-density region 54 is provided at both ends of the high-density region 52, the display device 10 can appropriately control the sub-pixels 49 in the high-density region 52 and the low-density region 54, using the drive control circuit 60 provided in the low-density region 54. The low-density region 54 is not limited to being positioned as described above, but can be positioned as desired. For example, the low-density region 54 may be provided at only one end of the high-density region 52. That is, the low-density region 54 may include, for example, the low-density region 54A alone without including the low-density region 54B.

The image display surface 50 occupies the entire range along the X-direction (predetermined direction) of the image display panel 40. That is, the image display panel 40 has the image display surface 50 up to both ends in the X-direction, and does not have frame portions that display no image at both ends in the X-direction. With this image display surface 50, for example, in a tiled display in which a plurality of such image display panels 40 are arranged to display one image, the display device 10 can restrain boundaries arranged in the X-direction in the image from being visible, and thus can improve visual quality. In the present embodiment, the X-direction corresponds to the row direction, and the Y-direction corresponds to the column direction. However, the X-direction and the Y-direction may correspond to any directions. For example, the X-direction may correspond to the column direction, and the Y-direction may correspond to the row direction.

Second Embodiment

The following describes a second embodiment of the present invention. A display device 10*a* according to the second embodiment differs from the display device of the first embodiment in that the image display surface does not occupy the entire range along the X-direction of the image display panel 40. No description will be given of portions of the second embodiment common to those of the first embodiment.

Figure 9:
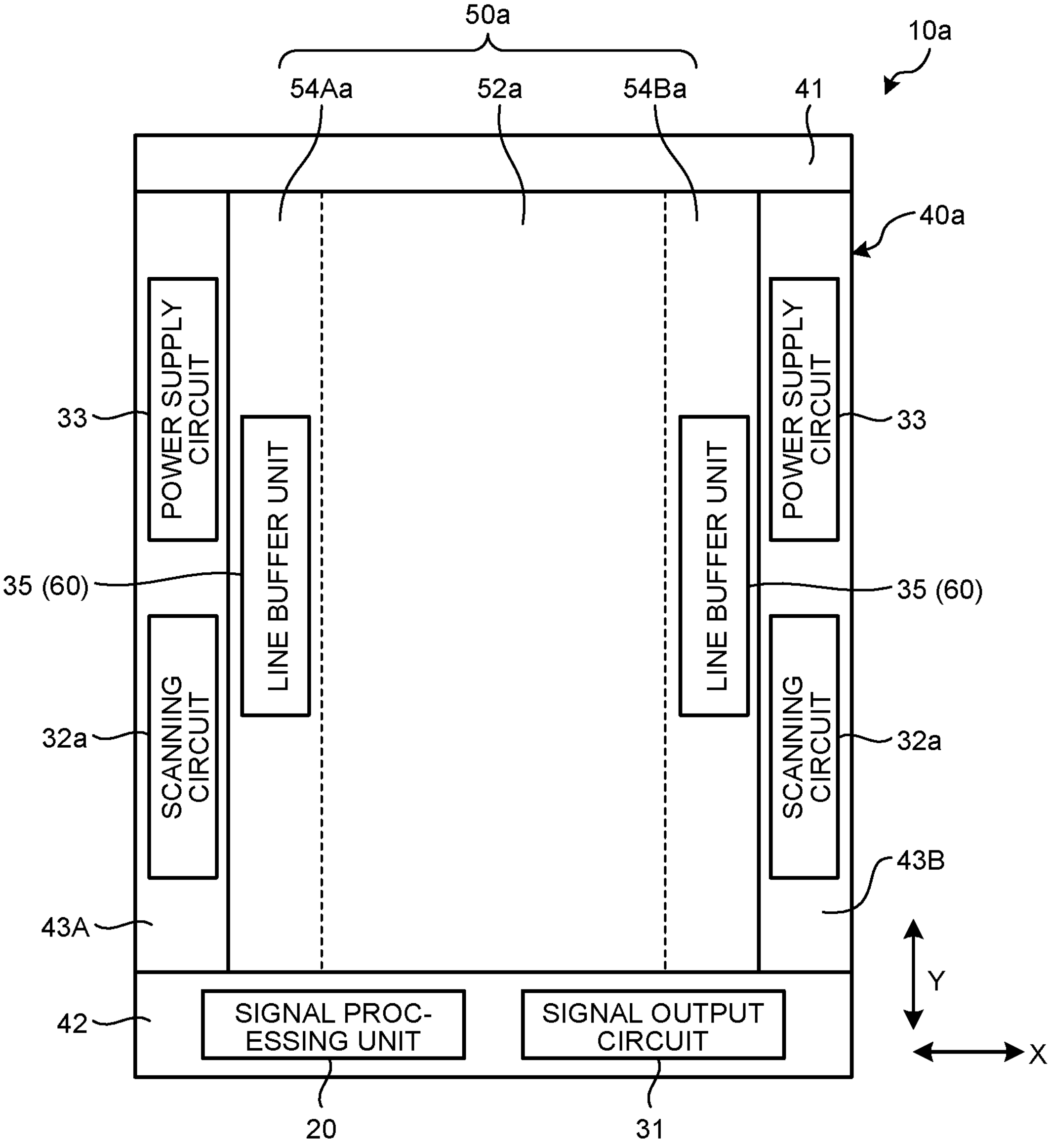
FIG. 9 is a schematic diagram schematically illustrating a configuration of an image display panel according to a second embodiment of the present invention.

FIG. 9 is a schematic diagram schematically illustrating a configuration of an image display panel according to the second embodiment. As illustrated in FIG. 9, this image display panel 40*a* included in the display device 10*a* includes an image display surface 50*a* and frame portions 43A and 43B. The image display surface 50*a* is located at the center in the X-direction of the image display panel 40*a*, and the frame portions 43A and 43B are provided adjacent in the X-direction to both ends of the image display surface 50*a*. In the same manner as in the first embodiment, the image display surface 50*a* includes a high-density region 52*a* and low-density regions 54Aa and 54Ba.

The frame portions 43A and 43B are portions that do not include the pixels 48 and do not display any image. The frame portions 43A and 43B may be covered with, for example, a material different from that of the surface of the image display panel 40. The frame portions 43A and 43B may have the same material as that of the surface of the image display panel 40 and be light-shielded by a black matrix. A scanning circuit 32*a* and the power supply circuit 33 are embedded in the frame portions 43A and 43B. The scanning circuit 32*a* is a circuit obtained by removing the line buffer unit 35 from the scanning circuit 32 according to the first embodiment. That is, the scanning circuit 32*a* includes the shift register unit 34.

The low-density region 54*a* (low-density regions 54Aa and 54Ba) includes the line buffer unit 35 as the drive control circuit 60. The line buffer unit 35 serving as the drive control circuit 60 is disposed in the same manner as in the first embodiment, and is provided below the respective sub-pixels 49 of the low-density pixel 48B (more specifically, below the self-luminous layer 76). The low-density region 54*a* may include any circuit other than the line buffer unit 35, provided that the circuit controls the driving of the image display panel 40.

As illustrated above in the second embodiment, the image display surface 50*a* need not occupy the entire range along the X-direction of the image display panel 40. The low-density region 54*a* (low-density regions 54Aa and 54Ba) may include any circuit that includes, for example, the line buffer unit 35 serving as a part of the scanning circuit 32, provided that the circuit controls the driving of the image display panel 40.

Third Embodiment

The following describes a third embodiment of the present invention. A display device 10*b* according to the third embodiment differs from the display device of the second embodiment in the position of the low-density region, and in not including any circuit in the low-density region. No description will be given of portions of the third embodiment common to those of the second embodiment.

Figure 10:
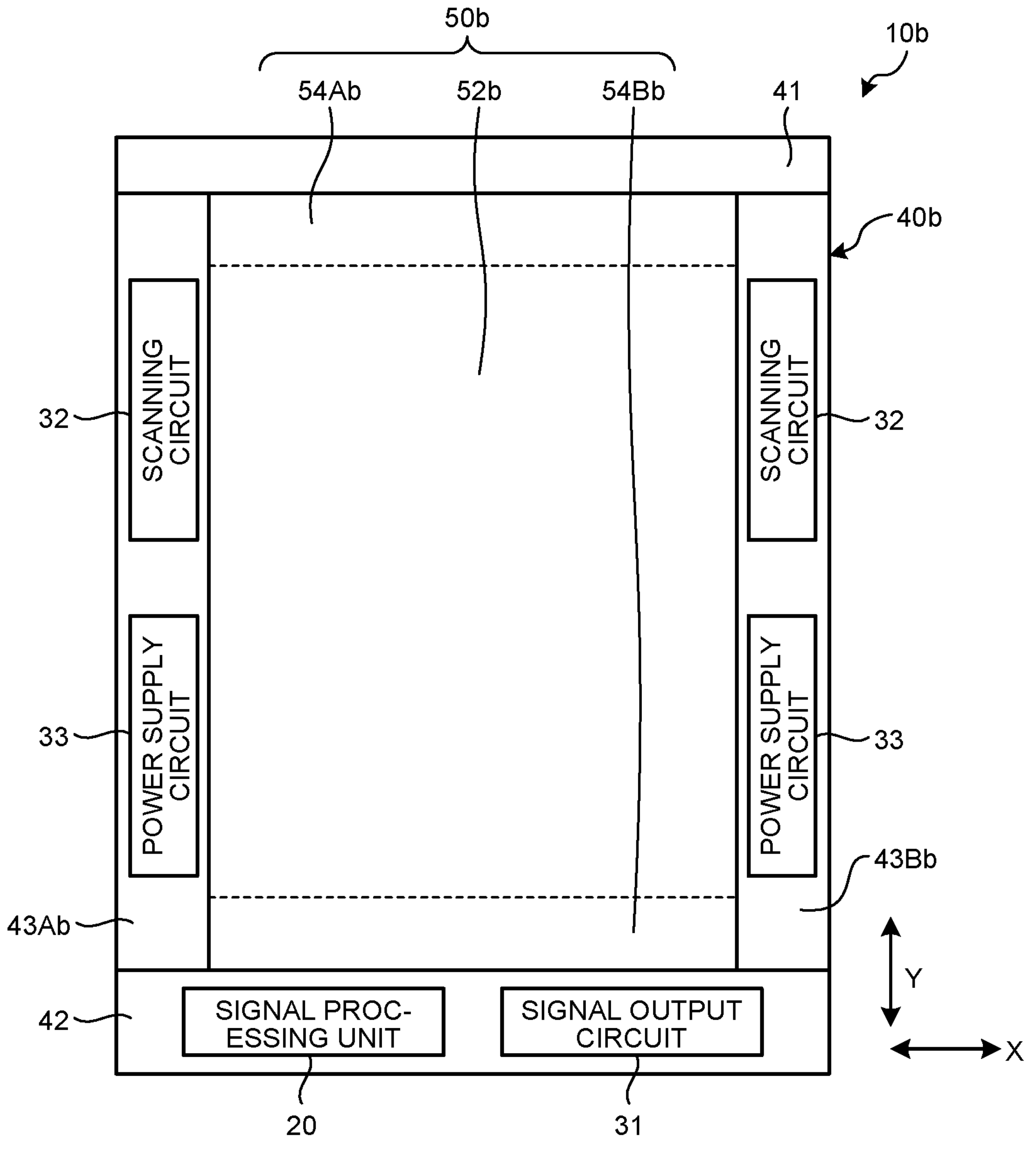
FIG. 10 is a schematic diagram schematically illustrating a configuration of an image display panel according to a third embodiment of the present invention.

FIG. 10 is a schematic diagram schematically illustrating a configuration of an image display panel according to the third embodiment. As illustrated in FIG. 10, this image display panel 40*b* included in the display device 10*b* includes an image display surface 50*b* and frame portions 43Ab and 43Bb. The image display surface 50*b* is located at the center in the X-direction of the image display panel 40*b*, and the frame portions 43Ab and 43Bb are provided adjacent in the X-direction to both ends of the image display surface 50*b*.

The scanning circuit 32 and the power supply circuit 33 are embedded in the frame portions 43Ab and 43Bb. That is, the frame portions 43Ab and 43Bb according to the third embodiment include also the line buffer unit 35, unlike in the second embodiment.

The image display surface 50*b* is partitioned into a high-density region 52*b* and low-density regions 54Ab and 54Bb. The high-density region 52*b* is located at the center in the X-direction and the Y-direction of the image display surface 50. The low-density regions 54Ab and 54Bb are located on both ends in the Y-direction of the high-density region 52*b*, and are adjacent to the high-density region 52*b*. Specifically, the high-density region 52*b* is rectangular. The low-density region 54Ab is adjacent to one side in the Y-direction of the high-density region 52*b* so as to extend along the X-direction from one end to the other end of the side. The low-density region 54Bb is adjacent to the other side in the Y-direction of the high-density region 52 so as to extend along the X-direction from one end to the other end of the other side. Unlike in the second embodiment, the low-density region 54*b* (low-density regions 54Ab and 54Bb) does not include the drive control circuit 60.

Figure 11:
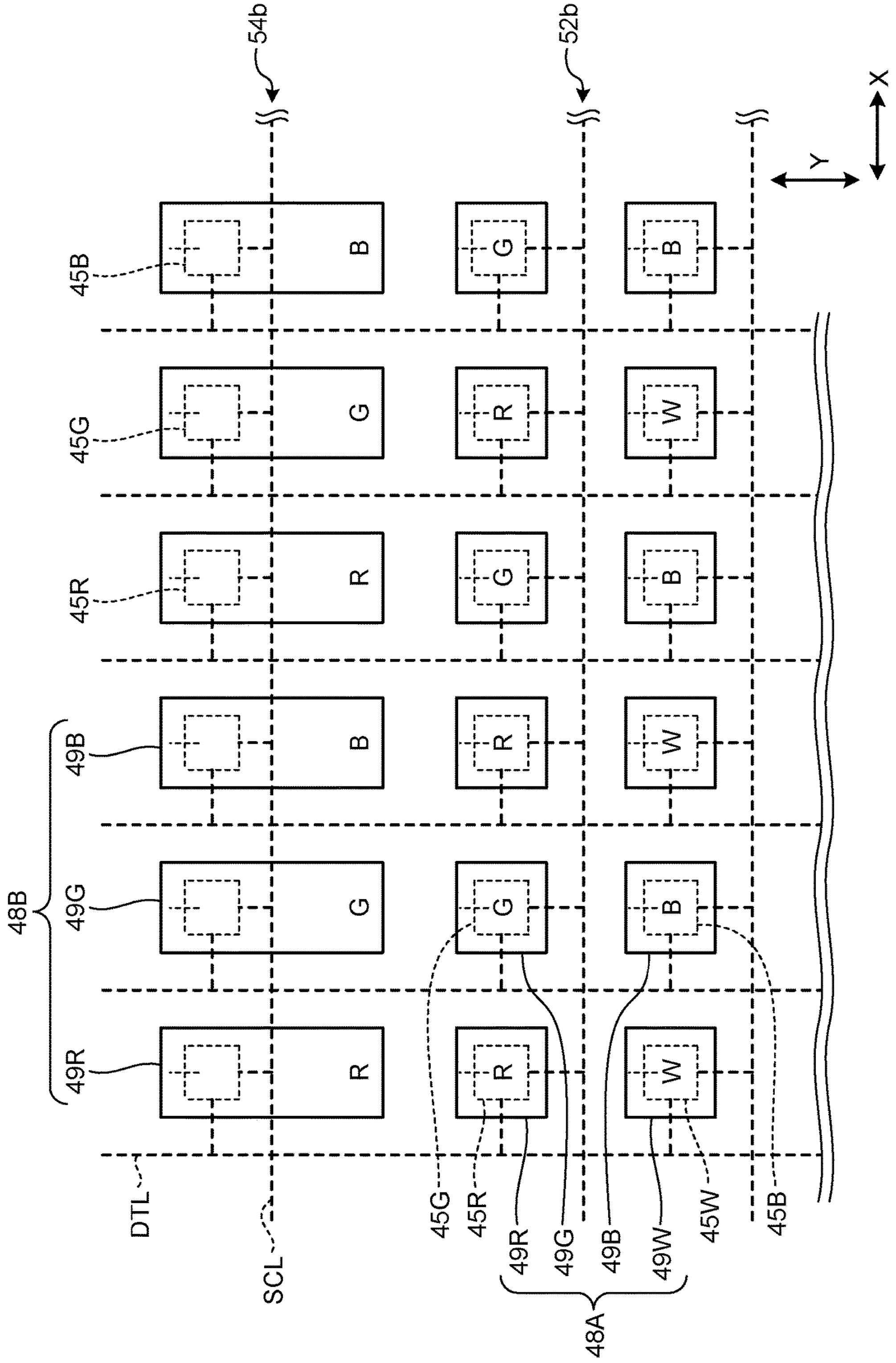
FIG. 11 is an explanatory diagram schematically explaining wiring of a circuit over a low-density region and a high-density region in the third embodiment.

FIG. 11 is an explanatory diagram schematically explaining wiring of a circuit over the low-density region and the high-density region in the third embodiment. As illustrated in FIG. 11, the low-density region 54*b* includes the pieces of wiring (the signal lines DTL and the scanning lines SCL) and the low-density pixels 48B. The drive control circuit 60 is not disposed in the low-density region 54*b*. The high-density region 52*b* includes the pieces of wiring (the signal lines DTL and the scanning lines SCL) and the high-density pixels 48A.

In this manner, the low-density region 54*b* need not include the drive control circuit 60, as long as including the low-density pixels 48B. Also, in such a case, the light is not shielded by the wiring, so that the display device 10*b* can restrain reduction in the aperture ratio of the high-density region 52*b*, and thus can reduce the deterioration of the display quality. The display device 10*b* is desirably used, for example, in a smartphone. For example, in the smartphone, the low-density region 54*b* of the image display surface 50*b* displays, for example, a status bar indicating time and a battery consumption amount. Such items are generally displayed as fixed patterns or icons for a long time. Consequently, in the low-density region 54*b* in which such fixed display is performed, deterioration of the pixels is likely to progress, and thus, the life of the pixels may decrease, for example, because a constant amount of current continuously flows. The current consumption of the low-density pixel 48B having a higher aperture ratio can be lower than that of a pixel having a lower aperture ratio, when the pixels are driven to emit light at the same luminance as each other. Consequently, the low-density pixel 48B having a high aperture ratio can be said to be capable of reducing the current consumption, and thus to have a long life. The display device 10*b* uses the low-density pixels 48B having a long life in the low-density region 54*b* in which the life of the pixels tends to be short. Due to this, the life of the display device 10*b* can be restrained from decreasing.

In the present embodiment, the low-density region 54*b* is located at both ends in the Y-direction, but may also be arranged at both ends in the X-direction. In this case, the drive control circuit 60 is provided in the low-density region 54*b* arranged at both ends in the X-direction, in the same manner as in the first embodiment. Such a configuration can relatively enlarge the image display surface 50 (reduce the widening of the region around the image display surface) by providing the low-density region 54*b* arranged at both ends in the X-direction, while restraining the reduction in the life by providing the low-density region 54*b* located at both ends in the Y-direction, as described above.

Fourth Embodiment

The following describes a fourth embodiment of the present invention. A display device 10*c* according to the fourth embodiment differs from the display device of the third embodiment in the arrangement of the low-density region, and in that sensors are arranged in the low-density region. No description will be given of portions of the fourth embodiment common to those of the third embodiment.

Figure 12:
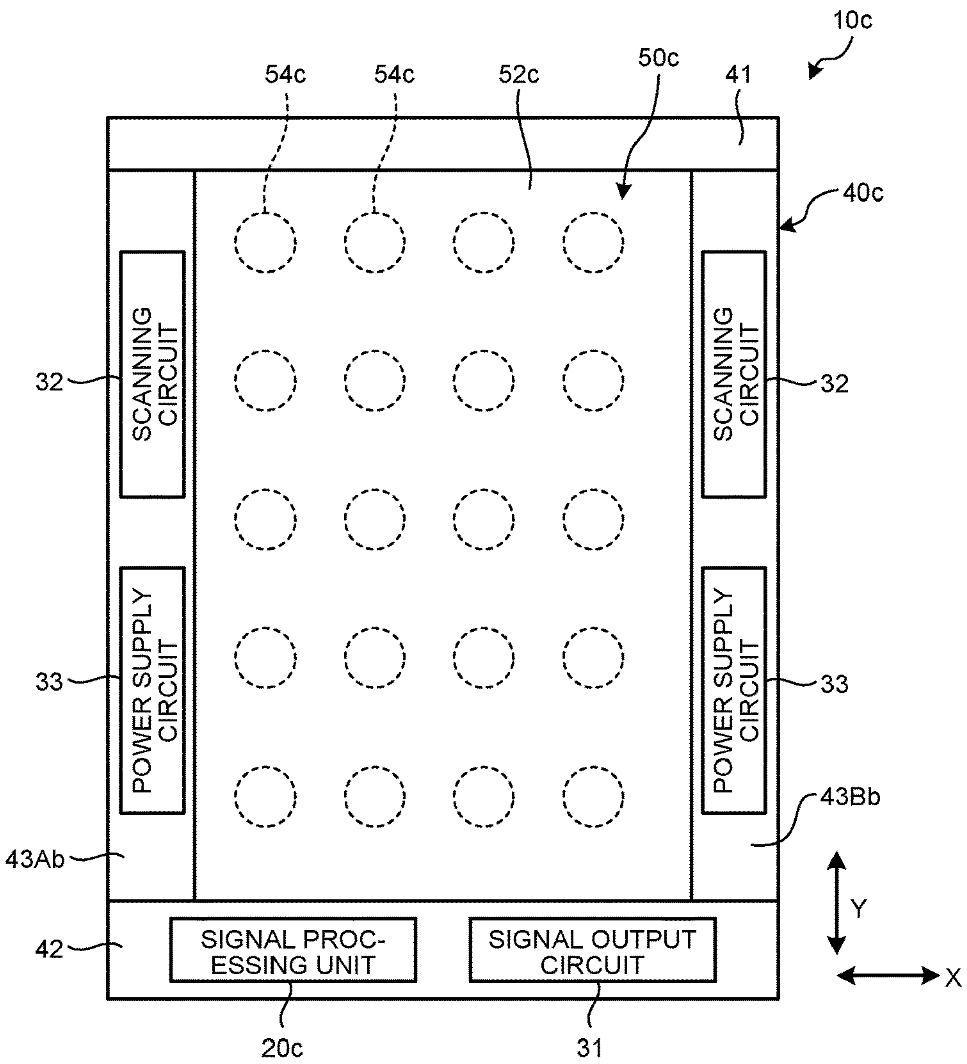
FIG. 12 is a schematic diagram schematically illustrating a configuration of an image display panel according to a fourth embodiment of the present invention.

FIG. 12 is a schematic diagram schematically illustrating a configuration of an image display panel according to the fourth embodiment. As illustrated in FIG. 12, this image display panel 40*c* included in the display device 10*c* includes frame portions 41, 42, 43Ab, and 43Bb and an image display surface 50*c*. The image display surface 50*c* is disposed in the same manner as the image display surface 50*b* of the third embodiment.

As illustrated in FIG. 12, the image display panel 40*c* includes a high-density region 52*c* and a low-density region 54*c*. The low-density region 54*c* is arranged in the high-density region 52*c*. More specifically, the high-density region 52*c* is provided over the entire area of the image display surface 50*c*, and is adjacent to the frame portions 41, 42, 43Ab, and 43Bb. A plurality of such low-density regions 54*c* are provided at intervals of a predetermined distance with one another in the high-density region 52*c*, and are scattered in the high-density region 52*c*. The shape, area, and number of the low-density regions 54*c* are optional, provided that the low-density regions 54*c* are arranged in the high-density region 52*c*.

Figure 13:
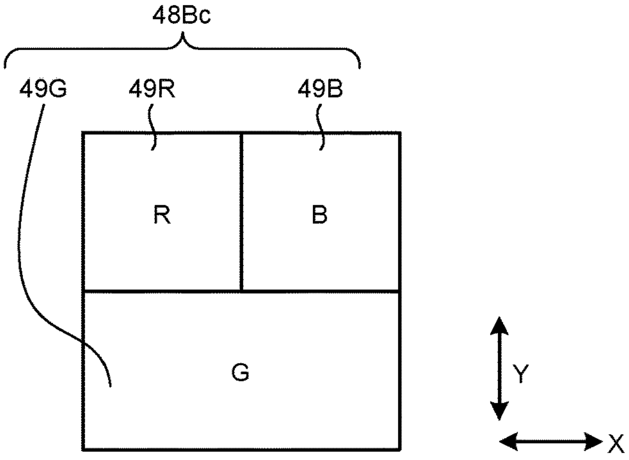
FIG. 13 is a diagram illustrating a sub-pixel arrangement of a low-density pixel according to the fourth embodiment.

FIG. 13 is a diagram illustrating a sub-pixel arrangement of a low-density pixel according to the fourth embodiment. A low-density pixel 48Bc included in the low-density regions 54*c* differs in the arrangement of the sub-pixels 49 from the low-density pixel of the third embodiment. As illustrated in FIG. 13, the first sub-pixel 49R and the third sub-pixel 49B are adjacently arranged in the first row of the low-density pixel 48Bc according to the fourth embodiment. The second sub-pixel 49G is arranged in the second row of the low-density pixel 48Bc. The second sub-pixel 49G has a larger area than that of each of the first sub-pixel 49R and the third sub-pixel 49B. The second sub-pixel 49G is adjacent in the column direction (Y-direction) to the first sub-pixel 49R and the third sub-pixel 49B. The arrangement of the sub-pixels 49 in the low-density pixel 48Bc is not limited to this arrangement, but may be any arrangement. For example, the low-density pixel 48Bc may have the same sub-pixel arrangement as that of the low-density pixel 48B according to the first embodiment.

Figure 14:
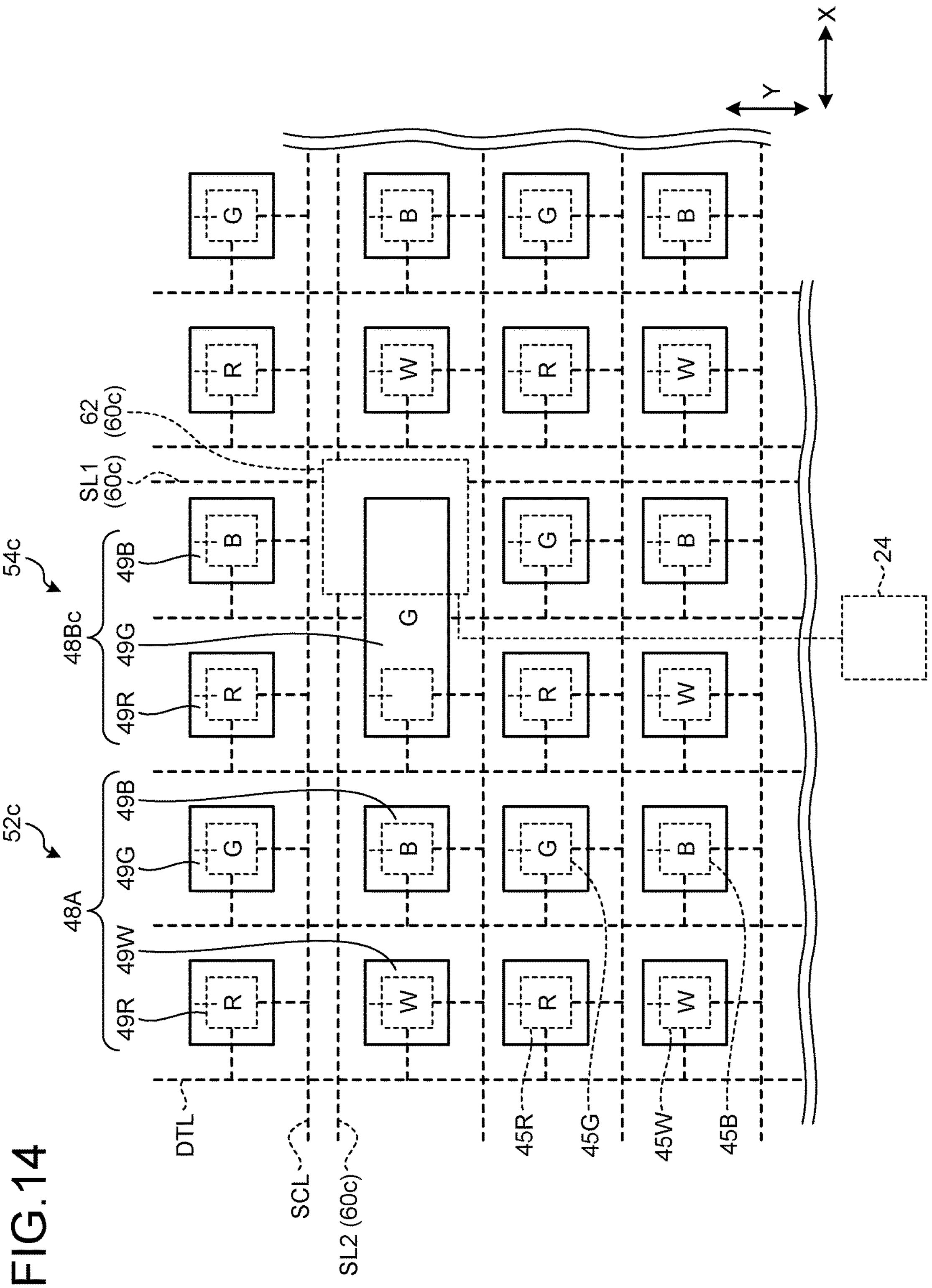
FIG. 14 is an explanatory diagram schematically explaining wiring of a circuit over a low-density region and a high-density region in the fourth embodiment.

Each of the low-density regions 54*c* includes a drive control circuit 60*c*. FIG. 14 is an explanatory diagram schematically explaining wiring of a circuit over the low-density region and the high-density region in the fourth embodiment. FIG. 14 illustrates an example in which the low-density region 54*c* includes one low-density pixel 48Bc. As illustrated in FIG. 14, the high-density region 52*c* includes the pieces of wiring (the signal lines DTL and the scanning lines SCL) and the high-density pixels 48A. The low-density region 54*c* includes the low-density pixel 48Bc and the drive control circuit 60*c*. The drive control circuit 60*c* includes wiring SL1 and SL2 and a sensor 62. The drive control circuits 60*c* (the wiring SL1 and SL2 and the sensors 62) are arranged in the same manner as the drive control circuit 60 according to the first embodiment, and are provided below the respective sub-pixels 49 of the low-density pixel 48Bc (more specifically, below the self-luminous layer 76).

Figure 15:
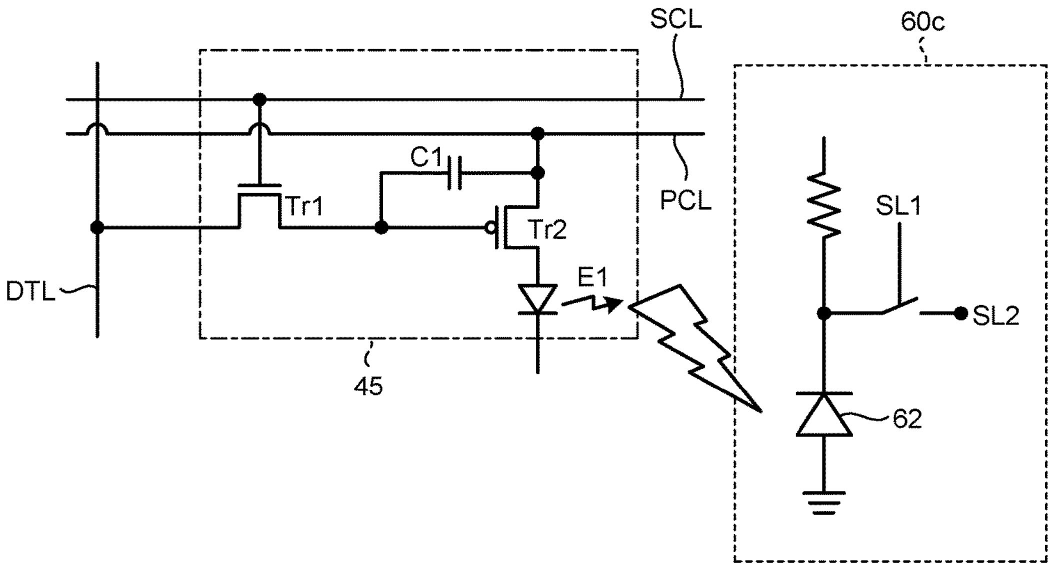
FIG. 15 is a circuit diagram schematically illustrating a configuration of a drive control circuit according to the fourth embodiment.

FIG. 15 is a circuit diagram schematically illustrating the configuration of the drive control circuit according to the fourth embodiment. The drive control circuit 60*c* is a circuit that detects the deterioration of the self-luminous layer 76 of the surrounding sub-pixels 49. As illustrated in FIG. 15, in the present embodiment, the sensor 62 is a photodiode for detecting the light emission of the organic light emitting diodes E1 of the sub-pixels 49. The sensor 62 generates a current having a value corresponding to a light emission amount of the light emitting diodes E1. The wiring SL1 is coupled to a sensor information acquiring unit 24 included in a signal processing unit 20*c*. The wiring SL2 is used for turning on/off a switch provided in the wiring SL1. In FIG. 14, the wiring SL1 is provided along the signal lines DTL, and the wiring SL2 is provided along the scanning lines SCL. However, the wiring SL1 and SL2 may be routed in any manner.

The current from the sensor 62 is output to the sensor information acquiring unit 24 through the wiring SL1. The signal processing unit 20*c* calculates a degree of deterioration of the organic light emitting diodes E1 of the sub-pixels 49 around the sensor 62 based on the amount of the current input to the sensor information acquiring unit 24 from the sensor 62. The signal processing unit 20*c* performs correction processing to, for example, increase the signal values of the output signals based on the calculation result of the degree of deterioration of the organic light emitting diodes E1. The following specifically describes this processing.

Figure 16:
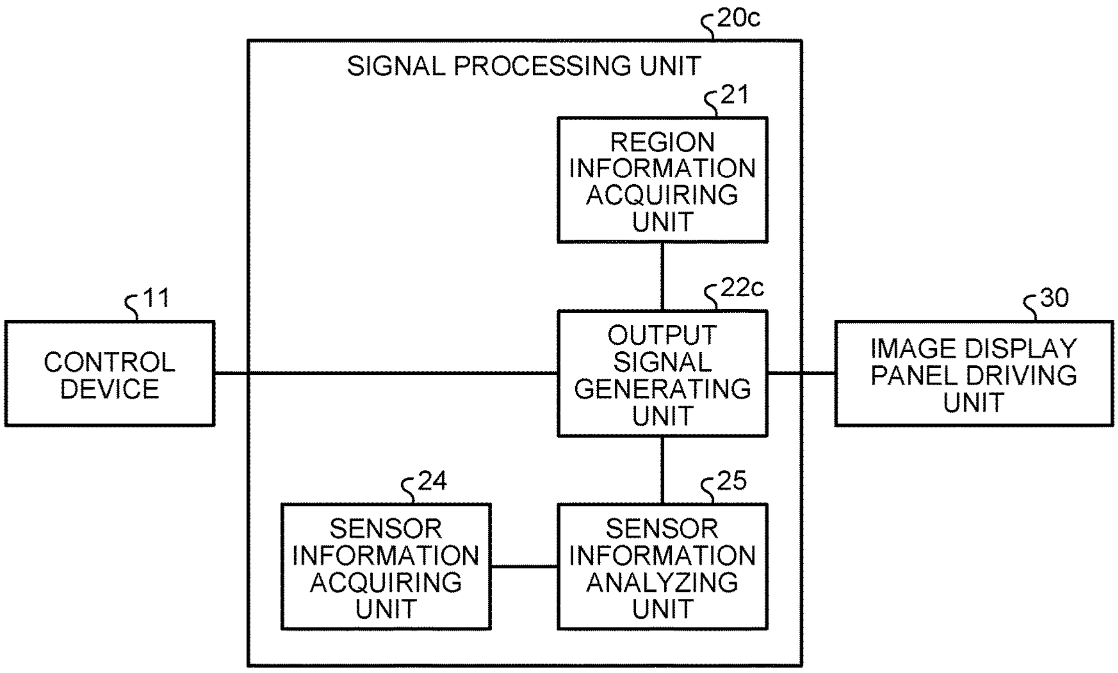
FIG. 16 is a block diagram schematically explaining a configuration of a signal processing unit according to the fourth embodiment.

FIG. 16 is a block diagram schematically explaining the configuration of the signal processing unit according to the fourth embodiment. As illustrated in FIG. 16, the signal processing unit 20*c* includes an output signal generating unit 22*c*, the sensor information acquiring unit 24, and a sensor information analyzing unit 25. The sensor information acquiring unit 24 acquires the current having the value corresponding to the light emission amount of the light emitting diodes E1 from the sensor 62. The sensor information analyzing unit 25 analyzes the current value acquired by the sensor information acquiring unit 24 to calculate the degree of deterioration of the organic light emitting diodes E1 of the sub-pixels 49 around the sensor 62. For example, the sensor information analyzing unit 25 calculates an integrated value of the current value, and calculates the degree of deterioration of the organic light emitting diodes E1 from the integrated value. The output signal generating unit 22*c* acquires the information on the degree of deterioration of the organic light emitting diodes E1 from the sensor information analyzing unit 25. The output signal generating unit 22*c* applies the correction processing to the output signals based on the information on the degree of deterioration of the organic light emitting diodes E1, and outputs them to the image display panel driving unit 30. For example, the output signal generating unit 22*c* performs the correction processing to expand the output signals according to the degree of deterioration of the organic light emitting diodes E1. By performing this processing, the display device 10*c* can restrain, for example, a burn-in phenomenon caused by the deterioration of the organic light emitting diodes E1, and thus can reduce the deterioration of the display quality.

As described above, the display device 10*c* according to the fourth embodiment is provided with the low-density regions 54*c* scattered in the high-density region 52. The drive control circuit 60*c* in the low-density region 54*c* includes the sensor 62 for detecting the deterioration of the organic light emitting diodes E1 of the sub-pixels 49 around the sensor 62. The display device 10*c* uses the sensor 62 to detect the degree of deterioration of the organic light emitting diodes E1, so that the display device 10*c* can restrain, for example, the burn-in phenomenon caused by the deterioration of the organic light emitting diodes E1, and thus can reduce the deterioration of the display quality.

Figure 17:
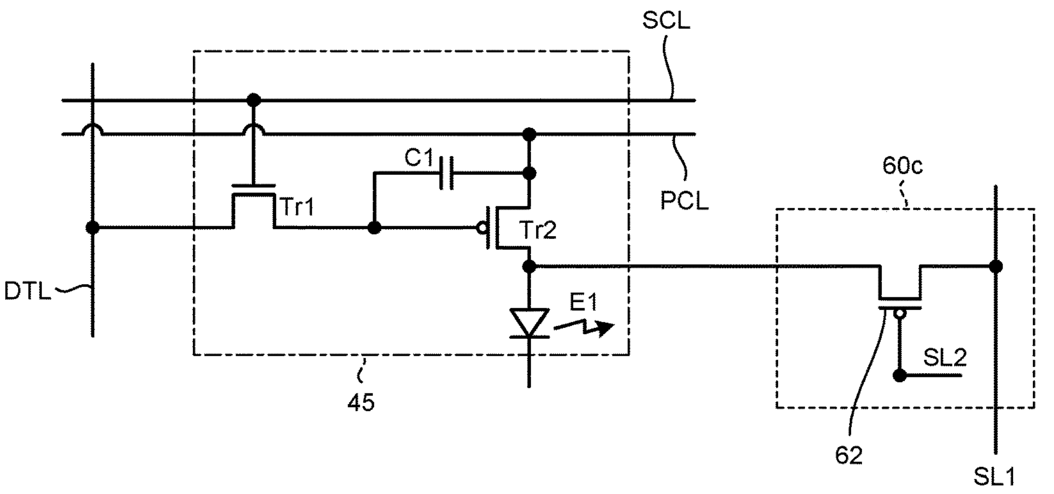
FIG. 17 is a circuit diagram schematically illustrating a configuration of a drive control circuit according to another example of the fourth embodiment.

The configuration of the drive control circuit 60*c* is not limited to the configuration described above, but may be, for example, a configuration illustrated in FIG. 17, provided that the drive control circuit 60*c* detects the degree of deterioration of the organic light emitting diodes E1. FIG. 17 is a circuit diagram schematically illustrating the configuration of the drive control circuit according to another example of the present embodiment. As illustrated in FIG. 17, the drive control circuit 60*c* according to the other example of the present embodiment detects a voltage entering the organic light emitting diode E1, and detects the degree of deterioration of the organic light emitting diode E1 based on the voltage value. As illustrated in FIG. 17, the sensor 62 is a transistor, in which the source is coupled to the drain of the driving transistor Tr2. The drain of the sensor 62 is coupled to the wiring SL1. The gate of the sensor 62 is coupled to the wiring SL2. The sensor 62 amplifies a voltage output from the driving transistor Tr2 to the organic light emitting diode E1, and outputs the amplified voltage to the sensor information acquiring unit 24 through the wiring SL1. The sensor information analyzing unit 25 calculates an integrated value of the voltage value, and calculates the degree of deterioration of the organic light emitting diode E1 from the integrated value.

The drive control circuit 60*c* need not include the sensor 62 for detecting the deterioration of the organic light emitting diode E1, as long as including a sensor for controlling the driving of the image display panel. The drive control circuit 60*c* may include, for example, a touch detection sensor or an object proximity detection sensor, instead of the sensor 62. In this case, the display device 10*c* serves as what is called an in-cell display device (with a built-in touch detection device). The drive control circuit 60*c* may include, for example, a sensor for detecting an external light intensity. In this case, the signal values of the output signals can be corrected based on the detected external light intensity. For example, the display device 10*c* expands the output signals by a certain value if the external light intensity is equal to or higher than a predetermined value, and increases the expansion rate of the output signals as the external light intensity increases from the predetermined value. The drive control circuit 60*c* may include, instead of the sensor 62, a pixel memory for temporarily storing the image output signals of the sub-pixels 49. In this case, the display device 10*c* can use the pixel memory to reduce power consumption for displaying a static image.

Figure 18:
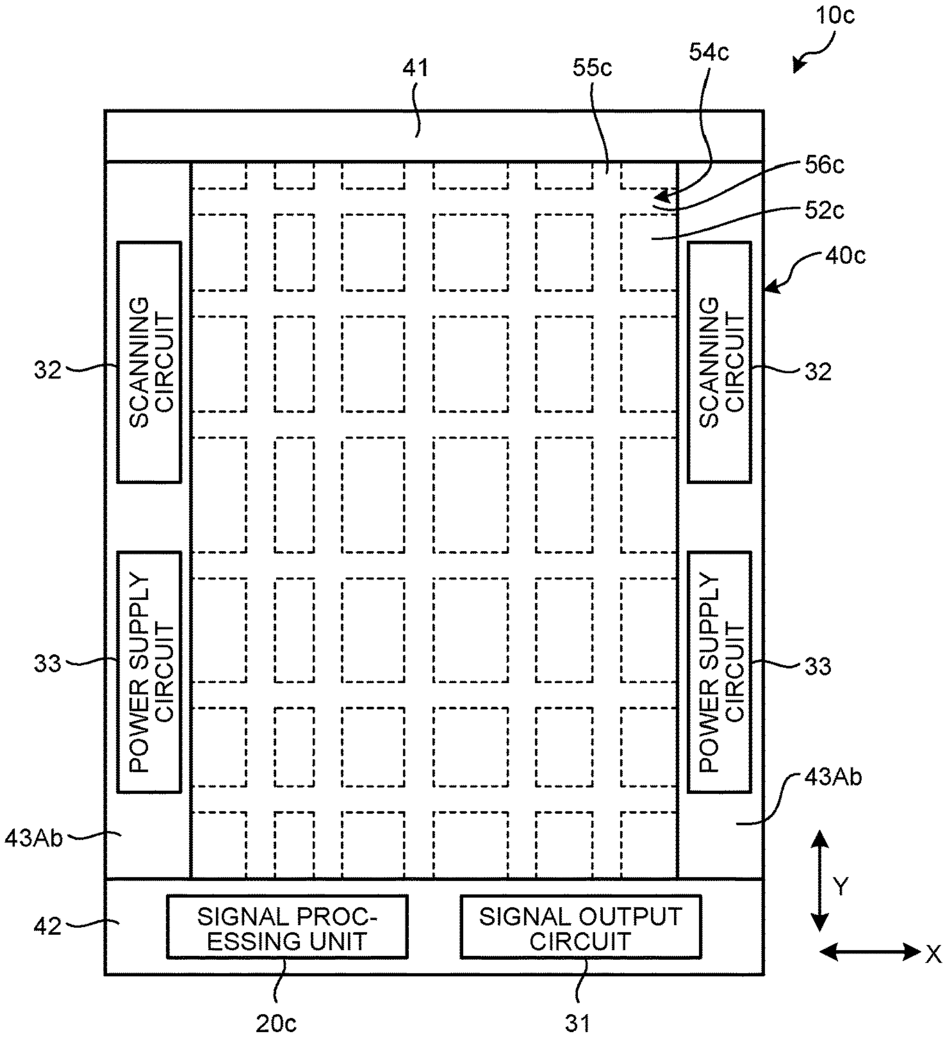
FIG. 18 is a schematic diagram schematically illustrating a configuration of an image display panel according to still another example of the fourth embodiment.

In the display device 10*c* according to the fourth embodiment, the low-density regions 54*c* are provided at intervals of the predetermined distance in the high-density region 52*c*, and are scattered in the high-density region 52*c*. The low-density regions 54*c* may be arranged in any manner, as long as arranged in the high-density region 52*c*. FIG. 18 is a schematic diagram schematically illustrating a configuration of an image display panel according to still another example of the fourth embodiment. As illustrated in FIG. 18, the configuration of the image display panel may be such that a plurality of strip-like regions 55*c* extending along the X-direction are arranged in the Y-direction, a plurality of strip-like regions 56*c* extending along the Y-direction extend in the X-direction. A region formed by intersection between the regions 55*c* and the regions 56*c* serves as the low-density region 54*c*.

Figure 19:
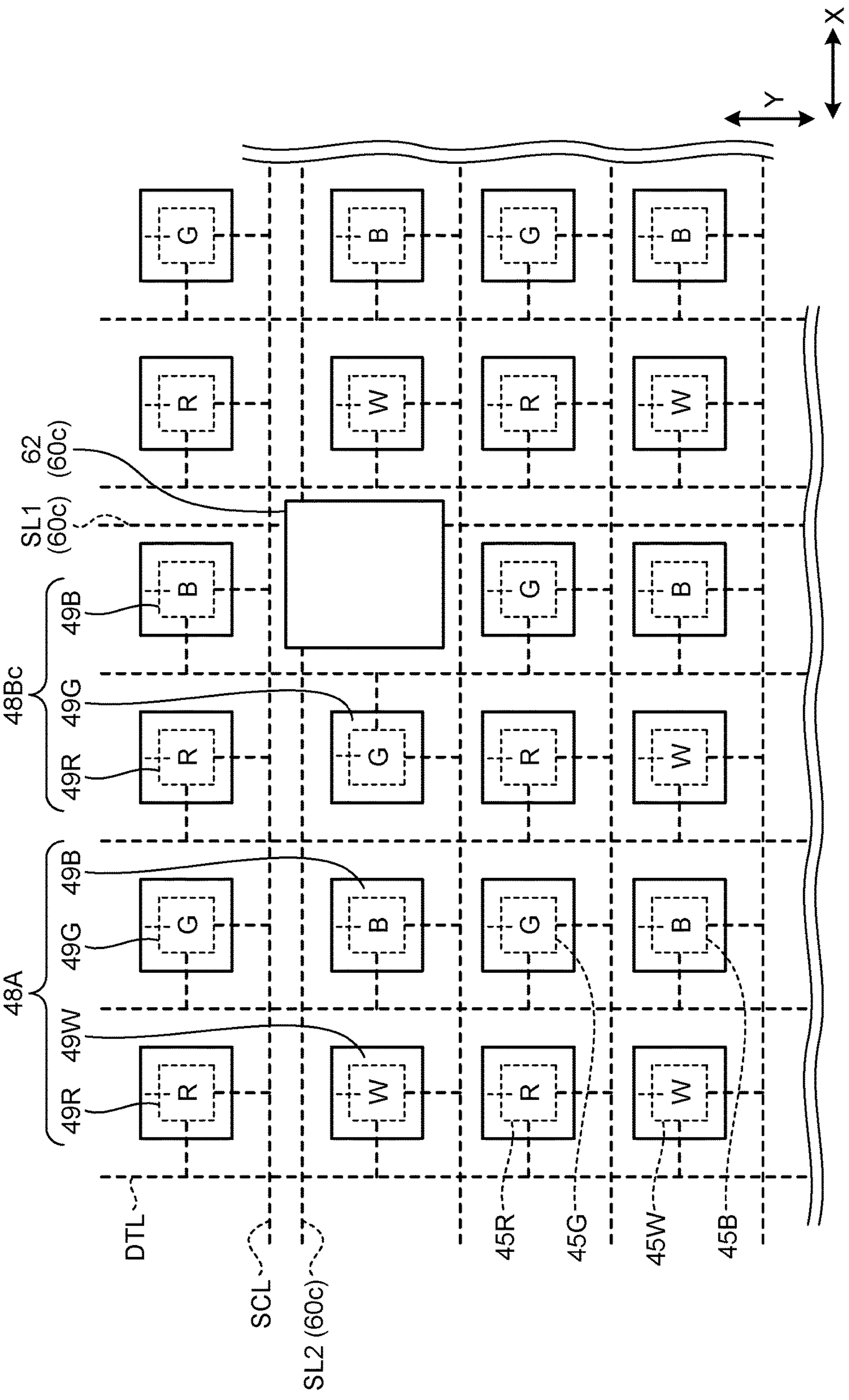
FIG. 19 is an explanatory diagram schematically explaining wiring of a circuit over a low-density region and a high-density region according to still another example of the fourth embodiment.

In the fourth embodiment, the sensor 62 is provided below the sub-pixels 49 of the low-density pixel 48Bc (more specifically, below the self-luminous layer 76). However, the sensor 62 may be provided, for example, at the same layer as or above the sub-pixels 49 of the low-density pixel 48Bc. FIG. 19 is an explanatory diagram schematically explaining the wiring of the circuit over the low-density region and the high-density region according to still another example of the fourth embodiment. As illustrated in FIG. 19, in this example, the sensor 62 is provided at the same layer as the sub-pixels 49 of the low-density pixel 48Bc, but the other positional relations are the same as those of FIG. 14.

Figure 20:
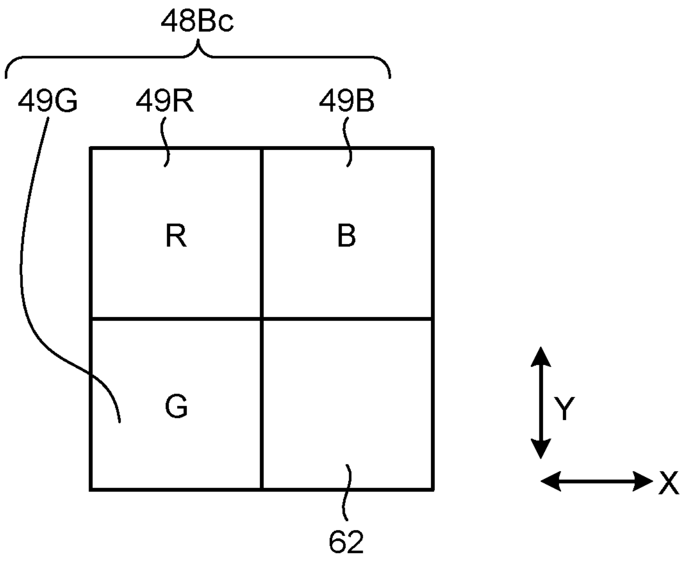
FIG. 20 is a diagram illustrating a sub-pixel arrangement of a low-density pixel according to the still other example of the fourth embodiment.

When the sensor 62 is provided at the same layer as the sub-pixels 49 of the low-density pixel 48Bc, the sub-pixel arrangement of the low-density pixel 48Bc differs from that illustrated in FIG. 13. FIG. 20 is a diagram illustrating the sub-pixel arrangement of the low-density pixel according to the still other example of the fourth embodiment. FIG. 20 illustrates the sub-pixel arrangement of the low-density pixel 48Bc when the sensor 62 is provided at the same layer as the sub-pixels 49 of the low-density pixel 48Bc. In this case, as illustrated in FIG. 20, the first sub-pixel 49R and the third sub-pixel 49B are adjacently arranged in the first row of the low-density pixel 48Bc. The second sub-pixel 49G is arranged in the second row of the low-density pixel 48Bc. The second sub-pixel 49G has substantially the same area as that of each of the first sub-pixel 49R and the third sub-pixel 49B. The second sub-pixel 49G is adjacent in the column direction (Y-direction) to the first sub-pixel 49R. The second sub-pixel 49G is not adjacent to the third sub-pixel 49B. The sensor 62 is provided adjacent in the X-direction to the second sub-pixel 49G. The sensor 62 is provided adjacent in the Y-direction to the third sub-pixel 49B. However, when the sensor 62 is provided at the same layer as the sub-pixels 49 of the low-density pixel 48Bc, the sub-pixel arrangement of the low-density pixel 48Bc is not limited to this example, but may be any arrangement.

In the case of the configuration in which the sensor 62 is provided below the sub-pixels 49 of the low-density pixel 48Bc, the sensor 62 is preferably, for example, the sensor or the photosensor for detecting the deterioration of the organic light emitting diode E1 illustrated in FIG. 15 or 17. For example, a pixel memory may be provided instead of the sensor 62. That is, in the case of the configuration in which the sensor 62 is provided below the sub-pixels 49 of the low-density pixel 48Bc, the function of the sensor 62 is preferably not affected by being covered on the upper side with a nontransparent member.

In the case of the configuration in which the sensor 62 is provided at the same layer as the sub-pixels 49 of the low-density pixel 48Bc, the sensor 62 is preferably a touch detection sensor, an object proximity detection sensor, or an external light intensity detection sensor. That is, when the sensor 62 lies at the same layer as the sub-pixels 49 of the low-density pixel 48Bc, the sensor 62 is externally exposed (not covered on the upper side with a nontransparent member such as an electrode, but covered on the upper side with a transparent member such as an ITO member). Therefore, the above-mentioned types of sensor 62 can appropriately detect input from the outside.

First Modification

The following describes a first modification of the first embodiment. A display device 10*d* of the first modification differs from the display device of the first embodiment in the arrangement of sub-pixels in a low-density pixel. No description will be given of portions of the first modification common to those of the first embodiment.

Figure 21A:
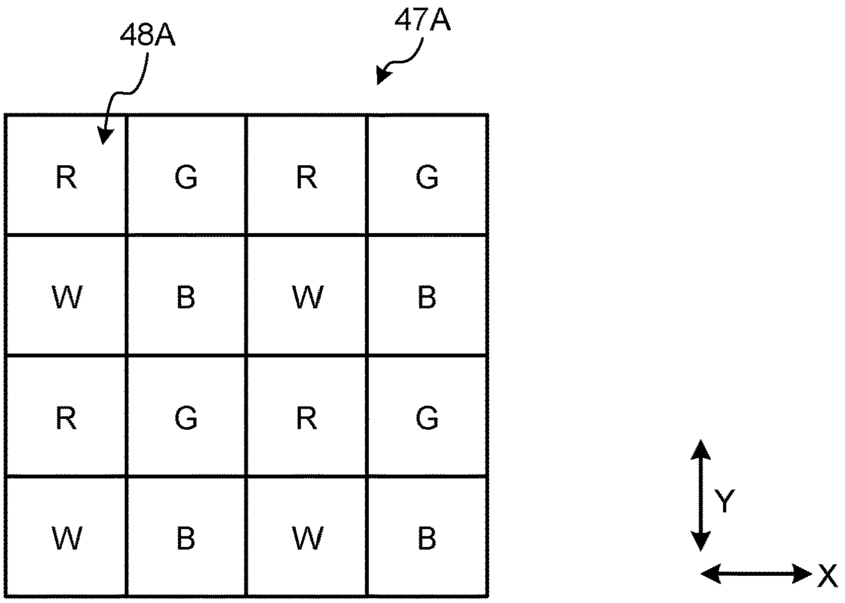
FIG. 21A is a diagram illustrating a sub-pixel arrangement of high-density pixels according to a first modification of the first embodiment.

FIG. 21A is a diagram illustrating a sub-pixel arrangement of high-density pixels according to the first modification. As illustrated in FIG. 21A, the sub-pixel arrangement of the high-density pixel 48A according to the first modification is the same as that of the first embodiment (refer to FIG. 4A). For the following description, a pixel group of four high-density pixels 48A formed by arranging the high-density pixels 48A in two rows and two columns is referred to as a high-density pixel group 47A.

Figure 21B:
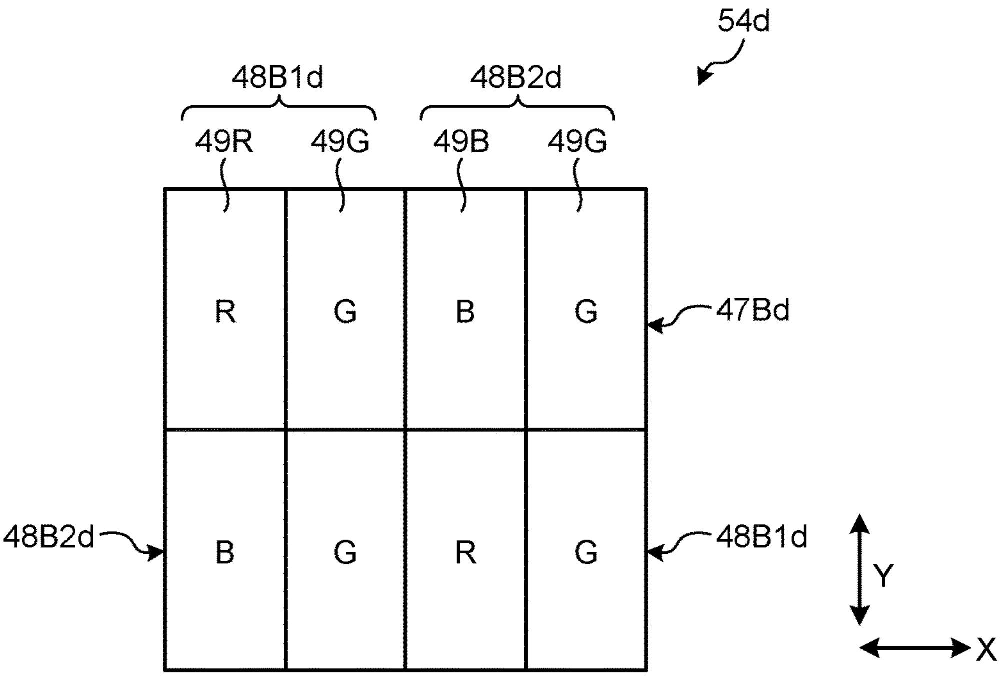
FIG. 21B is a diagram illustrating a sub-pixel arrangement of low-density pixels according to the first modification.

FIG. 21B is a diagram illustrating a sub-pixel arrangement of low-density pixels according to the first modification. As illustrated in FIG. 21B, in a low-density region 54*d* according to the first modification, low-density pixel groups 47Bd each formed by arranging low-density pixels 48B1*d* and low-density pixels 48B2*d* in two rows and two columns are arranged in a two-dimensional matrix. Each of the low-density pixel groups 47Bd includes a low-density pixel 48B1*d* in the first column of the first row, a low-density pixel 48B2*d* in the second column of the first row, the low-density pixel 48B2*d* in the first column of the second row, and the low-density pixel 48B1*d* in the second column of the second row.

In the low-density pixel 48B1*d*, the first sub-pixel 49R and the second sub-pixel 49G are arranged along the X-direction in a stripe pattern. In the low-density pixel 48B2*d*, the third sub-pixel 49B and the second sub-pixel 49G are arranged along the X-direction in a stripe pattern. In the first modification, the number of sub-pixels included in a low-density pixel is smaller than that in the first embodiment, so that the area of each of the sub-pixels 49 in the low-density pixel of the first modification is larger than the area of each of the sub-pixels 49 in the low-density pixel according to the first embodiment (refer to FIG. 4B).

The first sub-pixels 49R or the third sub-pixels 49B is thinned out from the low-density pixels of the first modification. Due to this, the low-density pixel group 47Bd includes smaller numbers of the first sub-pixels 49R and the third sub-pixels 49B than those in the high-density pixel group 47A. Consequently, in the first modification, the resolution in the low-density region 54*d* is lower (the display quality is more grainy) than that in the high-density region 52. In this case, boundaries between the low-density region 54*d* and the high-density region 52 may be visible, so that the deterioration of the display quality may be visible. In order to bring the apparent resolution in the low-density region 54*d* closer to that in the high-density region 52, a signal processing unit 20*d* of the display device 10*d* according to the first modification performs sub-pixel rendering processing (hereinafter, referred to as rendering processing) and smoothing processing. A specific description will be given below.

Figure 22:
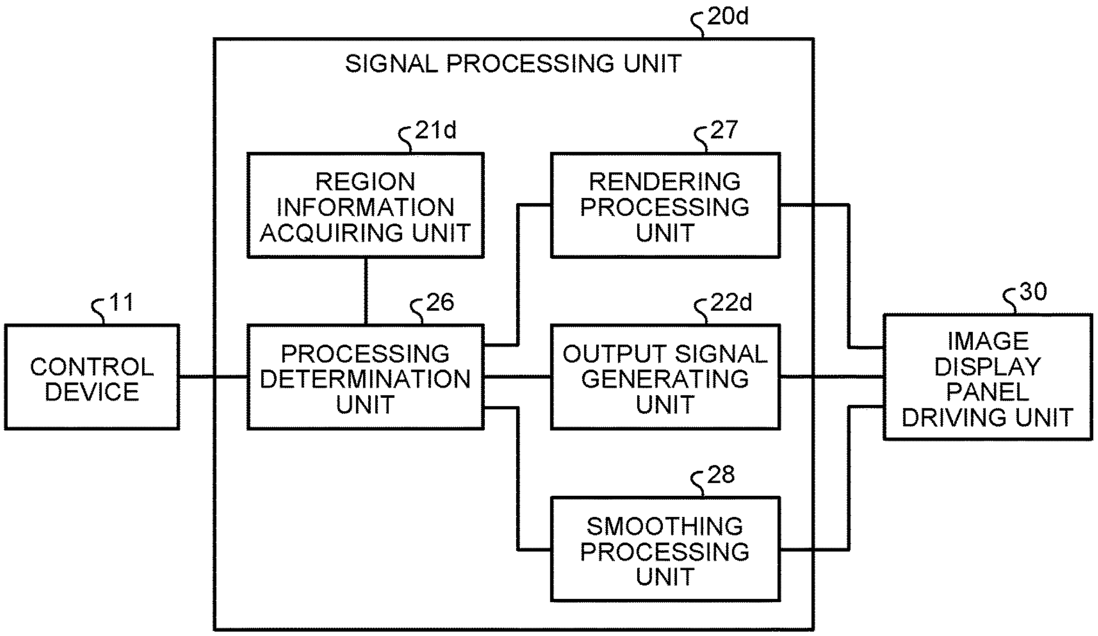
FIG. 22 is a block diagram illustrating a configuration of a signal processing unit according to the first modification.

FIG. 22 is a block diagram illustrating the configuration of the signal processing unit according to the first modification. As illustrated in FIG. 22, the signal processing unit 20*d* includes a region information acquiring unit 21*d*, an output signal generating unit 22*d*, a processing determination unit 26, a rendering processing unit 27, and a smoothing processing unit 28.

Figure 23:
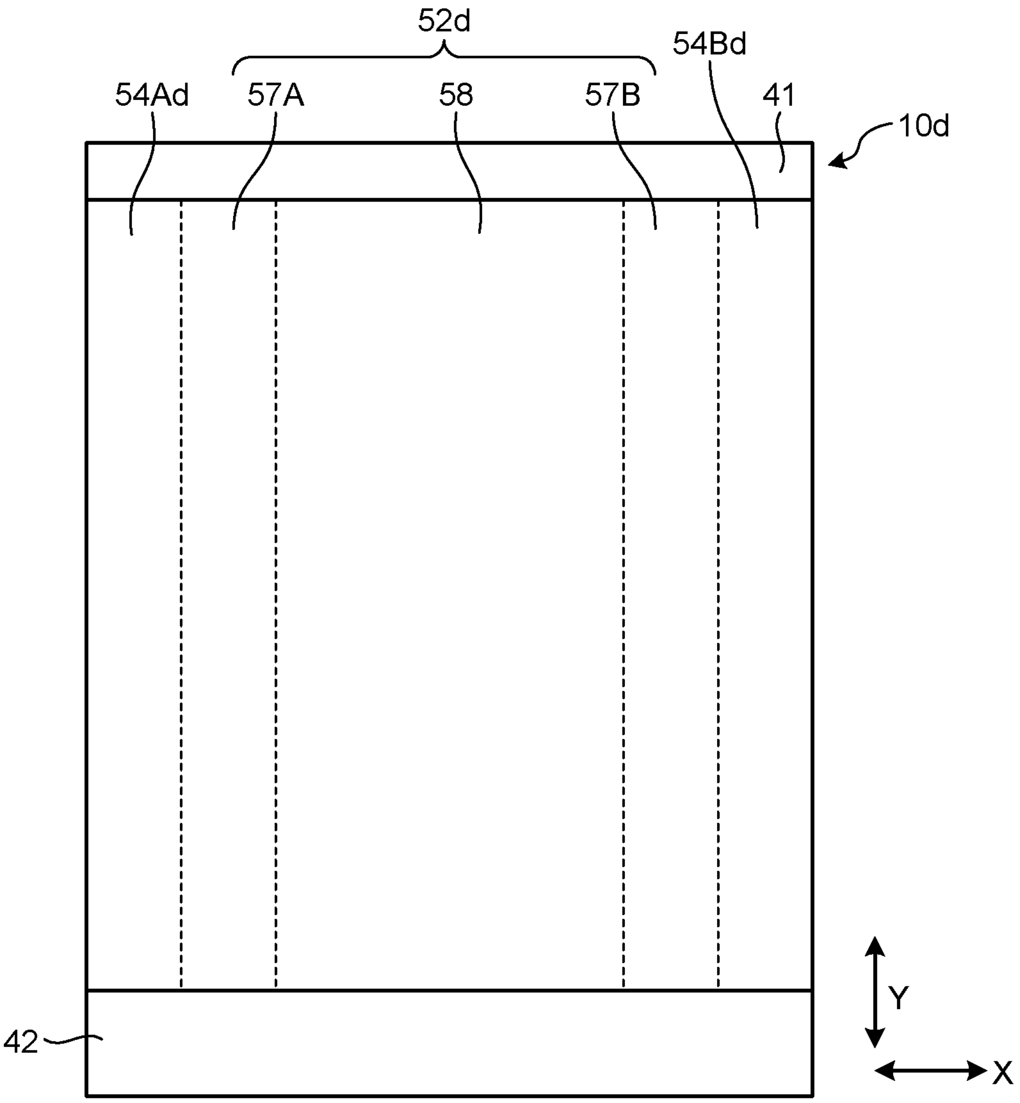
FIG. 23 is a schematic diagram schematically illustrating a configuration of an image display panel according to the first modification.

The region information acquiring unit 21*d* stores information indicating which of the pixels 48 are the high-density pixels 48A. In addition, the region information acquiring unit 21*d* stores information indicating which of the pixels 48 are pixels included in a boundary region 57. FIG. 23 is a schematic diagram schematically illustrating a configuration of an image display panel according to the first modification. The boundary region 57 is a region as a part of a high-density region 52*d*, and a region adjacent to the low-density region 54*d*. Specifically, as illustrated in FIG. 23, a boundary region 57A is a region as a part of the high-density region 52*d*, and a region adjacent to a low-density region 54Ad. A boundary region 57B is a region as a part of the high-density region 52*d*, and a region adjacent to a low-density region 54Bd. The high-density region 52*d* includes a region 58 between the boundary region 57A and the boundary region 57B. The areas and shapes of the boundary regions 57A and 57B and the number of the high-density pixels 48A included therein are optional, and are stored in advance in the region information acquiring unit 21*d*. The areas of the boundary regions 57A and 57B are preferably smaller than the area of the region 58.

The processing determination unit 26 acquires, from the region information acquiring unit 21*d*, the information indicating which of the pixels 48 are the high-density pixels 48A and the information indicating which of the pixels 48 are pixels included in the boundary region 57. The processing determination unit 26 then classifies all the pixels 48 in an image display panel 40*d* into low-density pixels 48Bd, the high-density pixels 48A in the boundary region 57, and the high-density pixels 48A in the region 58. The processing determination unit 26 then determines to apply different types of processing to input signals to the respective types of pixels so as to generate the output signals. Specifically, the processing determination unit 26 determines to apply the rendering processing to the low-density pixels 48Bd, to apply the smoothing processing to the high-density pixels 48A in the boundary region 57, and to apply the expansion processing to the high-density pixels 48A in the region 58. The processing determination unit 26 outputs information on (information on coordinates of) the low-density pixels 48Bd which is subjected to be applied the rendering processing to the rendering processing unit 27. The processing determination unit 26 outputs information on (information on coordinates of) the high-density pixels 48A which is subjected to be applied the smoothing processing to the smoothing processing unit 28. The processing determination unit 26 outputs information on (information on coordinates of) the high-density pixels 48A which is subjected to be applied the expansion processing to the output signal generating unit 22*d*. The output signal generating unit 22*d* performs the same expansion processing as that of the first embodiment to generate the output signals.

Based on the information from the processing determination unit 26, the rendering processing unit 27 applies the rendering processing to the input signals to the sub-pixels 49 included in the low-density pixels 48Bd, so as to generate the output signals to be output to the sub-pixels 49 of the low-density pixels 48Bd. The rendering processing refers to an image processing method in which an input signal to each of the sub-pixels 49 in a low-density pixel 48Bd is applied not only to the sub-pixel 49 in the low-density pixel 48Bd but also to sub-pixels of the same color around the low-density pixel 48Bd. The rendering processing can bring the apparent resolution of the low-density pixel 48Bd closer to that of the high-density pixel 48A. For example, the rendering processing unit 27 calculates the output signal value $X_{1-(p,q)}$ of the first sub-pixel 49R in the low-density pixel 48$Bd_{(p,q)}$ in a certain position, by averaging the input signal value $x_{1-(p,q)}$ of the first sub-pixel 49R and input signal values of the first sub-pixels 49R of the pixels 48 therearound. The rendering processing unit 27 calculates the output signal value $X_{2-(p,q)}$ of the second sub-pixel 49G and the output signal value $X_{3-(p,q)}$ of the third sub-pixel 49B using the same method. The following describes an example of the rendering processing.

Figure 24:
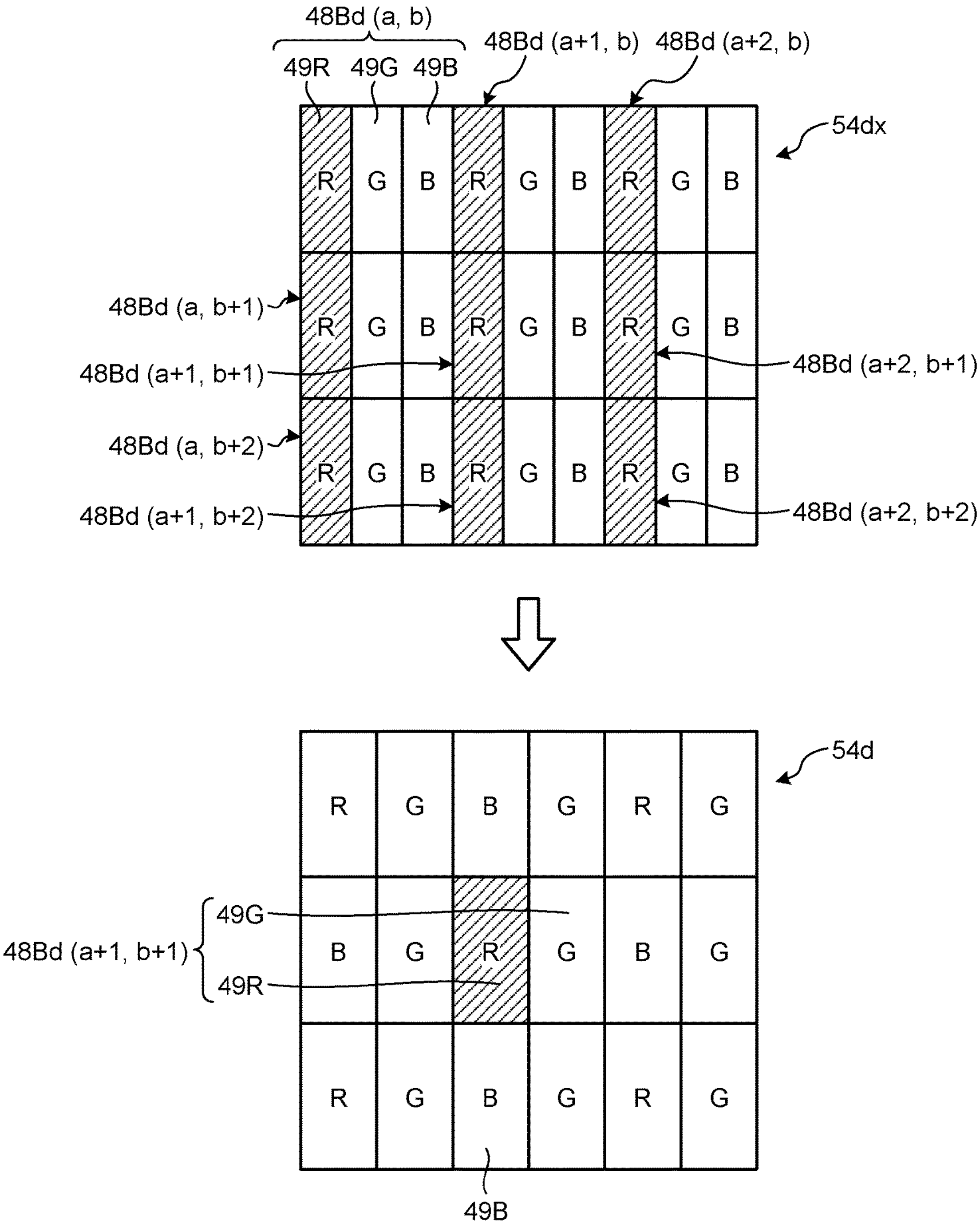
FIG. 24 is an explanatory diagram for explaining an example of rendering processing.

FIG. 24 is an explanatory diagram for explaining the example of the rendering processing. A low-density region 54*dx* illustrated in the upper part of FIG. 24 represents a sub-pixel arrangement when the low-density pixel 48Bd is assumed to be constituted by the three sub-pixels (the first sub-pixel 49R, the second sub-pixel 49G, and the third sub-pixel 49B). The low-density region 54*d* illustrated in the lower part of FIG. 24 represents the sub-pixel arrangement of the low-density pixel 48Bd described in the first modification. The following describes an example of the rendering processing applied to the first sub-pixel 49R of the low-density pixel 48$Bd_{(a+1,b+1)}$ in the low-density region 54*d* of FIG. 24. The rendering processing unit 27 calculates the output signal value $X_{1-(a+1,b+1)}$ of the first sub-pixel 49R in the low-density pixel 48$Bd_{(a+1,b+1)}$ based on the input signal values of the first sub-pixels 49R in the low-density pixels 48$Bd_{(a,b)}$, 48$Bd_{(a+1,b)}$, 48$Bd_{(a+2,b)}$, 48$Bd_{(a,b+1)}$, 48$Bd_{(a+1,b+1)}$, 48$Bd_{(a+2,b+1)}$, 48$Bd_{(a,b+2)}$, 48$Bd_{(a+1,b+2)}$, and 48$Bd_{(a+2,b+2)}$. The low-density pixels 48$Bd_{(a,b)}$, 48$Bd_{(a+1,b)}$, 48$Bd_{(a+2,b)}$, 48$Bd_{(a,b+1)}$, 48$Bd_{(a+2,b+1)}$, 48$Bd_{(a,b+2)}$, 48$Bd_{(a+1,b+2)}$, and 48$Bd_{(a+2,b+2)}$ are the low-density pixels around the low-density pixel 48$Bd_{(a+1,b+1)}$, as illustrated in the low-density region 54*dx* of FIG. 24. Specifically, the rendering processing unit 27 calculates the output signal value $X_{1-(a+1,b+1)}$ of the first sub-pixel 49R in the low-density pixel 48$Bd_{(a+1,b+1)}$ from Expression (9) below.

$$X_{1-(a+1,b+1)}=0.0625\cdot\{(-1)\cdot x_{1-(a,b)}+2\cdot x_{1-(a+1,b)}+(-1)\cdot x_{1-(a+2,b)}+2\cdot x_{1-(a,b+1)}+12\cdot x_{(a+1,b+1)}+2\cdot x_{1-(a+2,b+1)}+(-1)\cdot x_{1-(a,b+2)}+2\cdot x_{1-(a+1,b+2)}+(-1)\cdot x_{1-(a+2,b+2)}\} \quad (9)$$

As represented by Expression (9), the output signal value $X_{1-(a+1,b+1)}$ of the first sub-pixel 49R is calculated by the average with the input values of the surrounding sub-pixels. In this averaging processing, the coefficient (12 in Expression (9)) multiplying the input signal value $X_{1-(a+1,b+1)}$ of the low-density pixel 48$Bd_{(a+1,b+1)}$ is greater than the coefficient multiplying the input signal values of the surrounding pixels. This means that weighting is applied in the averaging processing, and means that the weighing factor for the input signal value of the low-density pixel 48$Bd_{(a+1,b+1)}$ is greater than weighing factors for the input signal values of the surrounding pixels. In the same manner, the weighting factors for the input signals of the low-density pixels 48$Bd_{(a+1,b)}$, 48$Bd_{(a,b+1)}$, 48$Bd_{(a+2,b+1)}$, and 48$Bd_{(a+1,b+2)}$ that are adjacent in the X- or Y-direction to the low-density pixel 48$Bd_{(a+1,b+1)}$ are greater than those of the low-density pixels 48$Bd_{(a,b)}$, 48$Bd_{(a+2,b)}$, 48$Bd_{(a,b+2)}$, and 48$Bd_{(a+2,b+2)}$ that are located in oblique directions from the low-density pixel $48Bd_{(a+1,b+1)}$. The rendering processing unit 27 also applies the rendering processing to the third sub-pixels 49B illustrated in FIG. 24 by the same method. However, the rendering processing unit 27 does not apply the rendering processing to the second sub-pixels 49G illustrated in FIG. 24 because the second sub-pixels 49G are not thinned out. The rendering processing described above is merely an example, and, for example, the coefficients multiplying the input signal values can be set to any values.

Based on the information from the processing determination unit 26, the smoothing processing unit 28 applies the expansion processing described above to the input signals to the sub-pixels 49 included in the high-density pixels 48A in the boundary region 57 to generate the output signals, and then, performs the smoothing processing (dithering processing). The smoothing processing is processing to gradually reduce the number of the light-up sub-pixels 49 toward the low-density region 54*d*. The following describes a specific example of the smoothing processing.

Figure 25:
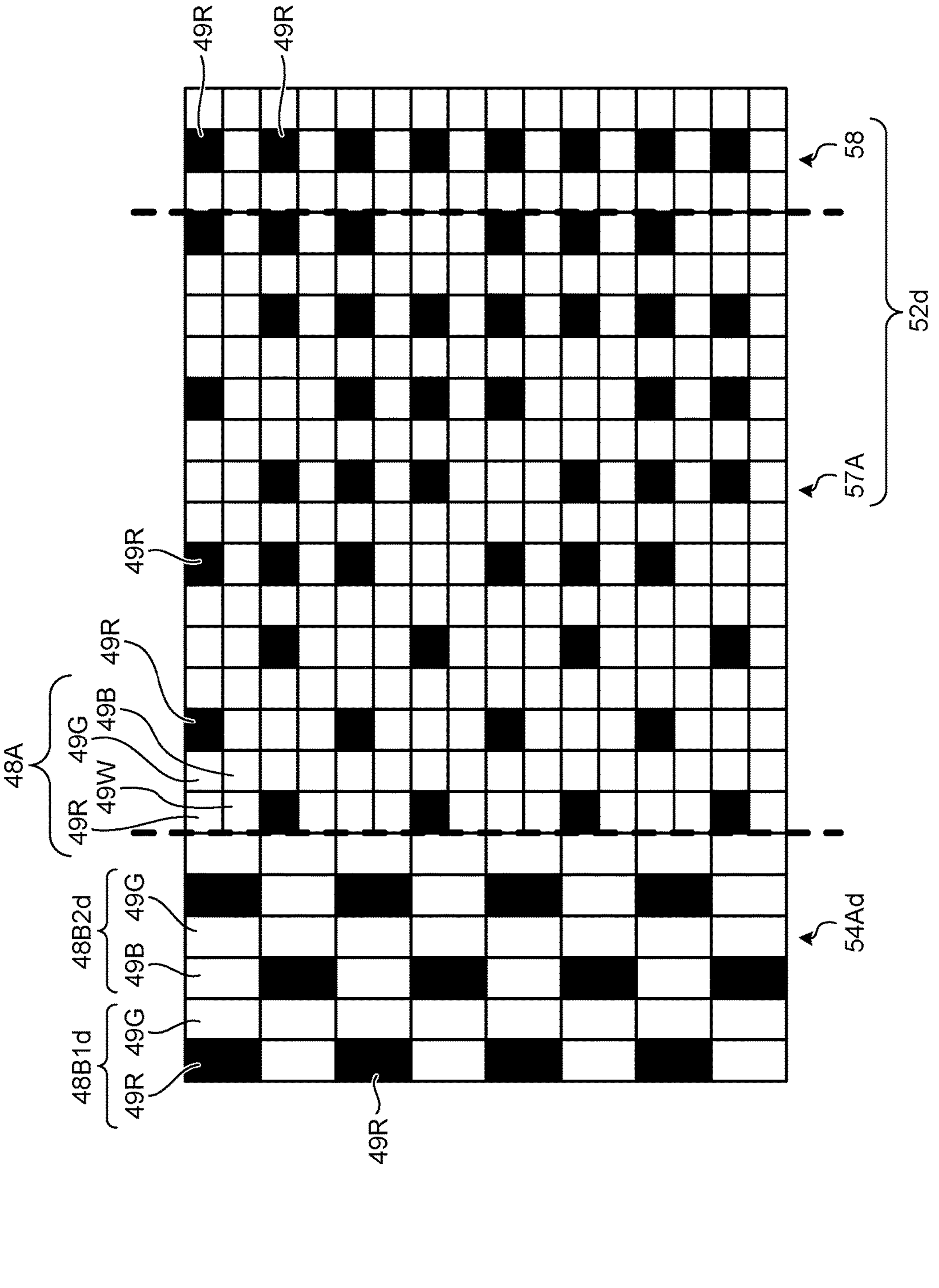
FIG. 25 is an explanatory diagram for explaining smoothing processing.

FIG. 25 is an explanatory diagram for explaining the smoothing processing. FIG. 25 illustrates a lighting state of the sub-pixels 49 when the smoothing processing has been applied to the boundary region 57A, when the input signals have been supplied to light all the first sub-pixels 49R in the low-density region 54Ad and the high-density region 52*d* (the boundary region 57A and the region 58). As illustrated in FIG. 25, all the first sub-pixels 49R are light up in the low-density region 54Ad. All the first sub-pixels 49R are also light up in the region 58 that has not been subjected to the smoothing processing. As described above, the number of the first sub-pixels 49R is smaller in the low-density pixel group 47Bd of the low-density region 54Ad than in the high-density pixel group 47A of the region 58. Consequently, the number of the light-up first sub-pixels 49R in the low-density region 54Ad is smaller than the number of the light-up first sub-pixels 49R in the region 58.

The smoothing processing is applied to the boundary region 57A between the low-density region 54Ad and the region 58. Since the pixels in the boundary region 57A are the high-density pixels 48A, the number of the light-up sub-pixels 49 is the same as that in the region 58. However, in the boundary region 57A, the smoothing processing gradually reduces the actual number of the light-up first sub-pixels 49R toward the low-density region 54*d*. Specifically, in the boundary region 57A, the number of the light-up first sub-pixels 49R at a boundary with the region 58 is the same as the number of the light-up first sub-pixels 49R in the region 58. The number of the light-up first sub-pixels 49R in the boundary region 57A gradually decreases toward the low-density region 54Ad. The number of the light-up first sub-pixels 49R at a boundary with the low-density region 54Ad in the boundary region 57A equals the number of the lit-up first sub-pixels 49R in the low-density region 54Ad.

If the smoothing processing is not applied, the boundary between the low-density region 54Ad and the high-density region 52*d* is visible, so that the deterioration of the display quality may be visible. However, the display device 10*d* performs the smoothing processing, and thereby can restrain the boundary between the low-density region 54Ad and the high-density region 52*d* from being visible.

Figure 26:
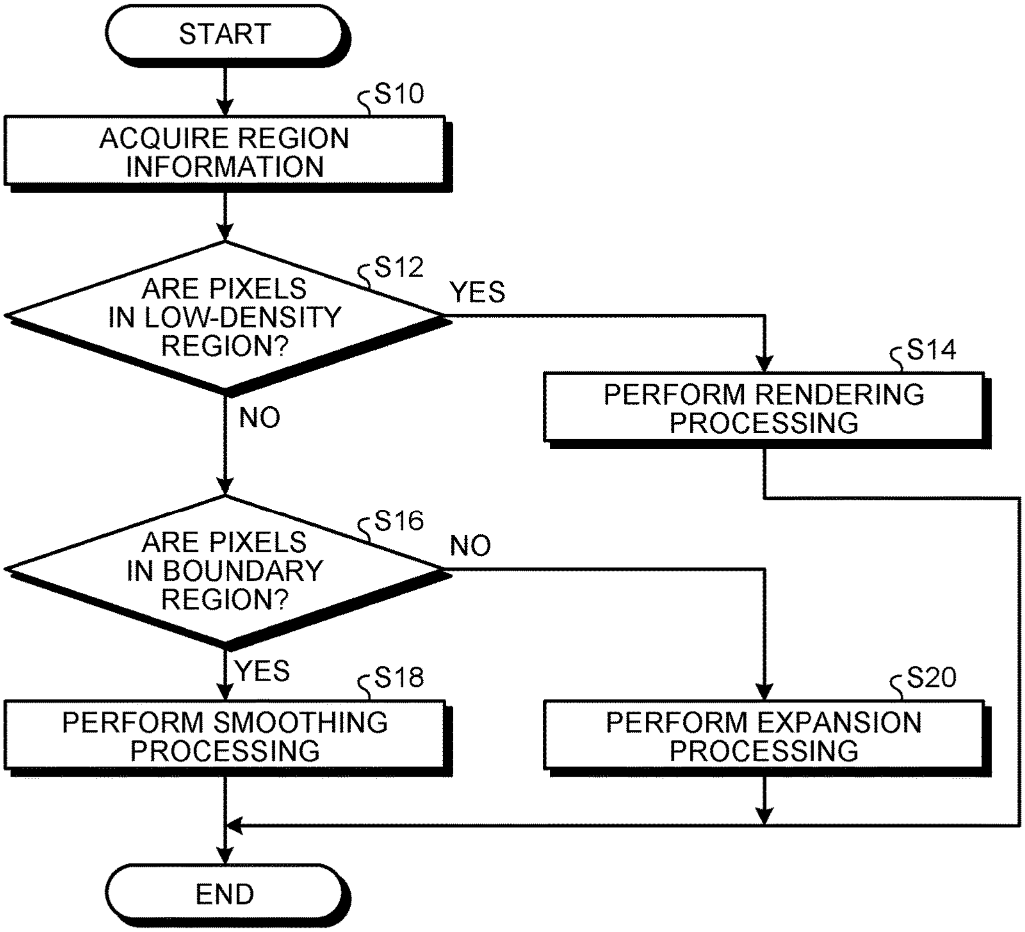
FIG. 26 is a flowchart explaining steps of generation processing of output signals performed by the signal processing unit of the first modification.

The following describes steps of the generation processing of the output signals performed by the signal processing unit 20*d* with reference to a flowchart. FIG. 26 is the flowchart explaining the steps of the generation processing of the output signals performed by the signal processing unit of the first modification. As illustrated in FIG. 26, the region information acquiring unit 21*d* of the signal processing unit 20*d* acquires region information (Step S10). The region information includes the information indicating which of the pixels 48 are the high-density pixels 48A and the information indicating which of the pixels 48 are pixels included in the boundary region 57.

After the region information is received, the processing determination unit 26 of the signal processing unit 20*d* determines whether the pixels 48 are the low-density pixels 48Bd in the low-density region 54*d* (Step S12). If so (Yes at Step S12), the rendering processing unit 27 of the signal processing unit 20*d* applies the rendering processing to the pixels 48 (Step S14). If not (No at Step S12), the signal processing unit 20*d* determines whether the pixels 48 are the pixels 48 in the boundary region 57 (Step S16). If so (Yes at Step S16), the smoothing processing unit 28 of the signal processing unit 20*d* applies the smoothing processing to the pixels 48 (Step S18). If not (No at Step S16), the signal processing unit 20*d* determines that the pixels 48 are pixels in the region 58, and uses the output signal generating unit 22*d* to apply the expansion processing to the pixels 48 (Step S20). Thus, the present process ends.

As described above, the signal processing unit 20*d* according to the first modification generates the output signals to be output to the low-density pixels 48Bd by performing the sub-pixel rendering processing for bringing the apparent resolution closer to that of the high-density pixels 48A. This processing improves the apparent resolution in the low-density region 54*d*, and thus, restrains the boundaries between the low-density region 54*d* and the high-density region 52 from being visible, even if the number of the sub-pixels 49 included in the low-density pixel group 47Bd is smaller than the number of the sub-pixels 49 of the same color included in the high-density pixel group 47A.

The signal processing unit 20*d* applies the smoothing processing to the high-density pixels 48A in the boundary region 57 so as to gradually reduce the number of the light-up sub-pixels 49 toward the low-density region 54*d*. This processing gradually changes the number of light-up sub-pixels 49 in the boundary region 57, and thereby can restrain the boundaries between the low-density region 54*d* and the high-density region 52 from being visible, even if the number of the sub-pixels 49 included in the low-density pixel group 47Bd is smaller than the number of the sub-pixels 49 of the same color included in the high-density pixel group 47A.

Each of the low-density regions 54*d* and 54*dx* illustrated in FIG. 24 has a lower density of sub-pixels than that of the high-density region 58, and thereby has a larger space available for providing the drive control circuit 60 than that of the high-density region 58. The low-density region 54*d* has a lower density of sub-pixels than that of the low-density region 54*dx*, and thereby has a still larger space available for providing the drive control circuit 60 than that of the low-density region 54*dx*. Accordingly, if the drive control circuit 60 is large-scaled and difficult to be provided in the low-density region 54*dx*, the sub-pixel arrangement of the low-density region 54*d* is preferably employed to provide the drive control circuit 60 in the low-density region 54*d*. If the drive control circuit 60 has a size containable in the low-density region 54*dx*, the sub-pixel arrangement of the low-density region 54*dx* is preferably employed to provide the drive control circuit 60 in the low-density region 54*dx*. In the case of employing the sub-pixel arrangement of the low-density region 54*d*, the sub-pixel arrangement in the high-density region 52 may employ the sub-pixel arrangement of the low-density region 54*dx*, that is, the arrangement not including the fourth sub-pixel 49W.

Figure 27:
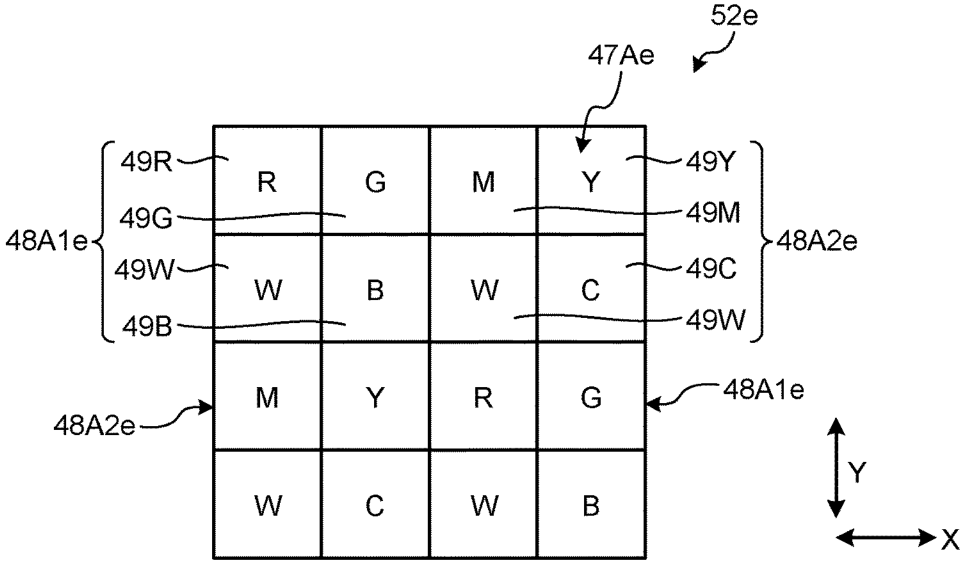
FIG. 27 is a diagram illustrating another example of a sub-pixel arrangement of a high-density pixel.

If the numbers of the first sub-pixels 49R and the third sub-pixels 49B included in the low-density pixel group 47Bd are the same as those in the high-density pixel group 47A, the sub-pixel rendering processing and the smoothing processing need not be performed. For example, the sub-pixel rendering processing and the smoothing processing need not be performed if the sub-pixel arrangement according to the first embodiment is employed. FIG. 27 is a diagram illustrating another example of the sub-pixel arrangement of the high-density pixel. The sub-pixel rendering processing and the smoothing processing also need not be performed if the sub-pixel arrangement of the low-density pixel group 47Bd according to the first modification is employed, and the sub-pixel arrangement of a high-density pixel group 47Ae according to FIG. 27 is employed.

As illustrated in FIG. 27, in this example, the high-density pixel groups 47Ae each formed by arranging high-density pixels 48A1*e* and high-density pixels 48A2*e* in two rows and two columns are arranged in a matrix in a high-density region 52*e*. The high-density pixel group 47Ae includes a high-density pixel 48A1*e* in the first column of the first row, a high-density pixel 48A2*e* in the second column of the first row, the high-density pixel 48A2*e* in the first column of the second row, and the high-density pixel 48A1*e* in the second column of the second row.

The high-density pixel 48A1*e* has the same sub-pixel arrangement as that of the high-density pixel 48A according to the first embodiment. The high-density pixel 48A2*e* includes a fifth sub-pixel 49C, a sixth sub-pixel 49M, a seventh sub-pixel 49Y, and the fourth sub-pixel 49W. The fifth sub-pixel 49C displays cyan as a fifth color. The sixth sub-pixel 49M displays magenta as a sixth color. The seventh sub-pixel 49Y displays yellow as a seventh color. The fifth, sixth, and seventh colors are not limited to cyan, magenta, and yellow, respectively, but can be selected to be any colors, as long as being different from the first, second, and third colors.

As illustrated in FIG. 27, the fifth sub-pixel 49C, the sixth sub-pixel 49M, the seventh sub-pixel 49Y, and the fourth sub-pixel 49W are arranged in two rows and two columns in the high-density pixel 48A1*e*. The high-density pixel 48A1*e* includes the sixth sub-pixel 49M in the first column of the first row, the seventh sub-pixel 49Y in the second column of the first row, the fourth sub-pixel 49W in the first column of the second row, and the fifth sub-pixel 49C in the second column of the second row. In other words, in the high-density pixel 48A1*e*, the sixth sub-pixel 49M is adjacent in the row direction (X-direction) to the seventh sub-pixel 49Y, and adjacent in the column direction (Y-direction) to the fourth sub-pixel 49W; the seventh sub-pixel 49Y is adjacent in the column direction (Y-direction) to the fifth sub-pixel 49C; and the fourth sub-pixel 49W is adjacent in the row direction (X-direction) to the fifth sub-pixel 49C.

The numbers of the first sub-pixels 49R and the third sub-pixels 49B in the high-density pixel group 47Ae are the same as those in the low-density pixel group 47Bd (refer to FIG. 21B). Due to this, the sub-pixel rendering processing and the smoothing processing need not be performed in this case, as described above.

Second Modification

The following describes a second modification of the first embodiment. A display device 10*e* of the second modification differs from the display device of the first embodiment in being a reflective liquid crystal display device. No description will be given of portions of the second modification that have configurations common to those of the first embodiment.

Figure 28:
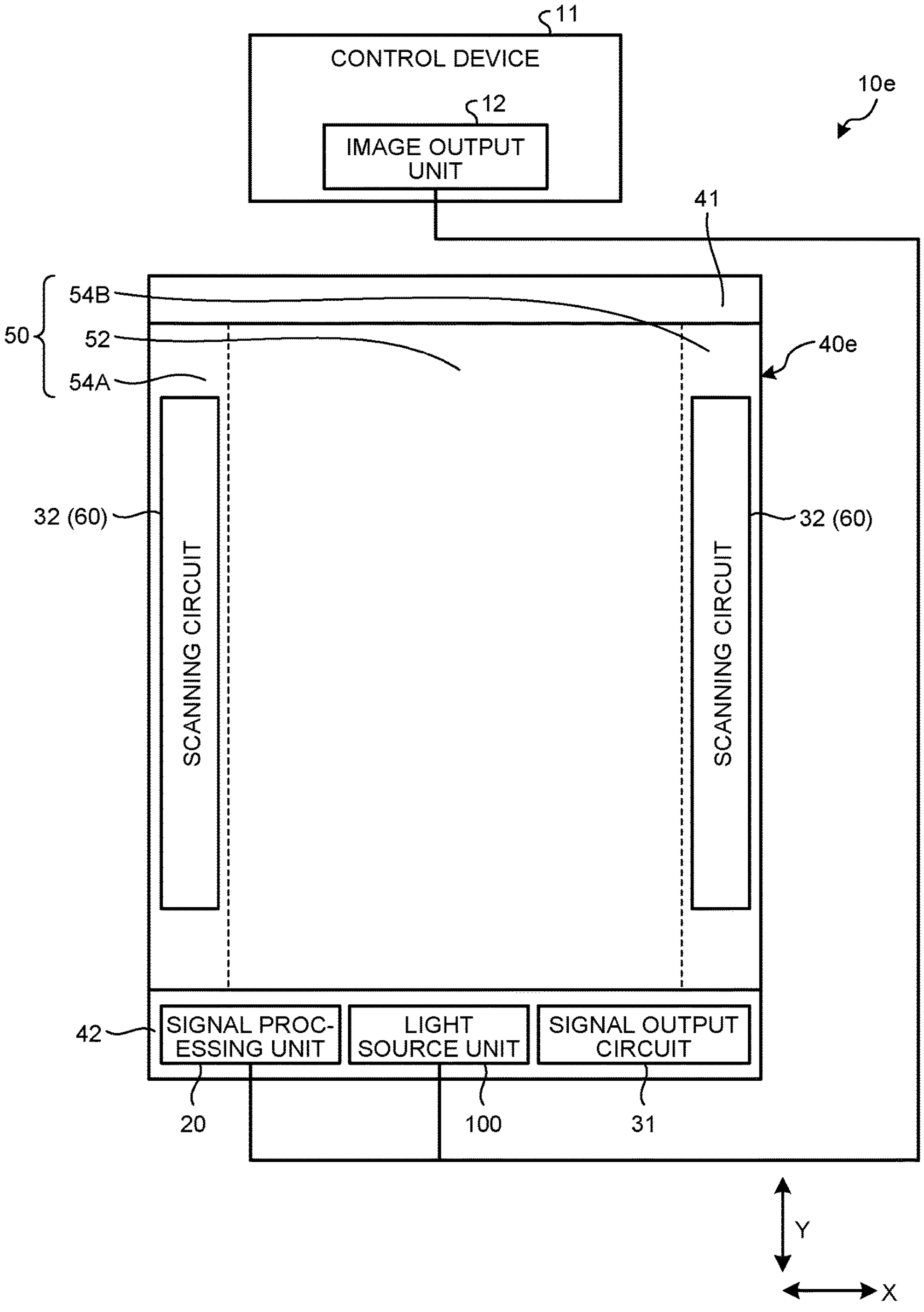
FIG. 28 is a block diagram illustrating an example of a configuration of a display device according to a second modification of the first embodiment.

FIG. 28 is a block diagram illustrating an example of the configuration of the display device according to the second modification. As illustrated in FIG. 28, the display device 10*e* of the second modification includes the signal processing unit 20, the signal output circuit 31, the scanning circuit 32, an image display panel 40*e*, and a light source unit 100. The image display panel 40*e* is a liquid crystal display panel. The light source unit 100 is embedded in the frame portion 42 of the image display panel 40*e*. The light source unit 100 is a light source that emits light from a side face of the image display panel 40*e*. The display device 10*e* displays an image by reflecting external light on the image display panel 40*e*. In addition, when being used at night at outdoor places, or at dark places, where sufficient external light is not provided, the display device 10*e* can also display the image by reflecting the light emitted from the light source unit 100 on the image display panel 40*e*.

Figure 29:
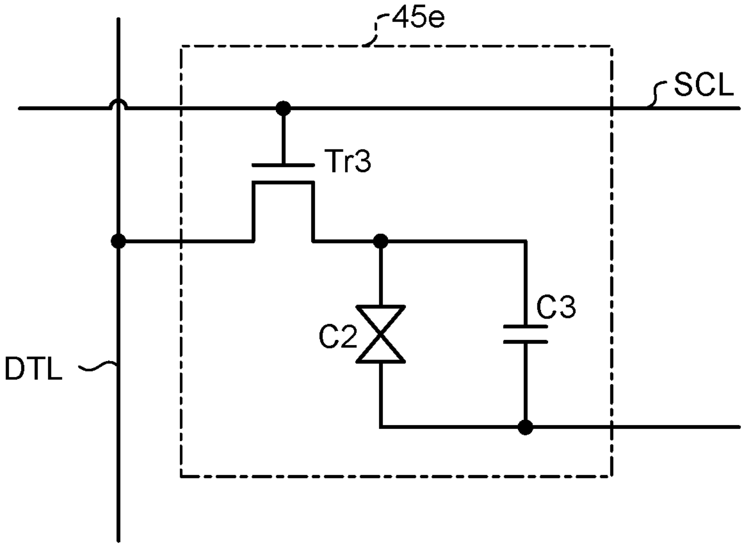
FIG. 29 is a diagram illustrating a drive circuit for sub-pixels included in a pixel of an image display panel according to the second modification.

FIG. 29 is a diagram illustrating a drive circuit for the sub-pixels included in the pixel of the image display panel according to the second modification. The sub-pixels 49 in the second modification are driven by drive circuits 45*e*. The drive circuits 45*e* are arranged in a two-dimensional matrix in the same manner as the lighting drive circuits 45 according to the first embodiment. As illustrated in FIG. 29, each of the drive circuits 45*e* includes a transistor Tr3, a liquid crystal capacitor C2, and a retention capacitor C3. The transistor Tr3 is a switch formed by using, for example, a TFT. A gate electrode of the transistor Tr3 is coupled to one of the scanning lines SCL and a source electrode thereof is coupled to one of the signal lines DTL.

The liquid crystal capacitor C2 refers to a capacitance component of liquid crystal elements generated between a pixel electrode 108 and a counter electrode 110 which are described later. The pixel electrode 108 is coupled to a drain electrode of the transistor Tr3. The retention capacitor C3 is coupled at one electrode thereof to the pixel electrode 108, and at the other electrode thereof to the counter electrode 110.

Figure 30A:
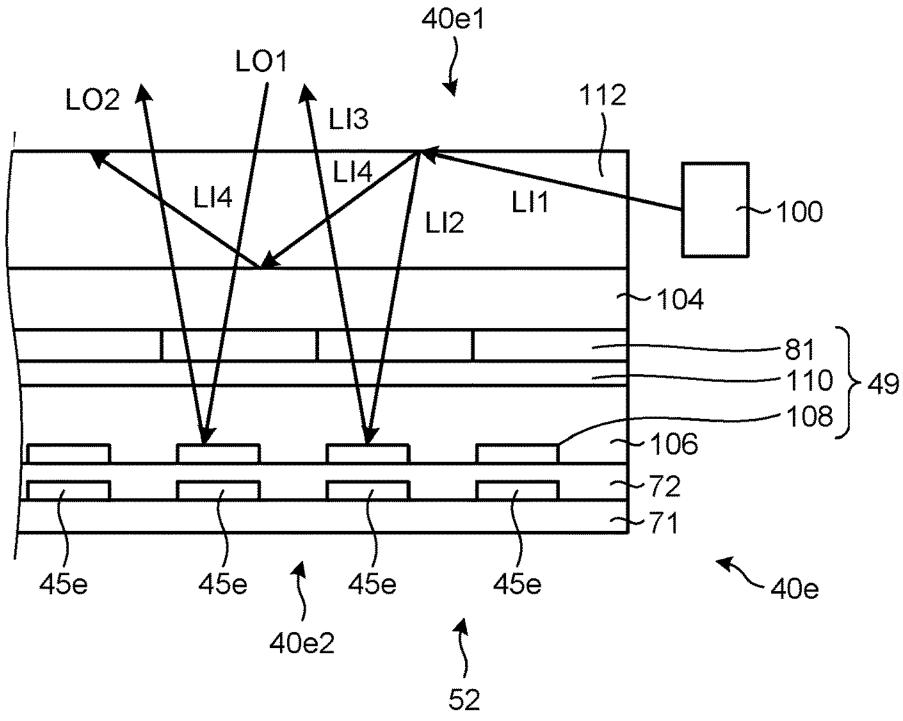
FIG. 30A is a diagram schematically illustrating a cross-sectional structure of an image display panel in a high-density region in the second modification.
Figure 30B:
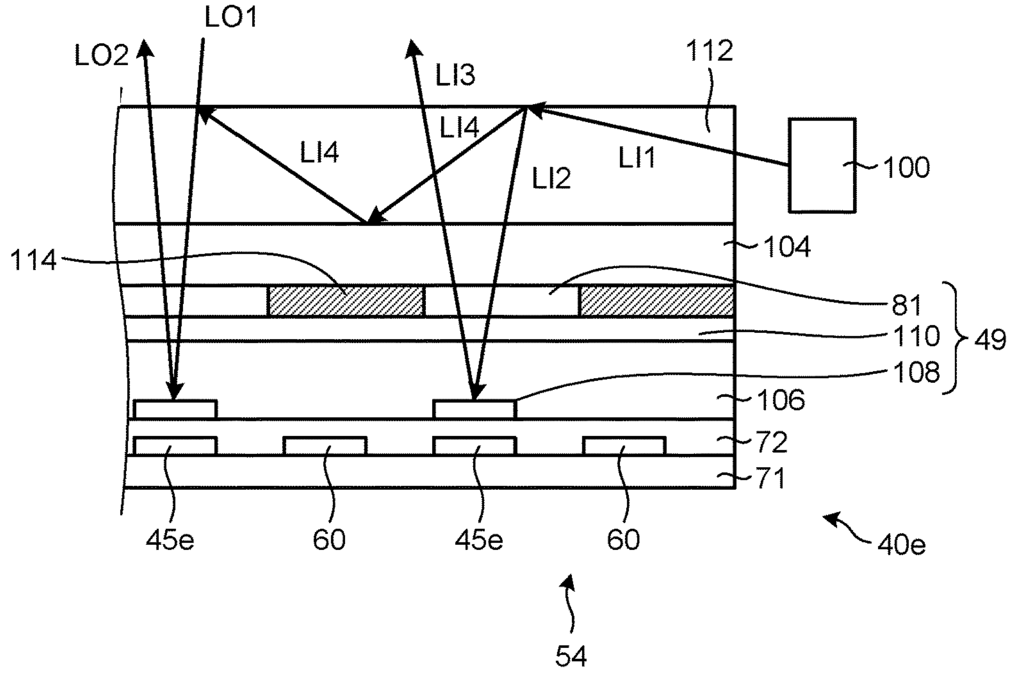
FIG. 30B is a diagram schematically illustrating a cross-sectional structure of the image display panel in a low-density region in the second modification.

The following describes the structure of the image display panel 40*e* in the second modification. FIG. 30A is a diagram schematically illustrating the cross-sectional structure of the image display panel in the high-density region thereof in the second modification. FIG. 30B is a diagram schematically illustrating the cross-sectional structure of the image display panel in the low-density region thereof in the second modification. FIG. 30A is a cross-sectional view at the same place as that of FIG. 6A for the first embodiment. FIG. 30B is a cross-sectional view at the same place as that of FIG. 6B for the first embodiment. As illustrated in FIGS. 30A and 30B, the image display panel 40*e* includes the drive circuits 45*e*, the substrate 71, the insulating layer 72, the color filters 81, a counter substrate 104, a liquid crystal layer 106, the pixel electrodes 108, the counter electrode 110, and a light guide plate 112. A surface of the image display panel 40*e* for displaying an image is referred to as a front surface 40*e*1, and a surface on the opposite side of the front surface 40*e*1 is referred to as a back surface 40*e*2. The substrate 71 is provided on the back surface 40*e*2 side of the image display panel 40*e*. The substrate 71 is, for example, a semiconductor substrate made of silicon, a glass substrate, a resin substrate, or the like, and forms or holds the drive circuit 45*e*. The drive circuit 45*e* is provided for each of the sub-pixels 49, in the same manner as the lighting drive circuit 45 of the first embodiment. The circuit configuration of the drive circuit 45*e* will be described later. The insulating layer 72 is provided on a side closer to the front surface **40*e*1 than the substrate 71. The insulating layer 72 is a protective film for protecting, for example, the drive circuits 45*e* described above. The insulating layer 72** can be made of a silicon oxide, a silicon nitride, or the like.

The counter substrate 104 is a substrate provided on a side closer to the front surface **40*e*1 than the insulating layer 72. The counter substrate 104 is a transparent substrate, such as a glass substrate. The liquid crystal layer 106 is provided between the insulating layer 72 and the counter substrate 104**, and encloses therein the liquid crystal elements.

The pixel electrode 108 is provided on a side closer to the front surface **40*e*1, that is, on a side closer to the liquid crystal layer 106 than the insulating layer 72. The pixel electrode 108 is coupled to the signal line DTL through the switching element (transistor Tr3), which is to be described later, and receives an image output signal as a video signal. The pixel electrode 108 is a reflective member made of, for example, aluminum or silver, and reflects the external light or the light from the light source unit 100. That is, the pixel electrode 108 constitutes a reflection unit. The pixel electrode 108, that is, the reflection unit reflects the light incoming through the front surface 40*e*1 (surface on which an image is displayed) of the image display panel 40*e*** *to display the image.*

The color filter 81 is provided on a surface on the back surface **40*e*1 side, that is, on a surface on the liquid crystal layer 106 side of the counter substrate 104. As described on FIG. 30B, black matrixes 114 which shield light are provided between the color filters 81. The counter electrode 110 is provided on the liquid crystal layer 106, and is provided on a side closer to the back surface 40*e*2 than the color filter 81. The counter electrode 110 is made of a transparent conductive material, such as ITO or IZO. The pixel electrode 108 and the counter electrode 110 are provided so as to face each other. Hence, when a voltage caused by the image output signal is applied between the pixel electrode 108 and the counter electrode 110, the pixel electrode 108 and the counter electrode 110 generate an electric field in the liquid crystal layer 106. The electric field generated in the liquid crystal layer 106 changes the double refractive index, and thus, the display device 10*e* adjusts the amount of light reflected from the image display panel 40*e*. The image display panel 40*e* is what is called a vertical electric field type image display panel, but may be a horizontal electric field type image display panel that generates an electric field in a direction parallel to the display surface of the image display panel 40*e***.

The color filters 81 are provided corresponding to the pixel electrodes 108. The pixel electrode 108, the counter electrode 110, and the color filter 81 constitute each of the sub-pixels 49. The drive circuit **45*e* is a circuit for driving the sub-pixel 49, and is not included in the sub-pixel 49. The light guide plate 112 is provided on a surface on the front surface 40*e*1 side of the counter substrate 104. The light guide plate 112 is a transparent plate-like member made of, for example, an acrylic resin, a polycarbonate (PC) resin, or a methyl methacrylate-styrene copolymer (MS resin). Prisms are formed on an upper surface of the light guide plate 112 that is a surface on the front surface 40*e*1** side thereof.

As illustrated in FIG. 30A, in the high-density region 52, the drive circuits **45*e* and the pieces of wiring are provided below (on the back surface 40*e*2 side of) the respective sub-pixels 49 (more specifically, the pixel electrodes 108) of the high-density pixel 48A. As illustrated in FIG. 30B, in the low-density region 54, the drive circuits 45*e*, the pieces of wiring, and the drive control circuit 60 are provided below (on the back surface 40*e*2 side of) the respective sub-pixels 49 (more specifically, the pixel electrodes 108) of the low-density pixel 48**B.

The light source unit 100 includes light-emitting diodes (LEDs). The light source unit 100 is provided on a side closer to the front surface **40*e*1 than the sub-pixels 49, more specifically, than the pixel electrodes 108. That is, the display device 10*e* does not include the light source unit 100 on a side closer to the back surface 40*e*2 than the pixel electrodes 108 (reflection units). More specifically, the light source unit 100 is provided along a side face of the light guide plate 112. The light source unit 100 emits light from the front surface 40*e*1 of the image display panel 40 through the light guide plate 112. The light source unit 100 is switched between on (light on) and off (light off), for example, by operation of the image observer or by an external light sensor that is mounted on the display device 10*e* and measures external light. The light source unit 100 emits the light when being on, and does not emit the light when being off. For example, when the image observer feels an image to be dark, the image observer turns on the light source unit 100 to irradiate the image display panel 40*e* with the light from the light source unit 100 so as to brighten the image. When the external light sensor determines that the external light intensity is lower than a predetermined value, the signal processing unit 20, for example, turns on the light source unit 100 to irradiate the image display panel 40*e* with the light from the light source unit 100** so as to brighten the image.

The following describes reflection of light by the image display panel **40*e*. As illustrated in FIGS. 30A and 30B, external light LO1 enters the image display panel 40*e* from the front surface 40*e*1 side. The external light LO1 reaches the pixel electrode 108 through the light guide plate 112. The external light LO1 that has reached the pixel electrode 108 is reflected by the pixel electrode 108, and exits, as light LO2, to the outside through the light guide plate 112. Turning on the light source unit 100 causes light LI1 from the light source unit 100 to enter the light guide plate 112 through the side face of the light guide plate 112. The light LI1 that has entered the light guide plate 112 is scattered and reflected on the upper surface of the light guide plate 112, and a part of the reflected light is projected as light LI2 on the pixel electrode 108. The light LI2 projected on the pixel electrode 108 is reflected by the pixel electrode 108, and exits, as light LI3, to the outside through the light guide plate 112. The other part of the light scattered on the upper surface of the light guide plate 112 is reflected as light LI4, and repeats being reflected in the light guide plate 112**.

That is, the pixel electrode 108 reflects outward the external light LO1 that has entered the image display panel **40*e* through the front surface 40*e*1 of the image display panel 40*e*, or reflects outward the light LI2. The light LO2 and the light LI3 reflected outward pass through the liquid crystal layer 43 and the color filters 46. Due to this, the display device 10*e* can display an image with the light LO2 and the light LI3 reflected outward. As described above, the display device 10*e* is a reflective liquid crystal display device including the side light type light source unit 100. The display device 10*e* need not include the light source unit 100 and the light guide plate 112. In that case, the display device 10*e* can display the image with the light LO2 obtained by reflecting the external light LO1**.

As described above, the display device **10*e* according to the second modification is a display device including the image display panel 40***e* in which the pixels 48 including the sub-pixels 49 are arranged in a two-dimensional matrix. The sub-pixel 49 in the second modification includes the pixel electrode 108, that is, the reflection unit that reflects the light from the front surface 40*e*1 of the image display panel 40*e*. The image display panel 40*e* displays an image with the light emitted from the front surface 40*e*1 and reflected by the pixel electrode 108. The image display panel 40*e* includes the low-density region 54 including the low-density pixels 48B and the high-density region 52 including the high-density pixels 48A. The image display panel 40*e* does not include the light source unit 100 for emitting light on the side closer to the back surface 40*e*2 than the pixel electrode 108.

The display device 10*e* does not include the light source unit 100 on the side closer to the back surface 40*e*2 than the pixel electrode 108, but displays an image by reflecting the light from a side closer to the front surface 40*e*1 than the pixel electrode 108. Consequently, in the same manner as in the first embodiment, light is prevented from being shielded by the wiring, so that the display device 10*e* can also restrain reduction in the aperture ratio of the high-density region 52, and thus can reduce the difference in the aperture ratio between the high-density region 52 and the low-density region 54. As a result, the display device 10 reduces the difference in brightness of the image between the regions, and restrains the display quality from deteriorating.

The sub-pixels 49 receive the signals for driving the sub-pixels 49 through the wiring (the scanning lines SCL and the signal lines DTL). The wiring is provided below (on the back surface 40*e*2 side of) the pixel electrode 108 with respect to the image display surface 50. Consequently, in the display device 10, light traveling outward from the pixel electrode 108 does not travel toward the wiring. Due to this, the display device 10*e* more desirably restrains the light from being shielded by the wiring, and thus, more desirably reduces the deterioration of the display quality.

The reflective liquid crystal display device described in the second modification is applicable to embodiments other than the first embodiment and to modifications of the embodiments. That is, the display device according to the present disclosure may be a reflective liquid crystal display device instead of a self-luminous display device. In that case, the light source unit 100 is not provided on the side closer to the back surface 40*e*2 than the pixel electrode 108.

Application Examples

Figure 31:
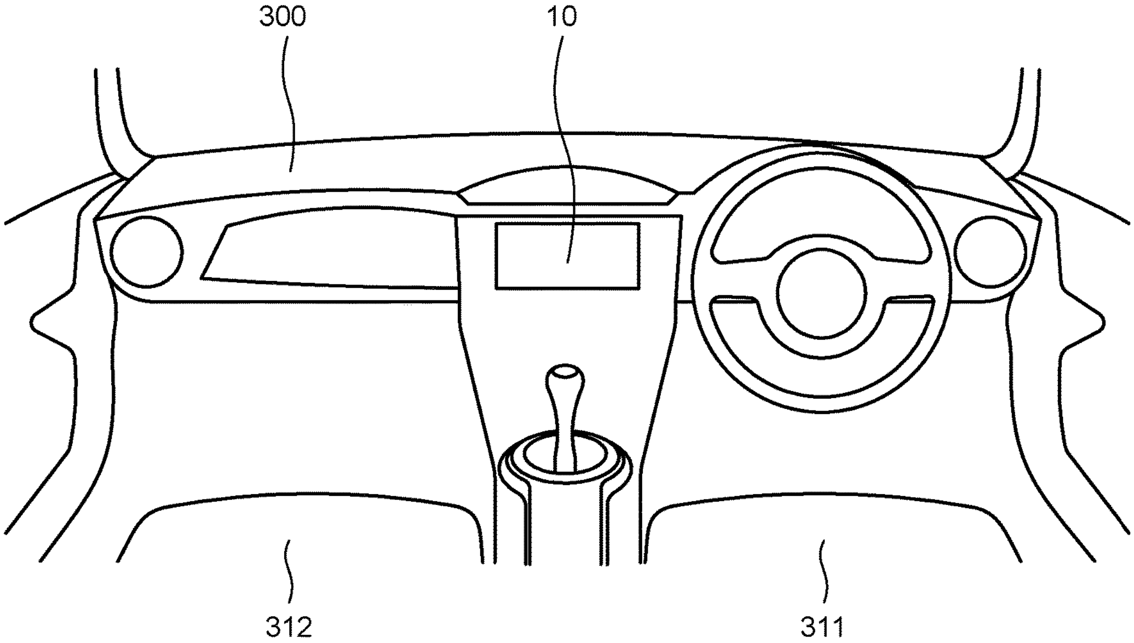
FIG. 31 is a diagram illustrating an example of an electronic apparatus using the display device according to the first embodiment.
Figure 32:
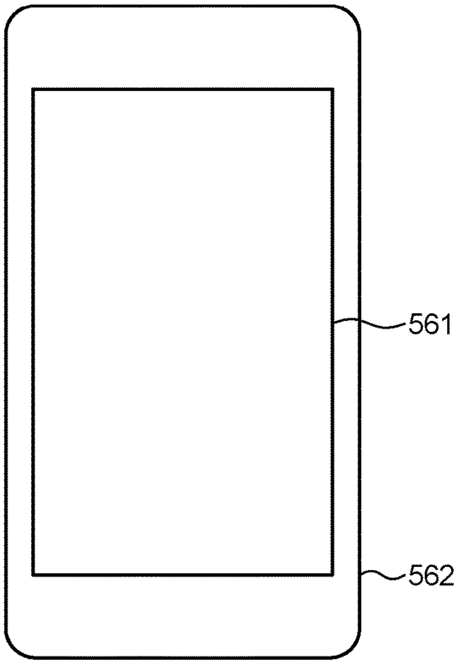
FIG. 32 is a diagram illustrating another example of an electronic apparatus using the display device according to the first embodiment.

The following describes application examples of the display device 10 described in the first embodiment with reference to FIGS. 31 and 32. FIGS. 31 and 32 are diagrams illustrating examples of an electronic apparatus to which the display device according to the first embodiment is applied. The display device 10 according to the first embodiment can be applied to electronic apparatuses in various fields, such as automotive navigation systems such as one illustrated in FIG. 31, television devices, digital cameras, laptop computers, portable electronic apparatuses including mobile phones such as one illustrated in FIG. 32, and video cameras. In other words, the display device 10 according to the first embodiment can be applied to electronic apparatuses in various fields that display externally received video signals or internally generated video signals as images or videos. Each of such electronic apparatuses includes the control device 11 (refer to FIG. 1) that supplies video signals to the display device and controls operations of the display device. The application examples given herein can be applied to, in addition to the display device 10 according to the first embodiment, the display devices according to the other embodiments and the modifications described above.

The electronic apparatus illustrated in FIG. 31 is an automotive navigation device to which the display device 10 according to the first embodiment is applied. The display device 10 is installed on a dashboard 300 in the interior of an automobile. Specifically, the display device 10 is installed between a driver seat 311 and a passenger seat 312 on the dashboard 300. The display device 10 of the automotive navigation device is used for navigation display, display of a music operation screen, reproduction display of a movie, and/or the like.

The electronic apparatus illustrated in FIG. 32 is a portable information apparatus to which the display device 10 according to the first embodiment is applied. The portable information apparatus operates as a portable computer, a multifunctional mobile phone, a mobile computer allowing a voice communication, or a portable computer capable of communication, and is sometimes called a smartphone or a tablet computer. The portable information apparatus includes, for example, a display unit 561 on a surface of a housing 562. The display unit 561 includes the display device 10 according to the first embodiment, and has a touch detection (what is called a touch panel) function that enables detection of an external proximity object.

While the embodiments of the present invention have been described above, the embodiments are not limited to the content thereof. The components described above include components easily conceivable by those skilled in the art, substantially the same components, and components in the range of what are called equivalents. The components described above can also be appropriately combined with each other. In addition, the components can be variously omitted, replaced, or modified without departing from the gist of the embodiments described above.

The present disclosure can employ the following configurations.

(1) A display device comprising: a plurality of pixels arranged in a two dimensional matrix, wherein, each of the pixels includes a plurality of sub-pixels, and each of the sub-pixels includes a self-luminous layer;

a low-density region including low-density pixels each including a first number of the sub-pixels;

a high-density region including high-density pixels each including a second number of the sub-pixels, wherein the second number is greater than the second number; and a lighting drive circuit configured to light up the self-luminous layer.

(2) The display device, wherein the sub-pixels are configured to receive signals to drive the sub-pixels through wiring, and the wiring is provided below the self-luminous layer with respect to an image display surface.

(3) The display device, wherein the low-density region further includes a drive control circuit to control driving of the lighting drive circuit, and the high-density region does not include the drive control circuit.

(4) The display device, wherein the drive control circuit is provided below the self-luminous layer with respect to the image display surface.

(5) The display device, wherein the lighting drive circuit is provided at a same layer as the drive control circuit.

(6) The display device, wherein the high-density region is provided at a center of the image display surface, the low-density regions are provided respectively at both ends of the high-density region in an area of the image display surface.

(7) The display device, wherein the image display surface occupies an entire range along a predetermined direction of an image display panel.

(8) The display device, wherein the drive control circuit is a scanning circuit configured to sequentially select the sub-pixels to light up the self-luminous layer.

(9) The display device, wherein the low-density regions are provided so as to be scattered in the high-density region.

(10) The display device, wherein the drive control circuit includes a sensor to control driving of the image display panel.

(11) The display device, wherein the sub-pixels of the low-density pixels have a larger area than that of the sub-pixels of the high-density pixels.

(12) The display device, further comprising a signal processing unit configured to perform sub-pixel rendering processing so as to generate output signals to be output to the low-density pixels.

(13) The display device, wherein the signal processing unit is configured to perform smoothing processing to gradually reduce number of lighting sub-pixels of the high-density pixels in a boundary region toward the low-density region, wherein the boundary region is a partial region in the high-density region, and also is a region in a predetermined range adjacent to the low-density region.

(14) A display device comprising an image display panel including pixels arranged in a two-dimension matrix, wherein each of the pixels includes a plurality of sub-pixels, each of the sub-pixels includes a reflection unit configured to reflect light from a front surface of the image display panel, and the image display panel is configured to display an image with light emitted from the front surface which is reflected by the reflection unit, and the image display panel includes a low-density region including low-density pixels each including a first number of the sub-pixels and a high-density region including high-density pixels each including a second number of the sub-pixels, the second number is greater than the first number, and the image display does not include a light source unit configured to emit light on a back surface side opposite to the front surface with respect to the reflection unit.

(15) The display device, wherein the sub-pixels are configured to receive signals to drive the sub-pixels through wiring, and the wiring is provided below the reflection unit with respect to an image display surface.

What is claimed is:

1. A display device comprising:

a plurality of pixels arranged in a two dimensional matrix in an image display region, wherein, each of the pixels includes a plurality of sub-pixels, and each of the sub-pixels includes a self-luminous layer;

a low-density region arranged in the image display region and including low-density pixels each including a first number of the sub-pixels;

a high-density region arranged in the image display region and including high-density pixels each including a second number of the sub-pixels, wherein the second number is greater than the first number;

a lighting drive circuit arranged in the image display region and configured to light up the self-luminous layer, wherein the sub-pixels are configured to receive signals to drive the sub-pixels through wiring, the wiring being provided below the self-luminous layer with respect to an image display surface of the image display region; and a drive control circuit configured to provide at least one of scanning signals or power supply signals to respectively control driving of the lighting drive circuit of said each of the pixels, the drive control circuit being arranged within the image display region in the low-density region and outside the high-density region.

2. The display device according to claim 1, wherein the drive control circuit is provided below the self-luminous layer with respect to the image display surface.

3. The display device according to claim 2, wherein the lighting drive circuit is provided at a same layer as the drive control circuit.

4. The display device according to claim 2, wherein the high-density region is provided at a center of the image display surface, the low-density regions are provided respectively at both ends of the high-density region in an area of the image display surface.

5. The display device according to claim 4, wherein the image display surface occupies an entire range along a predetermined direction of an image display panel.

6. The display device according to claim 5, wherein the drive control circuit is a scanning circuit configured to sequentially select the sub-pixels to light up the self-luminous layer.

7. The display device according to claim 2, wherein the low-density regions are provided so as to be scattered in the high-density region.

8. The display device according to claim 7, wherein the drive control circuit includes a sensor to control driving of the image display panel.

9. The display device according to claim 1, wherein the sub-pixels of the low-density pixels have a larger area than that of the sub-pixels of the high-density pixels.

10. The display device according to claim 1, further comprising a signal processing unit configured to perform sub-pixel rendering processing so as to generate output signals to be output to the low-density pixels.

11. The display device according to claim 10, wherein the signal processing unit is configured to perform smoothing processing to gradually reduce number of lighting sub-pixels of the high-density pixels in a boundary region toward the low-density region, wherein the boundary region is a partial region in the high-density region, and also is a region in a predetermined range adjacent to the low-density region.

12. A display device comprising an image display panel including pixels arranged in a two-dimension matrix in an image display region, wherein each of the pixels includes a plurality of sub-pixels, each of the sub-pixels includes a reflection unit configured to reflect light from a front surface of the image display panel, and the image display panel is configured to display an image with light emitted from the front surface which is reflected by the reflection unit, and the image display panel includes, in the image display region, a low-density region including low-density pixels each including a first number of the sub-pixels and a high-density region including high-density pixels each including a second number of the sub-pixels, the second number is greater than the first number, and the image display does panel not include a light source unit configured to emit light on a back surface side opposite to the front surface with respect to the reflection unit, wherein, the sub-pixels are configured to receive signals to drive the sub-pixels through wiring, the wiring being provided below the reflection unit with respect to an image display surface of the image display region, and a drive control circuit configured to provide at least one of scanning signals or power supply signals to respectively control driving of the lighting drive circuit of said each of the pixels is arranged in the low-density region and outside the high-density region.

* * * * *